(12) United States Patent
Zeevi

(10) Patent No.: US 12,517,649 B2
(45) Date of Patent: Jan. 6, 2026

(54) INTEGRATED DOCUMENT EDITOR

(71) Applicant: Eli I Zeevi, San Francisco, CA (US)

(72) Inventor: Eli I Zeevi, San Francisco, CA (US)

( * ) Notice: Subject to any disclaimer, the term of this patent is extended or adjusted under 35 U.S.C. 154(b) by 398 days.

(21) Appl. No.: 17/870,114

(22) Filed: Jul. 21, 2022

(65) Prior Publication Data

US 2022/0357844 A1    Nov. 10, 2022

Related U.S. Application Data

(63) Continuation of application No. 16/133,688, filed on Sep. 17, 2018, now Pat. No. 11,442,619.

(60) Provisional application No. 62/559,269, filed on Sep. 15, 2017.

(51) Int. Cl.
| | | |
|---|---|---|
| G06F 3/04883 | (2022.01) | |
| G06F 3/041 | (2006.01) | |
| G06F 40/166 | (2020.01) | |
| G06F 40/171 | (2020.01) | |

(52) U.S. Cl.
CPC ........ *G06F 3/04883* (2013.01); *G06F 3/0412* (2013.01); *G06F 40/166* (2020.01); *G06F 40/171* (2020.01)

(58) Field of Classification Search
CPC .. G06F 3/04883; G06F 3/0412; G06F 40/166; G06F 40/171
See application file for complete search history.

(56) References Cited

U.S. PATENT DOCUMENTS

| | | | |
|---|---|---|---|
| 7,079,114 B1 | 7/2006 | Smith | |
| 7,155,676 B2 | 12/2006 | Land | |
| 7,961,943 B1 | 6/2011 | Zeevi | |
| 8,548,239 B1 | 10/2013 | Zeevi | |
| 8,650,507 B2 | 2/2014 | Westerman et al. | |
| 8,884,990 B2 | 11/2014 | Villegas | |
| 9,582,095 B1 | 2/2017 | Zeevi | |
| 10,133,477 B1 | 11/2018 | Zeevi | |
| 10,169,301 B1 | 1/2019 | Zeevi | |
| 10,810,351 B2 | 10/2020 | Zeevi | |
| 10,810,352 B2 | 10/2020 | Zeevi | |

(Continued)

FOREIGN PATENT DOCUMENTS

| | | |
|---|---|---|
| CN | 101986249 | 7/2010 |
| CN | 105373309 B | 10/2019 |

OTHER PUBLICATIONS

David Martin "Learn AutoCAD!" Mechanical Drawing Using AutoCAD® 2016, (Year: 2016).*

*Primary Examiner* — Mekonen T Bekele

(57) ABSTRACT

A computing device includes a memory for storing information about graphic objects including locations of the graphic objects, a display for displaying a representation of at least a portion of the information, a surface or pointing device for detecting an indication of a change and one or ore processing units. In response to detecting the indication, the one or more processing units are configured to automatically change a geometry of at least one graphic object of which at least one location is the same as of at least one other graphic object, the change includes a change in at least one location of the at least one graphic object, and at least one location of the at least one other graphic object is unchanged, and automatically change at least a portion of the representation, and the display is configured to display at least a portion of the changed representation.

34 Claims, 54 Drawing Sheets

(56) References Cited

U.S. PATENT DOCUMENTS

| | | |
|---|---|---|
| 11,442,619 B2* | 9/2022 | Zeevi .................. G06F 3/04883 |
| 2001/0033281 A1 | 10/2001 | Yoshida |
| 2004/0174399 A1 | 9/2004 | Wu et al. |
| 2005/0114773 A1 | 5/2005 | Thacker |
| 2007/0070064 A1 | 3/2007 | Nasu |
| 2009/0259442 A1 | 10/2009 | Gandikota |
| 2012/0092268 A1 | 4/2012 | Tsai et al. |
| 2012/0229450 A1* | 9/2012 | Kim .................... G06F 3/04883 |
| | | 345/419 |
| 2013/0042199 A1 | 2/2013 | Fong et al. |
| 2013/0232408 A1 | 9/2013 | Xu |
| 2013/0238724 A1* | 9/2013 | Cunningham ....... H04N 1/4074 |
| | | 709/206 |
| 2015/0286395 A1 | 10/2015 | Yamada |
| 2016/0011726 A1 | 1/2016 | Felt |

\* cited by examiner

Notes

1. This flag is set to "One" by the Recognition Element (18) and Reset to "Zero" in step 3.2 of the subroutines illustrated in Figure 4 and Figure 5

2. This flag is read by the Recognition element (18) and in step 3.1 of the subroutines illustrated in Figure 4 and Figure 5.

| Command | Examples: |
|---|---|
| | 1- Insert text, 2- Delete text, 3- Move text around, 4- Delete extra line, 5- Insert line, 6- Move Text around, 7- Change fonts size, 8- Change Fonts Color, 9- Change image size |
| Flags | Examples: Text / Image flag and Identity flag |
| x-y InsertionPoint1 e.g., for MS Word 3 Parameters: IP1-Page# IP1-Line# IP1-Col# | Designated Location 1 The definition of the x-y location is application dependant e.g., where insertion takes place or where selection begin Page # of InsertionPoint1 Line # in the page of InsertionPoint1 Col # in the line of InsertionPoint1 |
| N1 | Length in characters from InsertionPoint1 to the right, For example, for text to be selected (and then copied or deleted) |
| x-y InsertionPoint2 e.g., for MS Word 3 Parameters: IP2-Page# IP2-Line# IP2-Col# | Designated Location 2 The definition of the x-y location is application dependant e.g., where selection of text that moves to SelectionPoint2 begin Page # of InsertionPoint2 Line # in the page of InsertionPoint2 Col # in the line of InsertionPoint2 |
| N2 | Length in characters from InsertionPoint2 to the right For text selection and movement to InsertionPoint1 |
| StartTextRHI | Location of recognized text in RHI Memory (to be copied) |
| N3 | Length of text in RHI Memory in characters Designates Characters to be processed or to be copied |
| Text1Attributes | Attributes of the revision based on user preferences for, e.g., fonts and color revisions |
| Text2Attributes | Attributes of text inserted at InsertionPoint2 for, e.g., fonts and color revisions |
| StartImageRHI | Location of Image in RHI Memory |
| AttributesImageRHI | e.g., file size, frame info, dimensions |
| AttributesImageDoc | Operations to account for prior to storing in Document Memory e.g., file format (e.g., jpeg), file size/resolution and frame info |

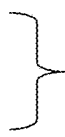
X-Y Location of InsertionPoint1 in the document memory 22

X-Y Location of InsertionPoint2 in the document memory 22

Figure 10

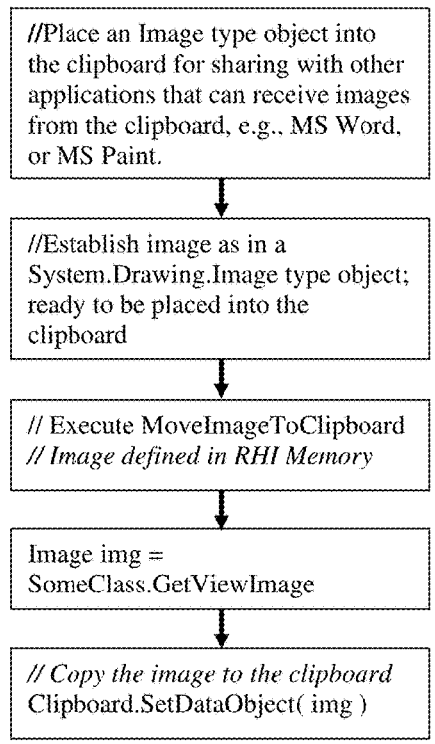

Figure 24

| Built-in Macro | Assigned Shortcut | Translation of Macro to VB Code |
|---|---|---|
| StartOfDocument | Cntrl+Home | Selection.HomeKey Unit:=wdStory |
| GoToNextPage | User choice | Selection.GoToNext wdGoToPage |
| GoToNextLine | Down | Selection.MoveDown Unit:=wdLine, Count:=1 |
| CharRight | Right | Selection.MoveRight Unit:=wdCharacter, Count:=1 |
| CharRightExtend | Shift+Right | Selection.MoveRight Unit:=wdCharacter, Count:=1, Extend:=wdExtend |
| EditClear | Del | Selection.Delete Unit:=wdCharacter, Count:=1 |
| EditCut | Cntrl+X or Shift+Del | Selection.Cut |
| EditPaste | Cntrl+V or Shift+Insert | Selection.Paste |

Figure 25

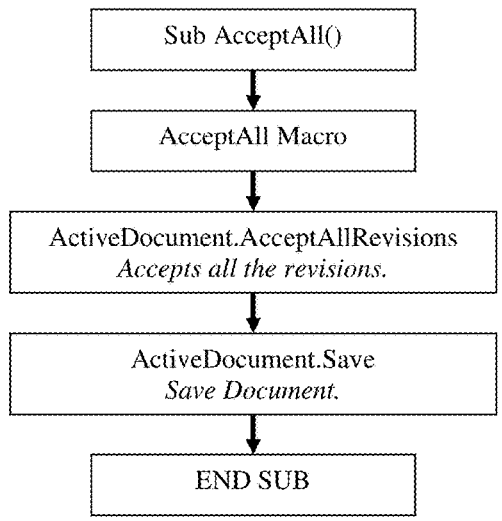

Figure 33

| Built-in Macro | Assigned Shortcut | Translation of Macro to VB Code |
|---|---|---|
| GotoCommentScope | User choice | Selection.Comments(1).Range.Select |
| GotoNextComment | User choice | Selection.GoToNext wdGoToComment |
| GotoPreviousComment | User choice | Selection.GoToPrevious wdGoToComment |
| InsertAnnotation | Alt+Cnrl+M | Selection.Comments.Add Range:=Selection.Range |
| DeleteAnnotation | Alt+Shift+C | ActiveWindow.ActivePane.Close |
| ViewAnnotation | User choice | ActiveWindow.View.SplitSpecial = wdPaneComments |

Figure 34

| Key | Macro translation to VB Code for MS Word |
|---|---|
| A | Selection.TypeText Text:="A" |
| a | Selection.TypeText Text:="a" |
| B | Selection.TypeText Text:="B" |
| C | Selection.TypeText Text:="C" |
| c | Selection.TypeText Text:="c" |
| D | Selection.TypeText Text:="D" |
| E | Selection.TypeText Text:="E" |
| F | Selection.TypeText Text:="F" |
| G | Selection.TypeText Text:="G" |
| H | Selection.TypeText Text:="H" |
| I | Selection.TypeText Text:="I" |
| J | Selection.TypeText Text:="J" |
| K | Selection.TypeText Text:="K" |
| L | Selection.TypeText Text:="L" |
| M | Selection.TypeText Text:="M" |
| 0 | Selection.TypeText Text:="0" |
| 1 | Selection.TypeText Text:="1" |
| 2 | Selection.TypeText Text:="2" |
| 3 | Selection.TypeText Text:="3" |
| 4 | Selection.TypeText Text:="4" |
| 5 | Selection.TypeText Text:="5" |
| 6 | Selection.TypeText Text:="6" |
| @ | Selection.TypeText Text:="@" |
|  |  |
| ↑ | Selection.MoveUp Unit:=wdLine, Count:=1 |
| ↓ | Selection.MoveDown Unit:=wdLine, Count:=1 |
| → | Selection.MoveRight Unit:=wdCharacter, Count:=1 |
| ← | Selection.MoveLeft Unit:=wdCharacter, Count:=1 |
| Page Up | Selection.MoveUp Unit:=wdScreen, Count:=1 |
| Page Down | Selection.MoveDown Unit:=wdScreen, Count:=1 |
| Home | Selection.HomeKey Unit:=wdLine |
| End | Selection.EndKey Unit:=wdLine |
|  |  |
| Tab | Selection.TypeText Text:=vbTab |
| Tab w/i a Table | Selection.MoveRight Unit:=wdCell |
| Esq | Selection.EscapeKey |
| Shift | Macro may only be recorded in combination with other keys |
| Caps Lock | Macro for this key may not be recorded |
|  |  |

Figure 35

Draw a line 'free hand' between 'A' and 'B'

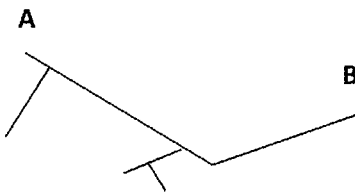

Figure 40A

Lift finger to apply

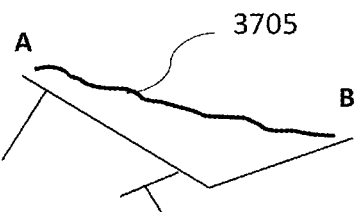

Notes:
1. Estimated distance of line is displayed while line is being drawn.
2. Drawn line may or may not be straight, and each of its edges may touch or be in proximity of 'A' or 'B'

Finger is lifted
Touch screen to dismiss display box

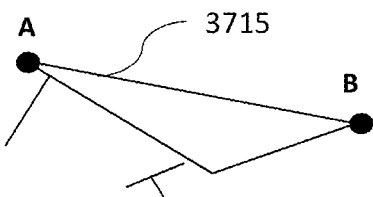

Notes:
1. Edges of drawn line are automatically snapped at 'A' and 'B'.
2. Actual computed distance of 'straight' line is displayed.

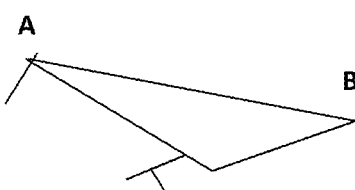

Figure 40D

Touch an object to select it

Draw a ' d ' anywhere on the touch screen to delete it

| 12.85 mm |

Note: Distance of an object is displayed after it is selected.

Touch a line to select it (optional step)

Draw an ' L ' anywhere on the touch screen, and then move the desired edge up or down to the desired location Lift finger to apply Finger is lifted Touch a line to select it (optional step)

Draw an ' a ' anywhere on the touch screen, and then rotate the desired edge down or up to reduce or increase the target angle.

Lift finger to apply

Finger is lifted

Touch a line to select it

Draw an ' R ', and then move across down/up to apply or change a radius

Lift finger to apply

Notes:
1. Varying radius is displayed while finger moves up/down to apply the radius.
2. Touching the display box will allow for manual user entry of the radius.

Finger is lifted

Draw an ' N ', and then touch a reference line

Touch a target line, and lift finger

Finger is lifted

Draw a ' ⌐ ', and then touch the corner to which you want to apply a fillet or an arc, i.e., to round an outside corner.

Radius is applied
Move arced corner inward or outward to increase or reduce arc radius Finger is lifted
Touch screen to apply and to dismiss display box Draw a ' Δ ', and then touch the corner to which you want to apply a chamfer Chamfer is applied
Move edges 'A' and/or 'B' to achieve the desired chamfer Finger is lifted
Touch screen to apply, and to dismiss display box Draw a 'b' to trim an object Touch a target object Touch a reference object Move the reference object to achieve the desired trim Lift finger to apply Finger is lifted

3875

Touch an object to select it

3885

Draw an ' M ', and then move the object to desired location 3880　　　　　　　　　　　　　　　　3885

Lift finger to apply 3897　3895　3890

3885

Finger is lifted

Touch the 'No Snap' icon

Touch the intersection you want to unsnap

Finger is lifted

Touch anywhere to zoom out

Touch the 'No Snap' icon

Draw an ' L ', and then move the desired edge up to the desired location across the line above Lift finger to apply Finger is lifted Draw an ' ⌐ ' to trim an object Move a reference object to achieve the desired trim Lift finger to apply Finger is lifted

INTEGRATED DOCUMENT EDITOR

CROSS-REFERENCE TO RELATED APPLICATIONS

This Application is a continuation of U.S. application Ser. No. 17/989,326, filed Nov. 17, 2022, which claims the benefit of U.S. Provisional Patent Application 62/559,269, filed Sep. 15, 2017, and of U.S. application Ser. No. 16/133,688, filed Sep. 17, 2018, the contents of all of which are herein incorporated by reference.

BACKGROUND

The disclosed embodiments relate to document creation and editing. More specifically, the disclosed embodiments relate to integration of recognition of information entry with document creation. Handwritten data entry into computer programs is known. The most widespread use has been in personal digital assistant devices. Handwritten input to devices using keyboards is not widespread for various reasons. For example, character transcription and recognition are relatively slow, and there are as yet no widely accepted standards for character or command input.

SUMMARY

According to the disclosed embodiments, methods and systems are provided for incorporating handwritten information, particularly corrective information, into a previously created revisable text or graphics document, for example text data, image data or command cues, by use of a digitizing recognizer, such as a digitizing pad, a touch screen or other positional input receiving mechanism as part of a display. In a data entry mode, a unit of data is inserted by means of a writing pen or like scribing tool and accepted for placement at a designated location, correlating x-y location of the writing pen to the actual location in the document, or accessing locations in the document memory by emulating keyboard keystrokes, or by the running of code/programs. In a recognition mode, the entered data is recognized as legible text with optionally embedded edit or other commands, and it is converted to machine-readable format. Otherwise, the data is recognized as graphics, for applications that accommodate graphics, and accepted into an associated image frame. Combinations of data, in text or in graphics form, may be concurrently recognized. In a specific embodiment, there is a window of error in location of the writing tool after initial invocation of the data entry mode, so that actual placement of the tool is not critical, since the input of data is correlated by the initial x-y location of the writing pen to the actual location in the document. In addition, there is an allowed error as a function of the pen's location within the document, i.e., with respect to the surrounding data. In a command entry mode, handwritten symbols selected from a basic set common to various application programs may be entered and the corresponding commands may be executed. In specific embodiments, a basic set of handwritten symbols and/or commands that are not application-dependent and that may be user-intuitive are applied. This handwritten command set allows for the making of revisions and creating documents without having prior knowledge of commands for a specific application.

In a specific embodiment, such as in use with a word processor, the disclosed embodiments may be implemented when the user invokes a Comments Mode at a designated location in a document and then the handwritten information may be entered via the input device into the native Comments field, whereupon it is either converted to text or image or to the command data to be executed, with a handwriting recognizer operating either concurrently or after completion of entry of a unit of the handwritten information. Information recognized as text is then converted to ciphers and imported into the main body of the text, either automatically or upon a separate command. Information recognized as graphics is then converted to image data, such as a native graphics format or as a JPEG image and imported into to the main body of the text at the designated point, either automatically or upon a separate command. Information interpreted as commands can be executed, such as editing commands, which control addition, deletion or movement of text within the document, as well as font type or size change or color change. In a further specific embodiment, the disclosed embodiments may be incorporated as a plug-in module for the word processor program and invoked as part of the system, such as the use of a macro or as invoked through the Track Changes feature.

In an alternative embodiment, the user may manually indicate, prior to invoking the recognition mode, the nature of the input, whether the input is text, graphics or command, recognition can be further improved by providing a step-by-step protocol prompted by the program for setting up preferred symbols and for learning the handwriting patterns of the user.

In at least one aspect of the disclosed embodiments, a computing device includes a memory and a touch screen including a display medium for displaying a representation of vector graphics, the vector graphics comprising a plurality of graphic objects, each graphic object having at least one location stored in the memory and one or more parameters, each parameter being changeable by one or more functions, and a surface for detecting an indication of a change in at least one of the one or more parameters of at least one of the plurality of graphic objects, responsive to detecting the indication, the computing device is configured to automatically change the at least one parameter, automatically change a geometrical feature within the vector graphics based on the changed at least one parameter, and automatically change the representation of the vector graphics based on the changed geometrical feature, wherein the display medium is configured to display the changed representation of the vector graphics.

In another aspect of the disclosed embodiments, a method includes displaying, on a display medium of a computing device, a representation of vector graphics, the vector graphics comprises a plurality of graphic objects, each graphic object having at least one location stored in the memory and one or more parameters, each parameter being changeable by one or more functions, detecting an indication of a change in at least one of the one or more parameters of at least one of the plurality of graphic objects, responsive to detecting the indication, automatically changing the at least one parameter, automatically changing a geometrical feature within the vector graphics based on the changed at least one parameter, automatically changing the representation of the vector graphics based on the changed geometrical feature, and displaying the changed representation of the vector graphics on the display medium.

These and other features of the disclosed embodiments will be better understood by reference to the following detailed description in connection with the accompanying drawings, which should be taken as illustrative and not limiting.

BRIEF DESCRIPTION OF THE DRAWINGS

FIG. 10 is an example of a memory block format of the RHI memory suitable for storing data associated with one handwritten command.

FIG. 24 is a sample of code for subroutine N referenced in FIG. 23 and FIG. 37, for copying an image from the RHI memory into the clipboard.

FIG. 25 is a sample of translated Visual Basic code for built-in macros referenced in the flow charts of FIG. 26 to FIG. 32 and FIG. 37.

FIG. 33 is a sample of code in Visual Basic for the subroutine M referenced in FIG. 4 and FIG. 5, for concluding embedding of the revisions for MS Word, according to the second embodiment using the running of programs.

FIG. 34 is a sample of translated Visual Basic code for useful built-in macros in comment mode for MS Word.

FIG. 35 provides examples of recorded macros translated into Visual Basic code that emulates some keyboard keys for MS Word.

FIGS. 40A-40D illustrate an example of user interaction with the touch screen to Insert a line.

DETAILED DESCRIPTION

Figure 1:
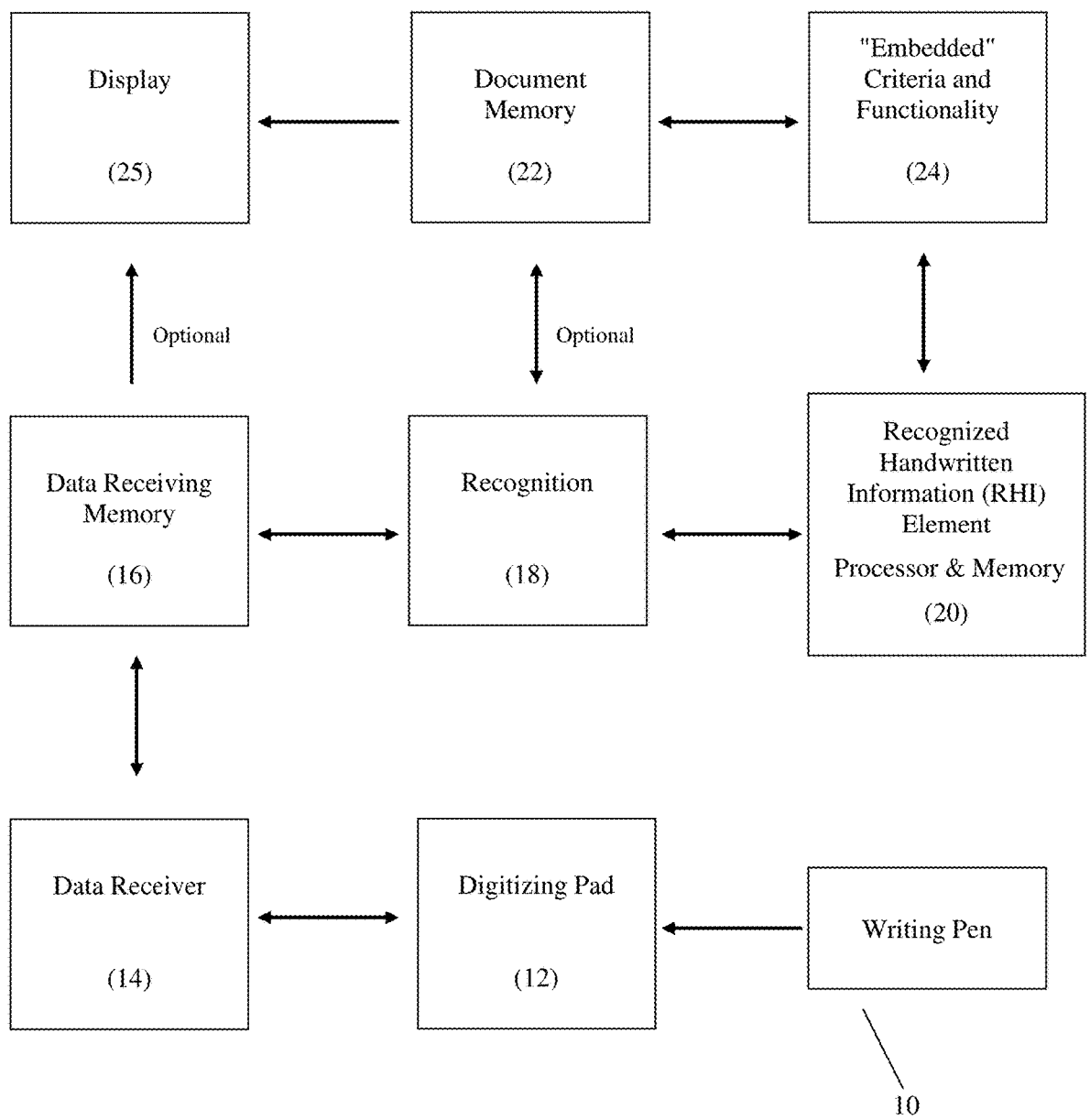
FIG. 1 is a block schematic diagram illustrating basic functional blocks and data flow according to one of the disclosed embodiments.

Referring to FIG. 1, there is a block schematic diagram of an integrated document editor 10 according to a first embodiment, which illustrates the basic functional blocks and data flow according to that first embodiment. A digitizing pad 12 is used, with its writing area, e.g., within margins of an 8½"×11" sheet, to accommodate standard sized papers that corresponds to the x-y location of the edited page. Pad 12 receives data from a writing pen 10, e.g., magnetically, or mechanically by way of pressure with a standard pen. Data from the digitizing pad 12 is read by a data receiver 14 as bitmap and/or vector data and then stored corresponding to or referencing the appropriate x-y location in a data receiving memory 16. Optionally, this information can be displayed on the screen of a display 25 on a real-time basis to provide the writer with real-time feedback.

Figure 38:
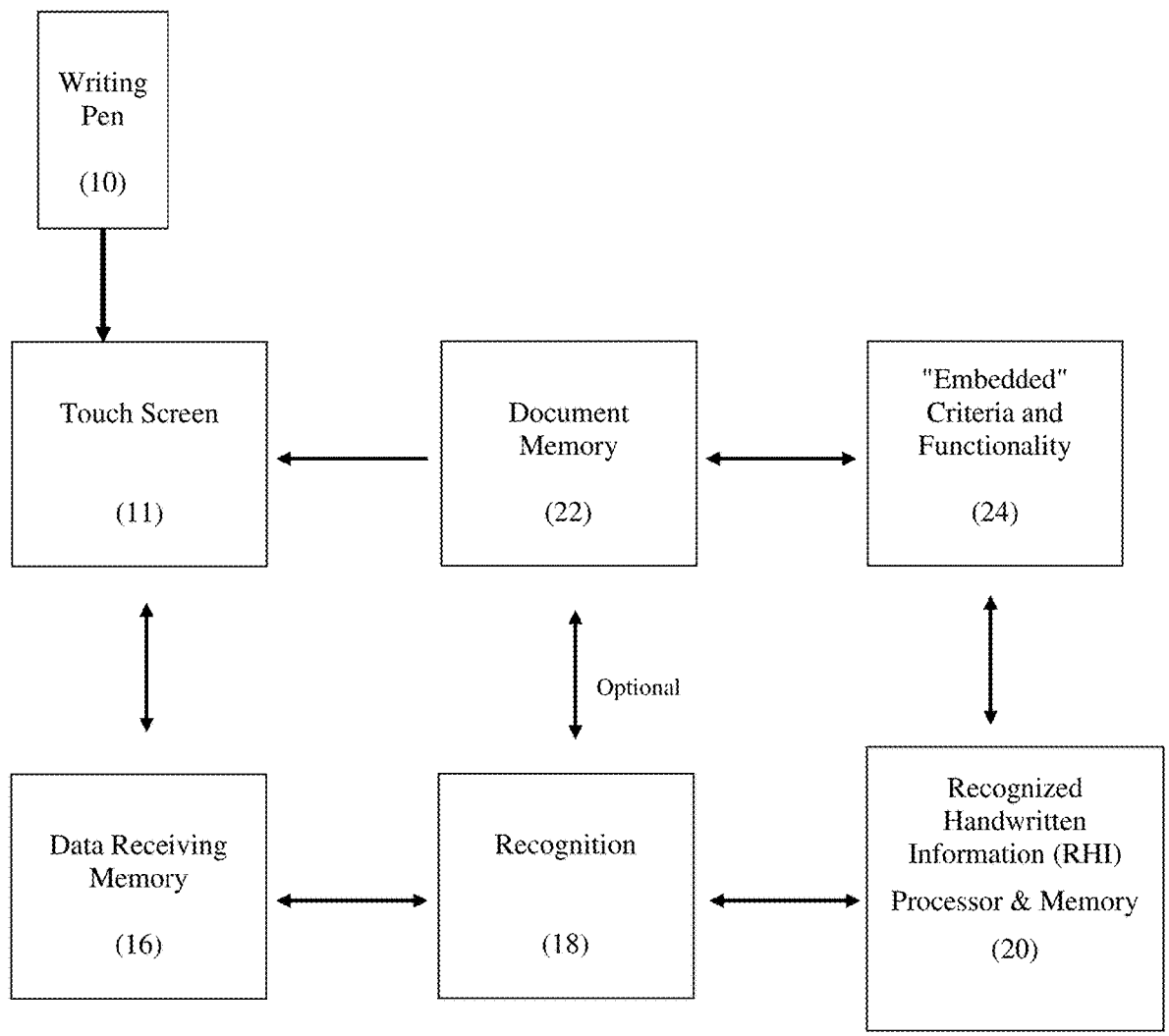
FIG. 38 is an alternate block schematic diagram to the one illustrated in FIG. 1, illustrating basic functional blocks and data flow according to another embodiment of the disclosed embodiments, using a touch screen.

Alternatively, and as illustrated in FIG. 38, a touch screen 11, or other positional input receiving mechanism as part of a display, with its receiving and displaying mechanisms integrated, receives data from the writing pen 10, whereby the original document is displayed on the touch screen as it would have been displayed on a printed page placed on the digitizing pad 12 and the writing by the pen 10 occurs on the touch screen at the same locations as it would have been written on a printed page. Under this scenario, the display 25, pad 12 and data receiver 14 of FIG. 1 are replaced with element 11, the touch screen and associated electronics of FIG. 38, and elements 16, 18, 20, 22, and 24 are discussed hereunder with reference to FIG. 1. Under the touch screen display alternative, writing paper is eliminated.

When a printed page is used with the digitizing pad 12, adjustments in registration of location may be required such that locations on the printed page correlates to the correct x-y locations for data stored in the data receiving memory 16.

The correlation between locations of the writing pen 10 on the touch screen 11 or on the digitizing pad 12 and the actual x-y locations in the document memory 22 need not be perfectly accurate, since the location of the pen 10 is with reference to existing machine code data. In other words, there is a window of error around the writing point that can be allowed without loss of useful information, because it is assumed that the new handwritten information, e.g., revisions, must always correspond to a specific location of the pen, e.g., near text, drawing or image. This is similar to, but not always the same as, placing a cursor at an insertion point in a document and changing from command mode to data input mode. For example, the writing point may be between two lines of text but closer to one line of text than to the other. This window of error could be continuously computed as a function of the pen tapping point and the data surrounding the tapping point. In case of ambiguity as to the exact location where the new data are intended to be inserted, e.g., when the writing point overlaps multiple possible locations in the document memory 22, the touch screen 11, or the pad 12, may generate a signal, such as a beeping sound, requesting the user to tap closer to the point where handwritten information needs to be inserted. If the ambiguity is still not resolved, when the digitizing pad 12 is used, the user may be requested to follow an adjustment procedure.

If desired, adjustments may be made such that the writing area on the digitizing pad 12 will be set to correspond to a specific active window, for example, in multi-windows screen, or to a portion of a window, i.e., when the active portion of a window covers partial screen, e.g., an invoice or a bill of an accounting program QuickBooks, such that the writing area of the digitizing pad 12 is efficiently utilized. In situations where a document is a form, e.g., an order form, the paper document can be a pre-set to the specific format of the form, such that the handwritten information can be entered at specific fields of the form which correspond to these fields in the document memory 22. In addition, in operations that do not require archiving of the handwritten paper documents, handwritten information on the digitizing pad 12 may be deleted after it is integrated into the document memory 22. Alternatively, multi-use media that allow multiple deletions to clear the handwritten information can be used, although the touch screen alternative would be preferred over this alternative.

A recognition functionality element 18 reads information from the data receiving memory 16 and writes the recognition results or recognized handwritten elements into the recognized handwritten information (RHI) memory 20. Recognized handwritten information elements, (RHI elements) such as characters, words, and symbols, are stored in the RHI memory 20. Location of an RHI element in the RHI memory 20 correlates to its location in the data receiving memory 16 and in the document memory 22. After symbols are recognized and interpreted as commands, they may be stored as images or icons in, for example, JPEG format (or they can be emulated as if they were keyboard keys; this technique will be discussed hereafter.) Since the symbols are intended to be intuitive, they can be useful for reviewing and interpreting revisions in the document. In addition, the recognized handwritten information prior to final incorporation, e.g., revisions for review, may be displayed either in handwriting, as is or as revised machine code handwriting for improved readability, or in standard text.

An embedded criteria and functionality element 24 reads the information from the RHI memory 20 and embeds it into the document memory 22. Information in the document memory 22 is displayed on the display 25, which is for example a computer monitor or a display of a touch screen. The embedded functionality determines what to display and what to be embedded into the document memory 22 based on the stage of the revision and selected user criteria/preferences.

Embedding the recognized information into the document memory 22 can be either applied concurrently or after input of all handwritten information, such as after revisions, have been concluded. Incorporation of the handwritten information concurrently can occur with or without user involvement. The user can indicate each time a handwritten command and its associated text and/or image has been concluded, and then it can be incorporated into the document memory 22 one at a time. Incorporation of handwritten information concurrently without user involvement will be discussed hereafter. The document memory 22 contains, for example, one of the following files: 1) A word processing file, such as a MS Word file or a Word Perfect file, 2) A spreadsheet, such as an Excel file, 3) A form such as a sales order, an invoice or a bill in accounting software, e.g., QuickBooks, 4) A table or a database, 5) A desktop publishing file, such as a QuarkXPress or a PageMaker file, or 6) A presentation file, such as a MS Power Point file.

It should be noted that the document could be any kind of electronic file, word processing document, spreadsheet, web page, form, e-mail, database, table, template, chart, graph, image, object, or any portion of these types of documents, such as a block of text or a unit of data. In addition, the document memory 22, the data receiving memory 16 and the RHI memory 20 could be any kind of memory or memory device or a portion of a memory device, e.g., any type of RAM, magnetic disk, CD-ROM, DVD-ROM, optical disk or any other type of storage. It should be further noted that one skilled in the art will recognize that the elements/components discussed herein, e.g., in FIGS. 1, 38, 9, 11, and 13, such as the RHI element may be implemented in any combination of electronic or computer hardware and/or software. For example, the disclosed embodiments could be implemented in software operating on a general-purpose computer or other types of computing/communication devices, such as hand-held computers, personal digital assistant (PDA) s, cell phones, etc. Alternatively, a general-purpose computer may be interfaced with specialized hardware such as an Application Specific Integrated Circuit (ASIC) or some other electronic components to implement the disclosed embodiments. Therefore, it is understood that the disclosed embodiments may be carried out using various codes of one or more software modules forming a program and executed as instructions/data by, e.g., a central processing unit, or using hardware modules specifically configured and dedicated to perform the disclosed embodiments. Alternatively, the disclosed embodiments may be carried out using a combination of software and hardware modules.

The recognition functionality element 18 encompasses one or more of the following recognition approaches:

1. Character recognition, which can for example be used in cases where the user clearly spells each character in capital letters in an effort to minimize recognition errors,
2. A holistic approach where recognition is globally performed on the whole representation of the words and there is no attempt to identify characters individually. The main advantage of the holistic methods is that they avoid word segmentation. Their main drawback is that they are related to a fixed lexicon of words description: since these methods do not rely on letters, words are directly described by means of features. Adding new words to the lexicon typically requires human training or the automatic generation of a word description from ASCII words.
3. Analytical strategies that deal with several levels of representation corresponding to increasing levels of abstractions. Words are not considered as a whole, but as sequences of smaller size units, which must be easily related to characters in order to make recognition independent from a specific vocabulary.

Strings of words or symbols, such as those described in connection with FIG. 7 and discussed hereafter, can be recognized by either the holistic approach or by the analytical strategies, although character recognition may be preferred. Units recognized as characters, words or symbols are stored into the RHI memory 20, for example in ASCII format. Units that are graphics are stored into the RHI memory as graphics, for example as a JPEG file. Units that could not be recognized as a character, word or a symbol are interpreted as images if the application accommodates graphics and optionally, if approved by the user as graphics and stored into the RHI memory 20 as graphics. It should be noted that units that could not be recognized as character, word or symbol may not be interpreted as graphics in applications that do not accommodate graphics, e.g., Excel; in this scenario, user involvement may be required.

To improve the recognition functionality, data may be read from the document memory 22 by the recognition element 18 to verify that the recognized handwritten information does not conflict with data in the original document and to resolve/minimize as much as possible recognized information retaining ambiguity. The user may also resolve ambiguity by approving/disapproving recognized handwritten information, e.g., revisions, shown on the display 25. In addition, adaptive algorithms (beyond the scope of this disclosure) may be employed. Thereunder, user involvement may be relatively significant at first, but as the adaptive algorithms learn the specific handwritten patterns and store them as historical patterns, future ambiguities should be minimized as recognition becomes more robust.

Figure 2:
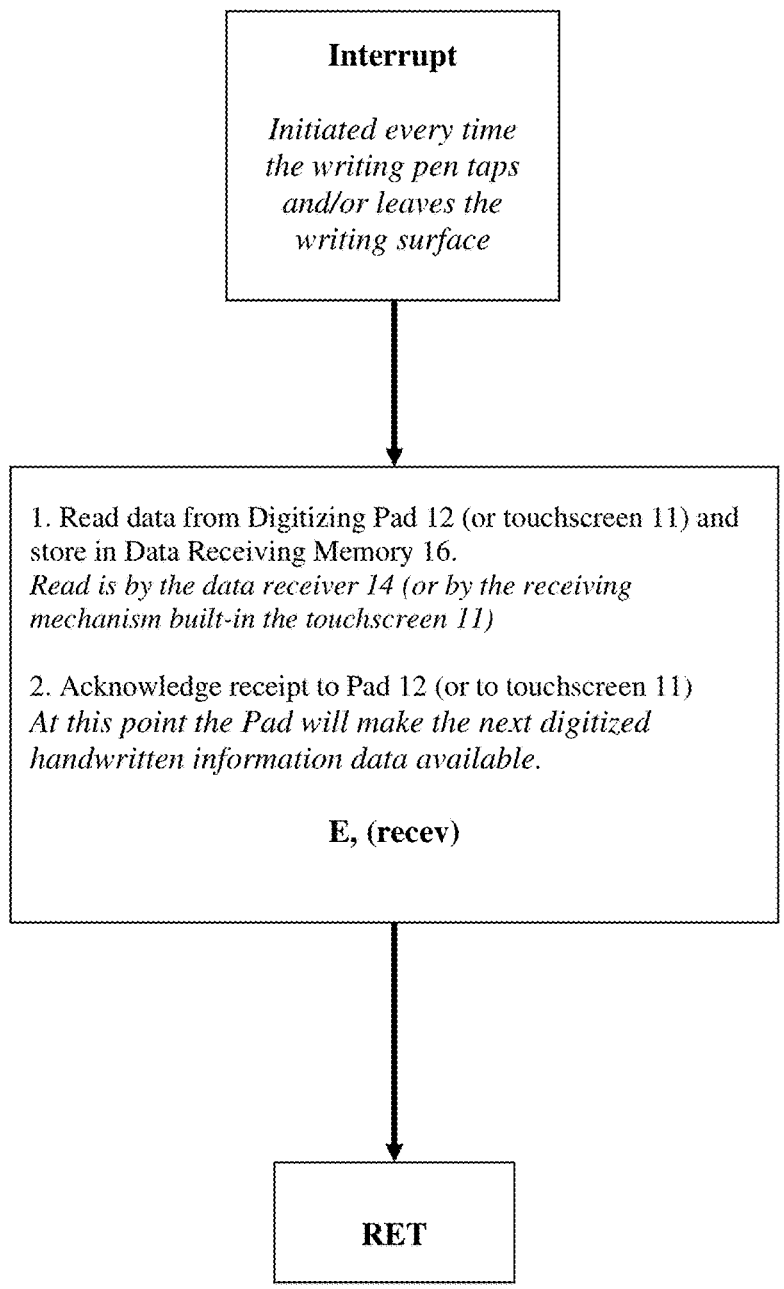
FIG. 2 is a flow chart of an interrupt handler that reads handwritten information in response to writing pen taps on a writing surface.
Figure 5:
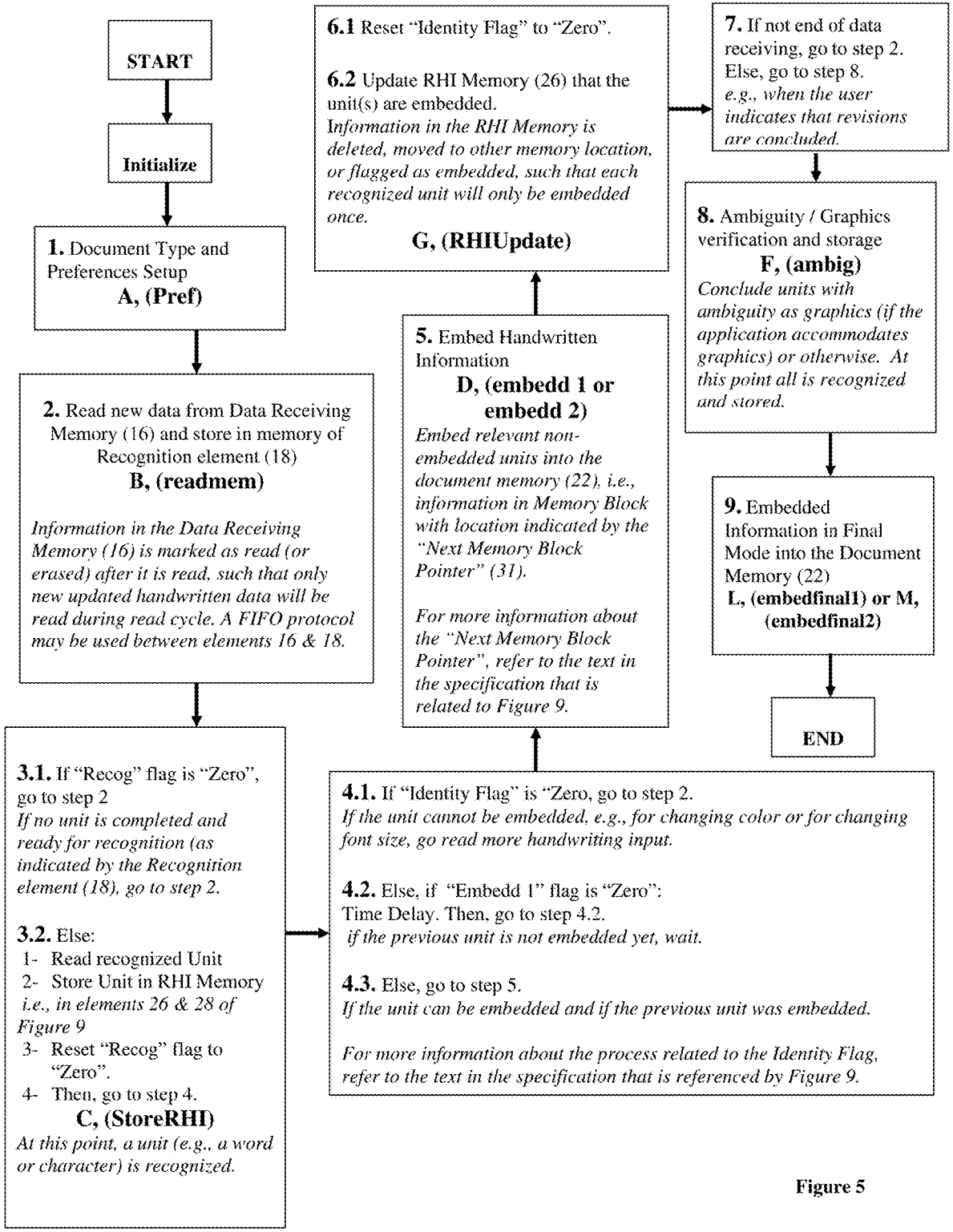
FIG. 5 is a flow chart of operation according to a representative embodiment, wherein handwritten information is incorporated into the document concurrently during input.

FIG. 2 though FIG. 5 are flow charts of operation according to an exemplary embodiment and are briefly explained herein below. The text in all of the drawings is herewith explicitly incorporated into this written description for the purposes of claim support. FIG. 2 illustrates a program that reads the output of the digitizing pad 12 or of the touch screen 11 each time the writing pen 10 taps on and/or leaves the writing surface of the pad 12 or of the touch screen 11. Thereafter data is stored in the data receiving memory 16 (Step E). Both the recognition element and the data receiver, or the touch screen, access the data receiving memory. Therefore, during read/write cycle by one element, the access by the other element should be disabled.

Figure 3:
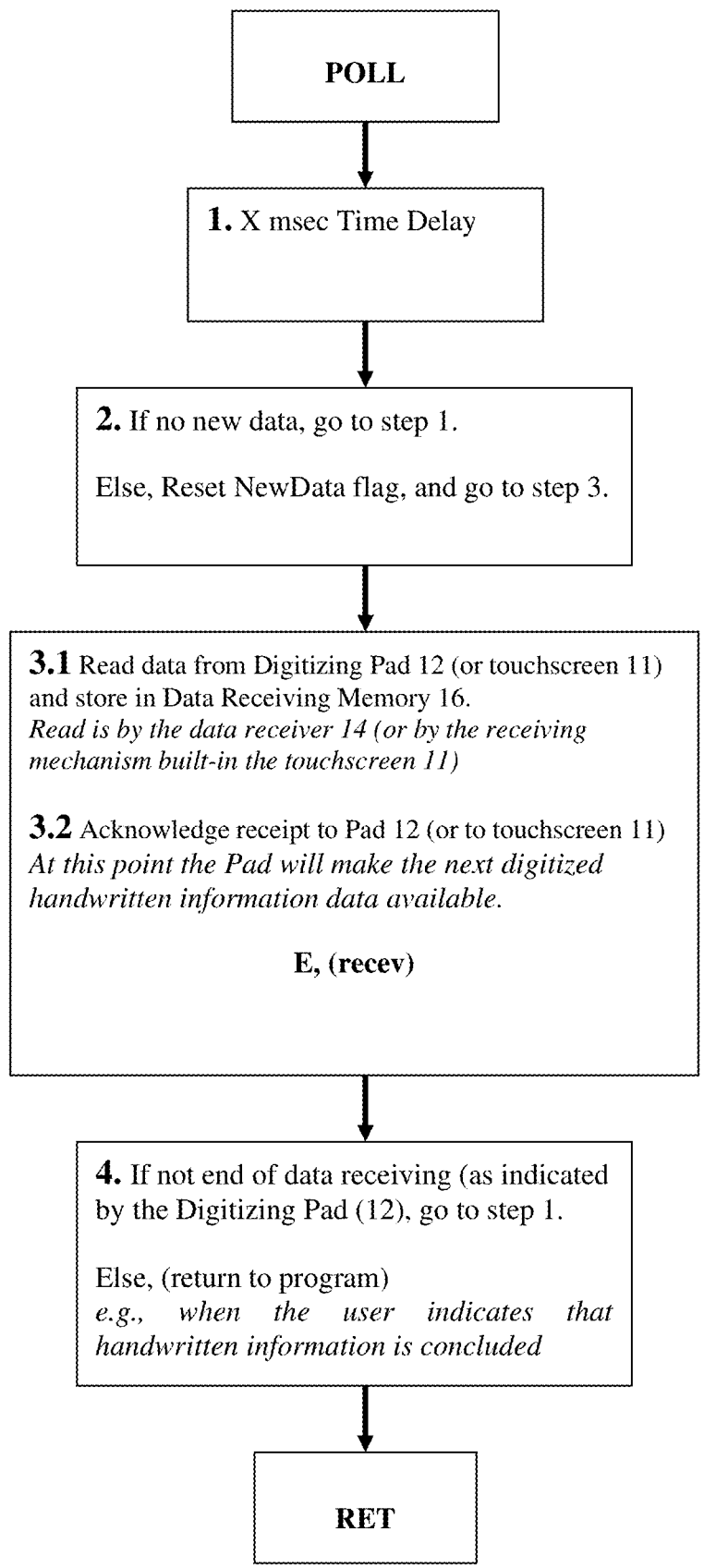
FIG. 3 is a flow chart of a polling technique for reading handwritten information.

Optionally, as illustrated in FIG. 3, the program checks every few milliseconds to see if there is new data to read from the digitizing pad 12 or from the touch screen 11. If so, data is received from the digitizing recognizer and stored in the data receiving memory 16 (E). This process continues until the user indicates that the revisions are concluded, or until there is a timeout.

Figure 4:
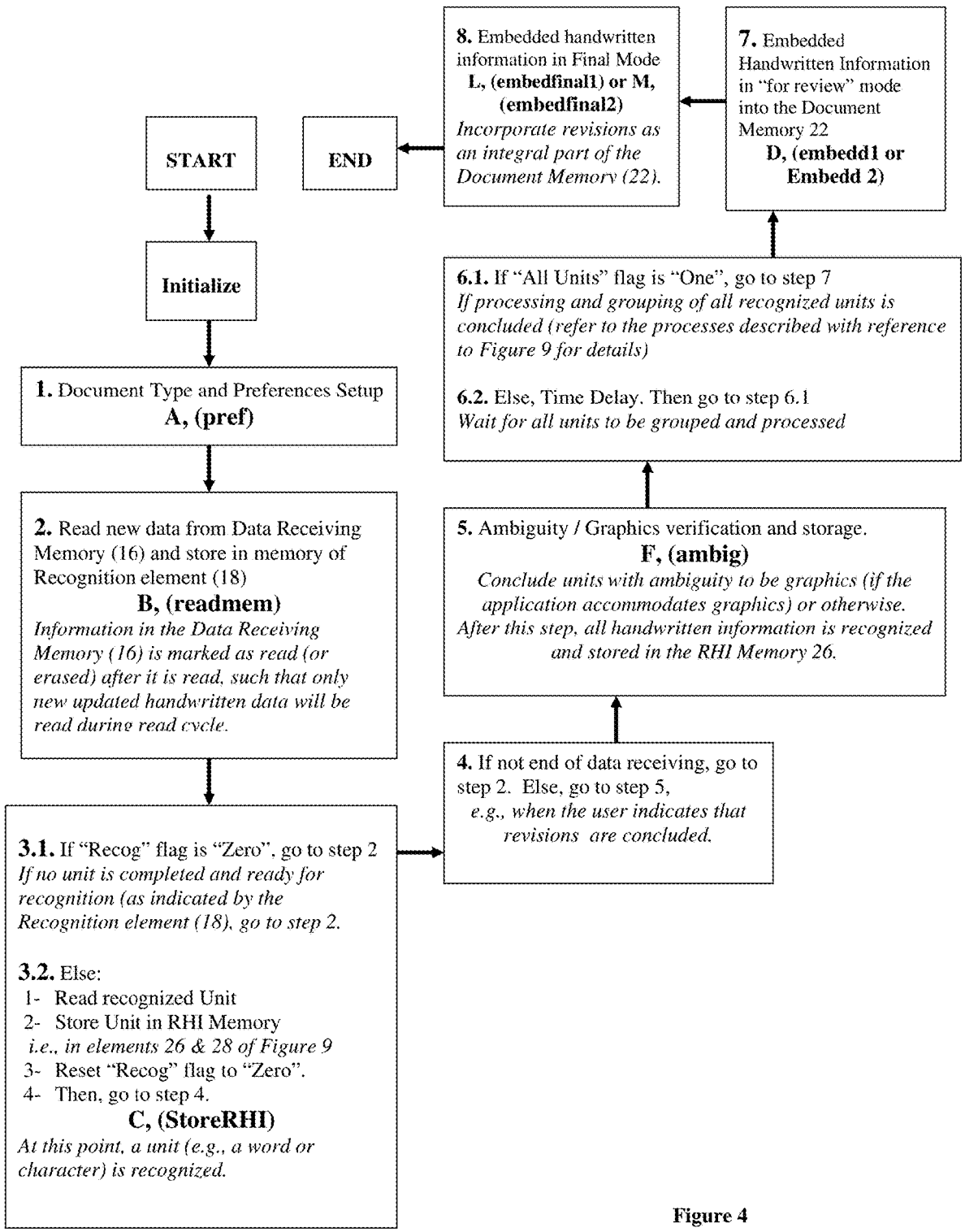
FIG. 4 is a flow chart of operation according to a representative embodiment, wherein handwritten information is incorporated into the document after all handwritten information is concluded.

Embedding of the handwritten information may be executed either all at once according to procedures explained with FIG. 4, or concurrently according to procedures explained with FIG. 5.

The recognition element 18 recognizes one unit at a time, e.g., a character, a word, graphic or a symbol, and makes them available to the RHI processor and memory 20 (C). The functionality of this processor and the way in which it stores recognized units into the RHI memory will be discussed hereafter with reference to FIG. 9. Units that are not recognized immediately are either dealt with at the end as graphics, or the user may indicate otherwise manually by other means, such as a selection table or keyboard input (F). Alternatively, graphics are interpreted as graphics if the user indicates when the writing of graphics begins and when it is concluded. Once the handwritten information is concluded, it is grouped into memory blocks, whereby each memory block contains all (as in FIG. 4) or possibly partial (as in FIG. 5) recognized information that is related to one handwritten command, e.g., a revision. The embedded function (D) then embeds the recognized handwritten information, e.g., revisions, in "for review" mode. Once the user approves/disapproves revisions, they are embedded in final mode (L) according to the preferences set up (A) by the user. In the examples illustrated hereafter, revisions in MS Word are embedded in Track Changes mode all at once. Also, in the examples illustrated hereafter, revisions in MS Word that are according to FIG. 4 may, for example, be useful when the digitizing pad 12 is separate from the rest of the system, whereby handwritten information from the digitizing pad internal memory may be downloaded into the data receiving memory 16 after the revisions are concluded via a USB or other IEEE or ANSI standard port.

FIG. 4 is a flow chart of the various steps, whereby embedding "all" recognized handwritten information (such as revisions) into the document memory 22 is executed once "all" handwritten information is concluded. First, the Document Type is set up, e.g., Microsoft® Word or QuarkXPress, with software version and user preferences, e.g., whether to incorporate revisions as they are available or one at a time upon user approval/disapproval, and the various symbols preferred by the user for the various commands such as for inserting text, for deleting text and for moving text around) (A). The handwritten information is read from the data receiving memory 16 and stored in the memory of the recognition element 18 (B). Information that is read from the receiving memory 16 is marked/flagged as read, or it is erased after it is read by the recognition element 18 and stored in its memory; this will insure that only new data is read by the recognition element 18.

FIG. 5 is a flow chart of the various steps whereby embedding recognized handwritten information, e.g., revisions, into the document memory 22 is executed concurrently, e.g., with the making of the revisions. Steps 1-3 are identical to the steps of the flow chart in FIG. 4 discussed above. Once a unit, such as a character, a symbol or a word is recognized, it is processed by the RHI processor 20 and stored in the RHI memory. A processor (GMB functionality 30 referenced in FIG. 9) identifies it as either a unit that can be embedded immediately or not. It is checked if it can be embedded (step 4.3); if it can be (step 5), it is embedded (D) and then (step 6) deleted or marked/updated as an embedded (G). If it cannot be embedded (step 4.1), more information is read from the digitizing pad 12 or from the touch screen 11. This process of steps 4-6 repeats and continues so long as handwritten information is forthcoming. Once all data is embedded, indicated by an End command or a simple timeout, units that could not be recognized are dealt with (F) in the same manner discussed for the flow chart of FIG. 4. Finally, once the user approves/disapproves revisions, they are embedded in final mode (L) according to the preferences chosen by the user.

Figure 6:
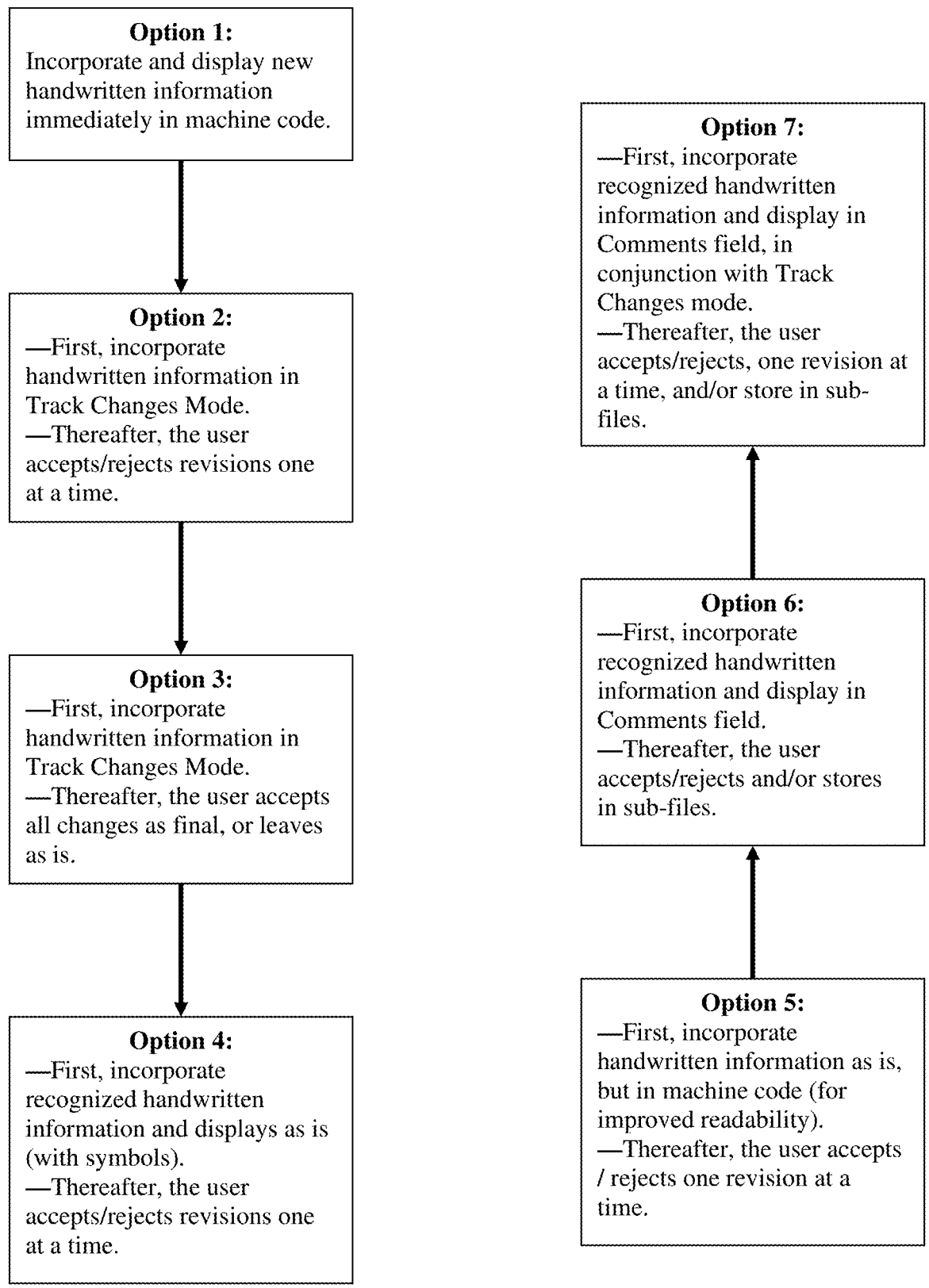
FIG. 6 is an illustration example of options available for displaying handwritten information during various steps in the process according to the disclosed embodiments.

FIG. 6 is an example of the various options and preferences available to the user to display the handwritten information in the various steps for MS Word. In "For Review" mode the revisions are displayed as "For Review" pending approval for "Final" incorporation. Revisions, for example, can be embedded in a "Track Changes" mode, and once approved/disapproved (as in "Accept/Reject changes"), they are embedded into the document memory 22 as "Final". Alternatively, symbols may be also displayed on the display 25. The symbols are selectively chosen to be intuitive, and, therefore, can be useful for quick review of revisions. For the same reason, text revisions may be displayed either in handwriting as is, or as revised machine code handwriting for improved readability; in "Final" mode, all the symbols are erased, and the revisions are incorporated as an integral part of the document.

Figure 7:
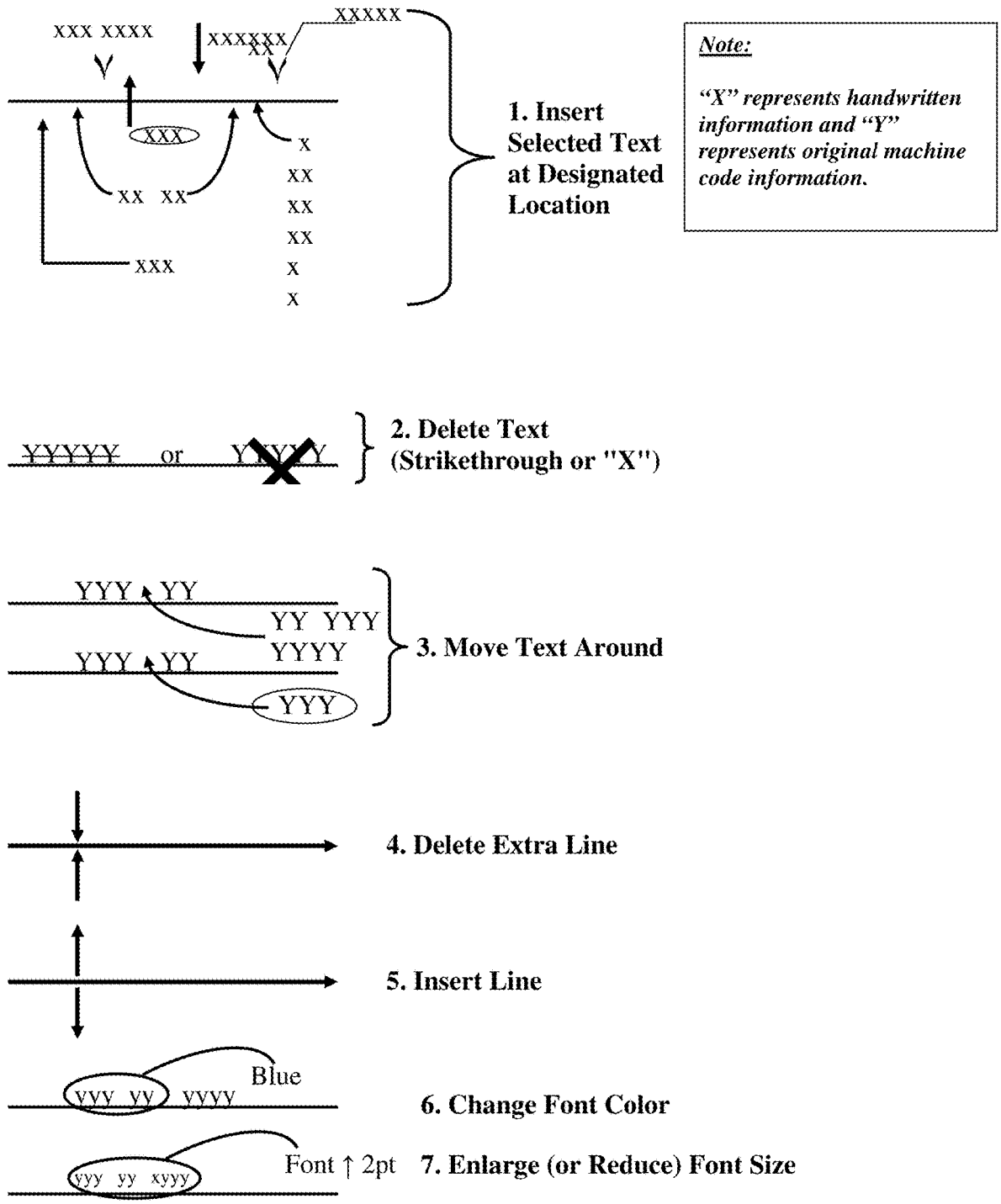
FIG. 7 is an illustration of samples of handwritten symbols/commands and their associated meanings.

An example of a basic set of handwritten commands/symbols and their interpretation with respect to their associated data for making revisions in various types of documents is illustrated in FIG. 7.

Direct access to specific locations is needed in the document memory 22 for read/write operations. Embedding recognized handwritten information from the RHI memory 20 into the document memory 22. e.g., for incorporating revisions, may not be possible or limited in after-market applications. Each of the embodiments discussed below provides an alternate "back door" solution to overcome this obstacle.

Embodiment One: Emulating Keyboard Entries

Command information in the RHI memory 20 is used to insert or revise data, such as text or images in designated locations in the document memory 22, wherein the execution mechanisms emulate keyboard keystrokes, and when available, operate in conjunction with running pre-recorded and/or built-in macros assigned to sequences of keystrokes, i.e., shortcut keys. Data such as text can be copied from the RHI memory 20 to the clipboard and then pasted into designated locations in the document memory 22, or it can be emulated as keyboard keystrokes. This embodiment will be discussed hereafter.

Embodiment Two: Running Programs

In applications such as Microsoft® Word, Excel and WordPerfect, where programming capabilities, such as VB Scripts and Visual Basic are available, the commands and their associated data stored in the RHI memory 20 are translated to programs that embed them into the document memory 22 as intended. In this embodiment, the operating system clipboard can be used as a buffer for data, e.g., text and images. This embodiment will also be discussed hereafter.

Information associated with a handwritten command as discussed in Embodiment One and Embodiment Two is either text or graphics (image), although it could be a combination of text and graphics. In either embodiment, the clipboard can be used as a buffer.

For copy operations in the RHI memory:

When a unit of text or image is copied from a specific location indicated in the memory block in the RHI memory 20 to be inserted in a designated location in the document memory 22.

For Cut/Paste and for Paste operations within the document memory:

For moving text or image around within the document memory 22, and for pasting text or image copied from the RHI memory 20.

A key benefit of Embodiment One is usefulness in a large array of applications, with or without programming capabilities, to execute commands, relying merely on control keys, and when available built-in or pre-recorded macros. When a control key, such as Arrow Up or a simultaneous combination of keys, such as Cntrl-C, is emulated, a command is executed.

Macros cannot be run in Embodiment Two unless translated to actual low-level programming code, e.g., Visual Basic Code. In contrast, running a macro in a control language native to the application (recorded and/or built-in) in Embodiment One is simply achieved by emulating its assigned shortcut key(s). Embodiment Two may be preferred over Embodiment One, for example in MS Word, if a Visual Basic Editor is used to create codes that include Visual Basic instructions that cannot be recorded as macros.

Alternatively, Embodiment Two may be used in conjunction with Embodiment One, whereby, for example, instead of moving text from the RHI memory 20 to the clipboard and then placing it in a designation location in the document memory 22, text is emulated as keyboard keystrokes. If desired, the keyboards keys can be emulated in Embodiment Two by writing a code for each key, that, when executed, emulates a keystroke. Alternatively, Embodiment One may be implemented for applications with no programming capabilities, such as QuarkXPress, and Embodiment Two may be implemented for some of the applications that do have programming capabilities. Under this scenario, some applications with programming capabilities may still be implemented in Embodiment One or in both Embodiment One and Embodiment Two.

Alternatively, x-y locations in the data receiving memory 16 as well as designated locations in the document memory 22, can be identified on a printout or on the display 25, and if desired, on the touch screen 11, based on: 1) recognition/identification of a unique text and/or image representation around the writing pen, and 2) searching for and matching the recognized/identified data around the pen with data in the original document which may be converted into the bitmap and/or vector format that is identical to the format handwritten information is stored in the data receiving memory 16. Then handwritten information along with its x-y locations correspondingly indexed in the document memory 22 is transmitted to a remote platform for recognition, embedding and displaying.

The data representation around the writing pen and the handwritten information are read by a miniature camera with attached circuitry that is built-in the pen. The data representing the original data in the document memory 22 is downloaded into the pen internal memory prior the commencement of handwriting, either via a wireless connection, e.g., Bluetooth, or via physical connection, e.g., USB port.

The handwritten information along with its identified x-y locations is either downloaded into the data receiving memory 16 of the remote platform after the handwritten information is concluded, via physical or wireless link, or it can be transmitted to the remote platform via wireless link as the x-y location of the handwritten information is identified. Then, the handwritten information is embedded into the document memory 22 all at once, i.e., according to the flow chart illustrated in FIG. 4, or concurrently, i.e., according to the flow chart illustrated in FIG. 5.

If desired, the display 25 may include pre-set patterns, e.g., engraved or silk-screened, throughout the display or at selected location of the display, such that when read by the camera of the pen, the exact x-y location on the display 25 can be determined. The pre-set patterns on the display 25 can be useful to resolve ambiguities, for example when the identical information around locations in the document memory 22 exists multiple times within the document.

Further, the tapping of the pen in selected locations of the touch screen 11 can be used to determine the x-y location in the document memory, e.g., when the user makes yes-no type selections within a form displayed on the touch screen. This, for example, can be performed on a tablet that can accept input from a pen or any other pointing device that function as a mouse and writing instrument.

Alternatively, or in addition to a touch screen, the writing pen can emit a focused laser/IR beam to a screen with thermal or optical sensing, and the location of the sensed beam may be used to identify the x-y location on the screen. Under this scenario, the use of a pen with a built-in miniature camera is not needed. When a touch screen or a display with thermal/optical sensing (or when pre-set patterns on an ordinary display) is used to detect x-y locations on the screen, the designated x-y location in the document memory 22 can be designated based on: 1) the detected x-y location of the pen 10 on the screen, and 2) parameters that correlate between the displayed data and the data in the document memory 22, e.g., application name, cursor location on the screen and zoom percent.

Alternatively, the mouse could be emulated to place the insertion point at designated locations in the document memory 22 based on the X-Y locations indicated in the Data receiving memory 16. Then information from the RHI memory 20 can be embedded into the document memory 22 according to Embodiment One or Embodiment Two. Further, once the insertion point is at a designated location in the document memory 22, selection of text or an image within the document memory 22 may be also achieved by emulating the mouse pointer click operation.

Use of the Comments Insertion Feature:

The Comments feature of Microsoft® Word, or similar comment-inserting feature in other program applications, may be employed by the user or automatically in conjunction with either of the approaches discussed above, and then handwritten information from the RHI memory 20 can be embedded into designated Comments fields of the document memory 22. This approach will be discussed further hereafter.

Use of the Track Changes Feature:

Before embedding information into the document memory 22, the document type is identified and user preferences are set (A). The user may select to display revisions in Track Change feature. The Track Changes Mode of Microsoft® Word, or similar features in other applications, can be invoked by the user or automatically in conjunction with either or both Embodiment One and Embodiment Two, and then handwritten information from the RHI memory 20 can be embedded into the document memory 22. After all revisions are incorporated into the document memory 22, they can be accepted for the entire document, or they can be accepted/rejected one at a time upon user command. Alternatively, they can be accepted/rejected at the making of the revisions.

The insertion mechanism may also be a plug-in that emulates the Track Changes feature. Alternatively, the Track Changes Feature may be invoked after the Comments Feature is invoked such that revisions in the Comments fields are displayed as revisions, i.e., "For Review". This could in particular be useful for large documents reviewed/revised by multiple parties.

In another embodiment, the original document is read and converted into a document with known accessible format, e.g., ASCII for text and JPEG for graphics, and stored into an intermediate memory location. All read/write operations are performed directly on it. Once revisions are completed, or before transmitting to another platform, it can be converted back into the original format and stored into the document memory 22.

As discussed, revisions are written on a paper document placed on the digitizing pad 12, whereby the paper document contains/resembles the machine code information stored in the document memory 22, and the x-y locations on the paper document corresponds to the x-y locations in the document memory 22. In an alternative embodiment, the revisions can be made on a blank paper, or on another document, whereby, the handwritten information, for example, is a command, or a set of commands, to write or revise a value/number in a cell of a spreadsheet, or to update new information in a specific location of a database; this can be useful, for example in cases were an action to update a spreadsheet, a table or a database is needed after reviewing a document or a set of documents. In this embodiment, the x-y location in the Receiving Memory 16 is immaterial.

RHI Processor and Memory Blocks:

Before discussing the way in which information is embedded into the document memory 22 in greater detail with reference to the flow charts, it is necessary to define how recognized data is stored in memory and how it correlates to locations in the document memory 22. As previously explained, embedding the recognized information into the document memory 22 can be either applied concurrently or after all handwritten information has been concluded. The Embed function (D) referenced in FIG. 4 reads data from memory blocks in the RHI memory 20 one at a time, which corresponds to one handwritten command and its associated text data or image data. The Embed function (D) referenced in FIG. 5 reads data from memory blocks and embeds recognized units concurrently.

Memory blocks: An example of how a handwritten command and its associated text or image is defined in the memory block 32 is illustrated in FIG. 10. This format may be expanded, for example, if additional commands are added, i.e., in addition to the commands specified in the Command field. The parameters defining the x-y location of recognized units, i.e., InsertionPoint1 and InsertionPoint2 in FIG. 10, vary as a function of the application. For example, the x-y locations/insertion points of text or image in MS Word can be defined with the parameters Page #, Line # and Column #, as illustrated in FIG. 10. In the application Excel, the x-y locations can be translated into the cell location in the spreadsheet, i.e., Sheet #, Row # and Column #. Therefore, different formats for x-y InsertionPoint1 and x-y InsertionPoint2 need to be defined to accommodate variety of applications.

Figure 9:
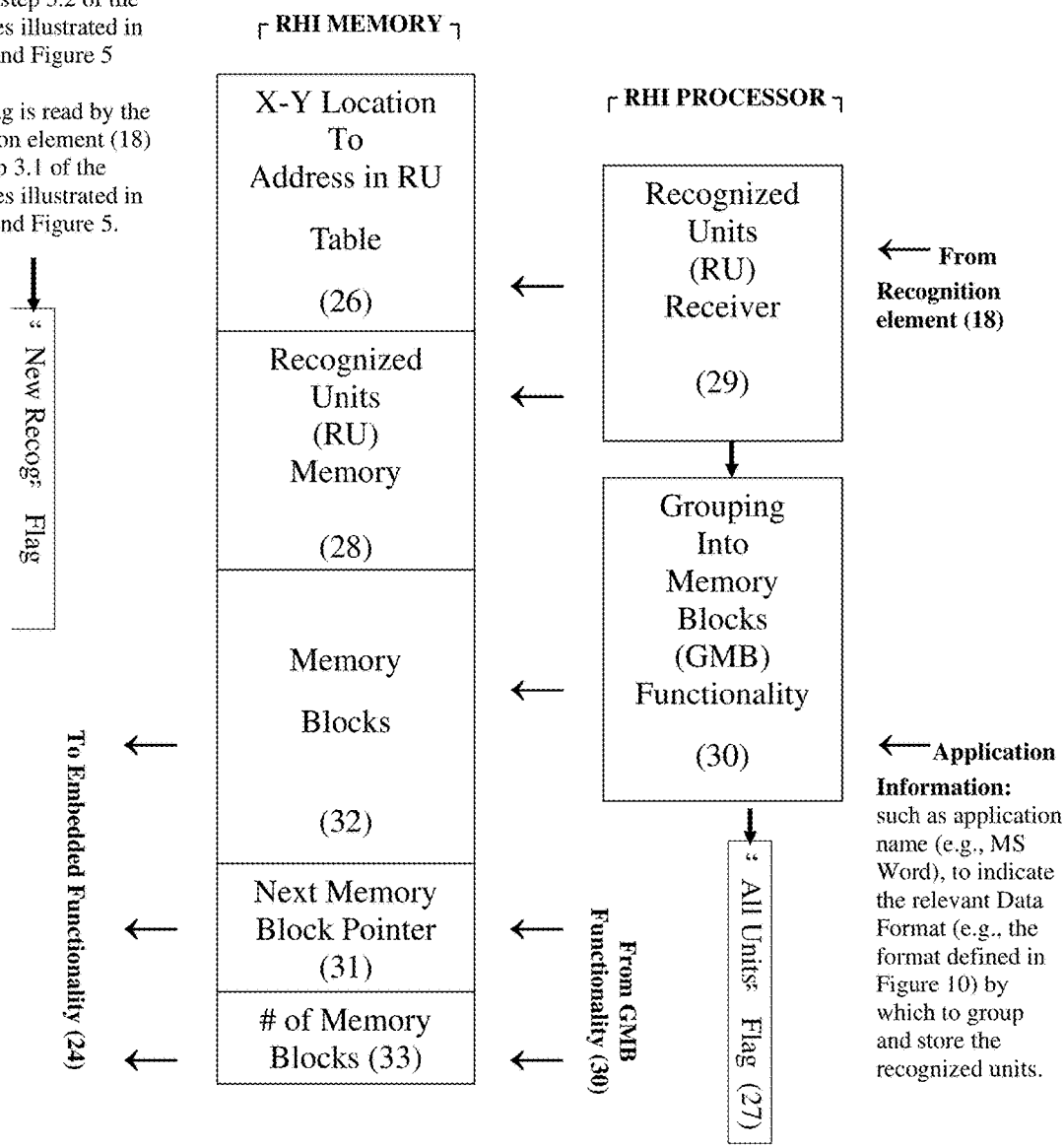
FIG. 9 is an illustration of data flow for data received from a recognition functionality element processed and defined in an RHI memory.

FIG. 9 is a chart of data flow of recognized units. These are discussed below.

FIFO (First In First Out) Protocol: Once a unit is recognized it is stored in a queue, awaiting processing by the processor of element 20, and more specifically, by the GMB functionality 30. The "New Recog" flag, set to "One" by the recognition element 18 when a unit is available, indicates to the RU receiver 29 that a recognized unit, i.e., the next in the queue, is available. The "New Recog" flag is reset back to "Zero" after the recognized unit is read and stored in the memory elements 26 and 28 of FIG. 9, e.g., as in step 3.2. of the subroutines illustrated in FIG. 4 and FIG. 5. In response, the recognition element 18: 1) makes the next recognized unit available to read by the RU receiver 29, and 2) sets the "New Recog" flag back to "One" to indicate to the RU receiver 29 that the next unit is ready. This process continues so long as recognized units are forthcoming. This protocol insures that the recognition element 18 is in synch with the speed with which recognized units are read from the recognition element and stored in the RHI memory, i.e., in memory elements 26 and 28 of FIG. 9. For example, when handwritten information is processed concurrently, there may be more than one memory block available before the previous memory block is embedded into the document memory 22.

In a similar manner, this FIFO technique may also be employed between elements 24 and 22 and between elements 16 and 18 of FIG. 1 and FIG. 38, and between elements 14 and 12 of FIG. 1, to ensure that independent processes are well synchronized, regardless of the speed by which data is available by one element and the speed by which data is read and processed by the other element.

Optionally, the "New Recog" flag could be implemented in hardware such as within an IC, for example, by setting a line to "High" when a recognized unit is available and to "Low" after the unit is read and stored, i.e., to acknowledge receipt.

Process 1: As a unit, such as a character, a symbol or a word is recognized: 1) it is stored in Recognized Units (RU) Memory 28, and 2) its location in the RU memory 28 along with its x-y location, as indicated in the data receiving memory 16, is stored in the XY-RU Location to Address in RU table 26. This process continues so long as handwritten units are recognized and forthcoming.

Process 2: In parallel to Process 1, the grouping into memory blocks (GMB) functionality 30 identifies each recognized unit such as a character, a word or a handwritten command (symbols or words), and stores them in the appropriate locations of memory blocks 32. In operations such as "moving text around", "increasing fonts size" or "changing color", an entire handwritten command must be concluded before it can be embedded into the document memory 22. In operations such as "deleting text" or "inserting new text", deleting or embedding the text can begin as soon as the command has been identified and the deletion (or insertion of text) operation can then continue concurrently as the user continue to write on the digitizing pad 12 or on the touch screen 11.

In this last scenario, as soon as the recognized unit(s) are incorporated into or deleted from the document memory 22, they are deleted from the RHI memory 22, i.e., from the memory elements 26, 28 and 32 of FIG. 9. If deletion is not desired, embedded units may be flagged as "incorporated/embedded" or moved to another memory location, as illustrated in step 6.2 of the flow chart in FIG. 5. This should insure that information in the memory blocks is continuously current with new unincorporated information.

Process 3: As unit(s) are grouped into memory blocks, 1) the identity of the recognized units (whether they can be immediately incorporated or not) and 2) the locations of the units that can be incorporated in the RHI memory are continuously updated.

1—As units are groups into memory blocks, a flag, i.e., "Identity-Flag", is set to "One" to indicate when unit(s) can be embedded. It should be noted that this flag is defined for each memory block and that it could be set more than one time for the same memory block, for example, when the user strikes through a line of text. This flag is checked in steps 4.1-4.3 of FIG. 5 and is reset to "Zero" after the recognized unit(s) is embedded, i.e., in step 6.1 of the subroutine in FIG. 5, and at initialization. It should be noted that the "Identity" flag discussed above is irrelevant when all recognized units associated with a memory block are embedded all at once; under this scenario and after the handwritten information is concluded, recognized, grouped and stored in the proper locations of the RHI memory, the "All Units" flag in step 6.1 of FIG. 4 will be set to "One" by the GMB functionality 30 of FIG. 9, to indicate that all units can be embedded.

2—As units are grouped into memory blocks, a pointer for memory block, i.e., the "Next memory block pointer" 31, is updated every time a new memory block is introduced, i.e., when a recognized unit(s) that is not yet ready to be embedded is introduced; when the "Identity" flag is Zero, and every time a memory block is embedded into the document memory 22, such that the pointer will always point to the location of the memory block that is ready, when it is ready, to be embedded. This pointer indicates to the subroutines Embedd1 (of FIG. 12) and Embedd2 (of FIG. 14) the exact location of the relevant memory block with the recognized unit(s) that is ready to be embedded (as in step 1.2 of these subroutines).

An example of a scenario under which the "next memory block pointer" 31 is updated is when a handwritten input related to changing font size has begun, then another handwritten input related to changing colors has begun; note that these two commands cannot be incorporated until after they are concluded, and then another handwritten input for deleting text has begun; note that this command may be embedded as soon as the GMB functionality identifies it.

Figure 14:
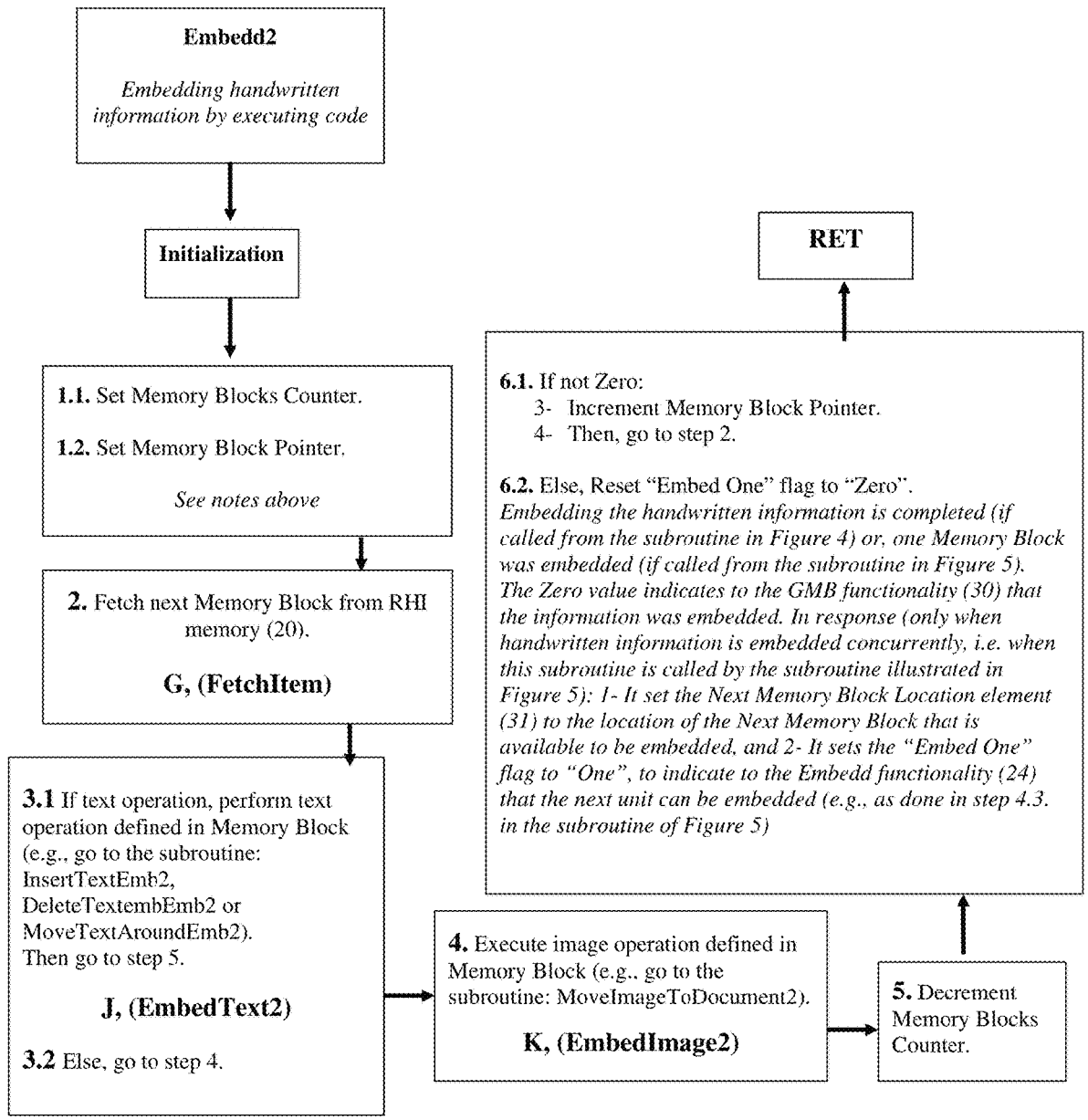
FIG. 14 is a flow chart representing subroutine D of FIG. 4 and FIG. 5 according to the second embodiment illustrating the running of programs.
Figure 15:
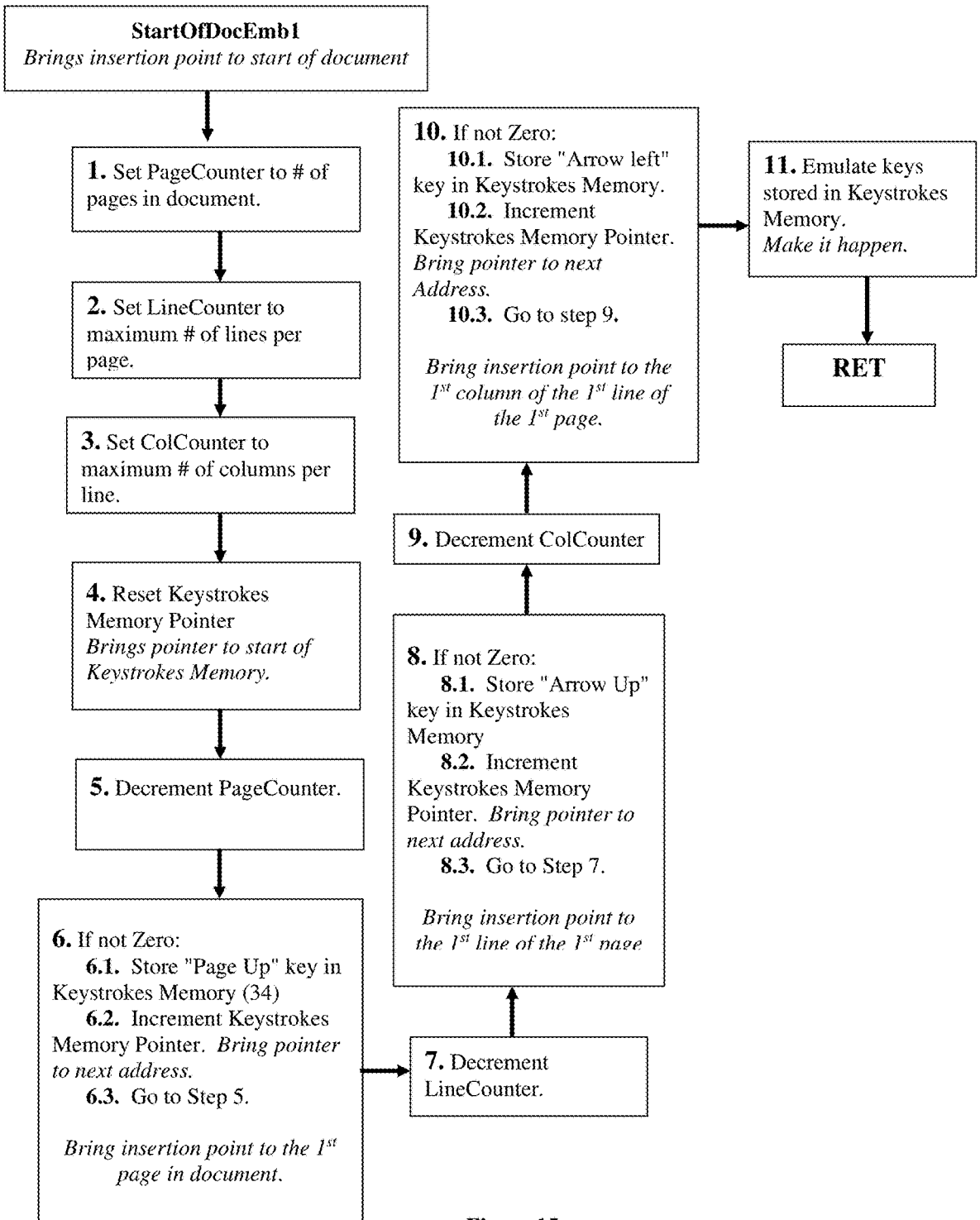
FIG. 15 through FIG. 20 are flow charts of subroutine H referenced in FIG. 12 for the first three symbol operations illustrated in FIG. 7 and according to the generic routines illustrated in FIG. 8.

The value in the "# of memory blocks" 33 indicates the number of memory blocks to be embedded. This element is set by the GMB functionality 30 and used in step 1.1 of the subroutines illustrated in FIG. 12 and FIG. 14. This counter is relevant when the handwritten information is embedded all at once after its conclusion, i.e., when the subroutines of FIG. 12 and FIG. 14 are called from the subroutine illustrated in FIG. 4; it is not relevant when they are called from the subroutine in FIG. 5; its value then is set to "One", since in this embodiment, memory blocks are embedded one at a time.

Embodiment One

Figure 11:
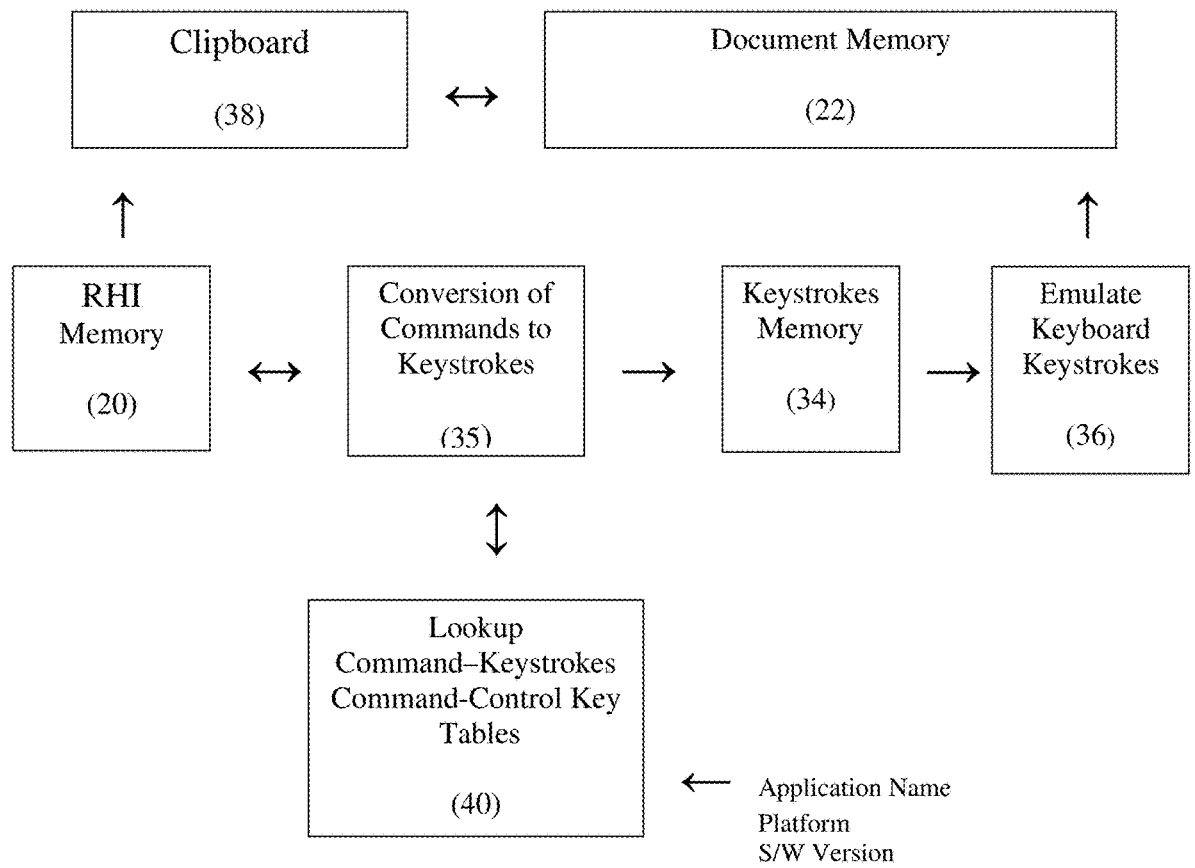
FIG. 11 is an example of data flow of the embedded element of FIG. 1 and FIG. 38 according to the first embodiment illustrating the emulating of keyboard keystrokes.

FIG. 11 is a block schematic diagram illustrating the basic functional blocks and data flow according to Embodiment One. The text of these and all other figures is largely self-explanatory and need not be repeated herein. Nevertheless, the text thereof may be the basis of claim language used in this document.

Figure 12:
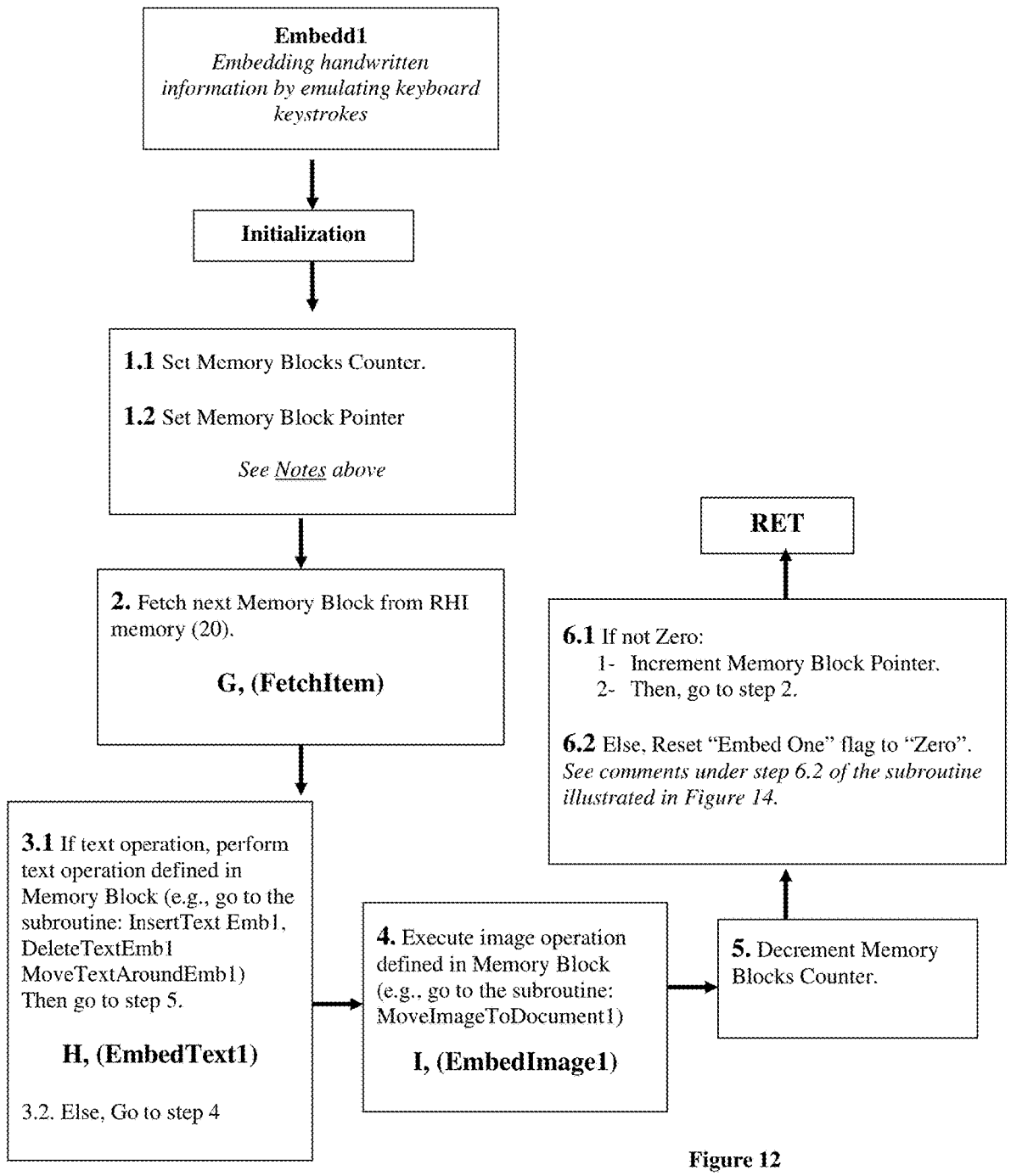
FIG. 12 is a flow chart representing subroutine D of FIG. 4 and FIG. 5 according to the first embodiment using techniques to emulate keyboard keystrokes.

FIG. 12 is a flow chart example of the Embed subroutine D referenced in FIG. 4 and FIG. 5 according to Embodiment One. The following is to be noted:

1—When this subroutine is called by the routine illustrated in FIG. 5, i.e., when handwritten information is embedded concurrently: 1) memory block counter (in step 1.1) is set to 1, and 2) memory block pointer is set to the location in which the current memory block to be embedded is located; this value is defined in memory block pointers element (31) of FIG. 9.

2—When this subroutine is called by the subroutine illustrated in FIG. 4, i.e., when all handwritten information is embedded after all handwritten information is concluded: 1) memory block pointer is set to the location of the first memory block to be embedded, and 2) memory block counter is set to the value in # of memory blocks element (33) of FIG. 9.

In operation, memory blocks 32 are fetched one at a time from the RHI memory 20 (G) and processed as follows:
Memory Blocks Related to Text Revisions (H):

Commands are converted to keystrokes (35) in the same sequence as the operation is performed via the keyboard and then stored in sequence in the keystrokes memory 34. The emulate keyboard element 36 uses this data to emulate the keyboard, such that the application reads the data as it was received from the keyboard, although this element may include additional keys not available via a keyboard such as the symbols illustrated in FIG. 7, e.g. for insertion of new text in MS Word document. The clipboard 38 can handle insertion of text, or text can be emulated as keyboard keystrokes. The lookup tables 40 determines the appropriate control key(s) and keystroke sequences for pre-recorded and built-in macros that, when emulated, execute the desired command. These keyboard keys are application-dependent and are a function of parameters, such as application name, software version and platform. Some control keys, such as the arrow keys, execute the same commands in a large array of applications; however, this assumption is excluded from the design in FIG. 11, i.e., by the inclusion of the lookup table command-keystrokes in element 40 of FIG. 11. Although, in the flow charts in FIGS. 15-20, it is assumed that the following control keys execute the same commands (in the applications that are included): "Page Up", "Page Down", "Arrow Up", "Arrow Down", "Arrow Right" and "Arrow Left" (For moving the insertion point within the document), "Shift+Arrow Right" (for selection of text), and "Delete" for deleting a selected text. Element 40 may include lookup tables for a large array of applications, although it could include tables for one or any desired number of applications.

Memory blocks related to new image (I):

The image (graphic) is first copied from the RHI memory 20, more specifically, based on information in the memory block 32, into the clipboard 38. Its designated location is located in the document memory 22 via a sequence of keystrokes, e.g., via the arrow keys. It is stored, i.e., pasted from the clipboard 38 by the keystrokes sequence: Cntr-V, into the document memory 22. If the command involves another operation, such as "Reduce Image Size" or "Move image", the image is first identified in the document memory 22 and selected. Then the operation is applied by the appropriate sequences of keystrokes.

Figure 8:
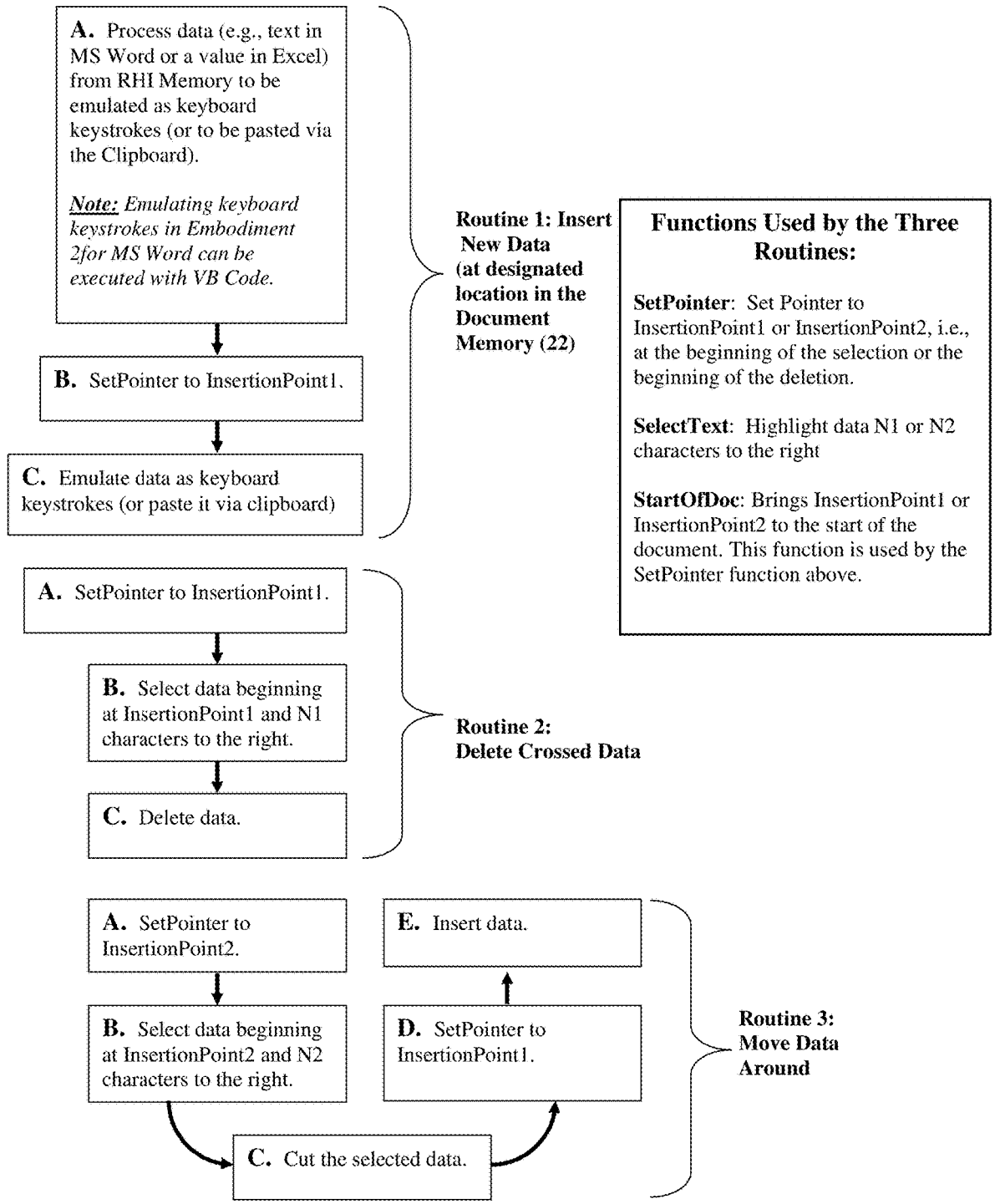
FIG. 8 is a listing that provides generic routines for each of the first 3 symbol operations illustrated in FIG. 7.
Figure 16:
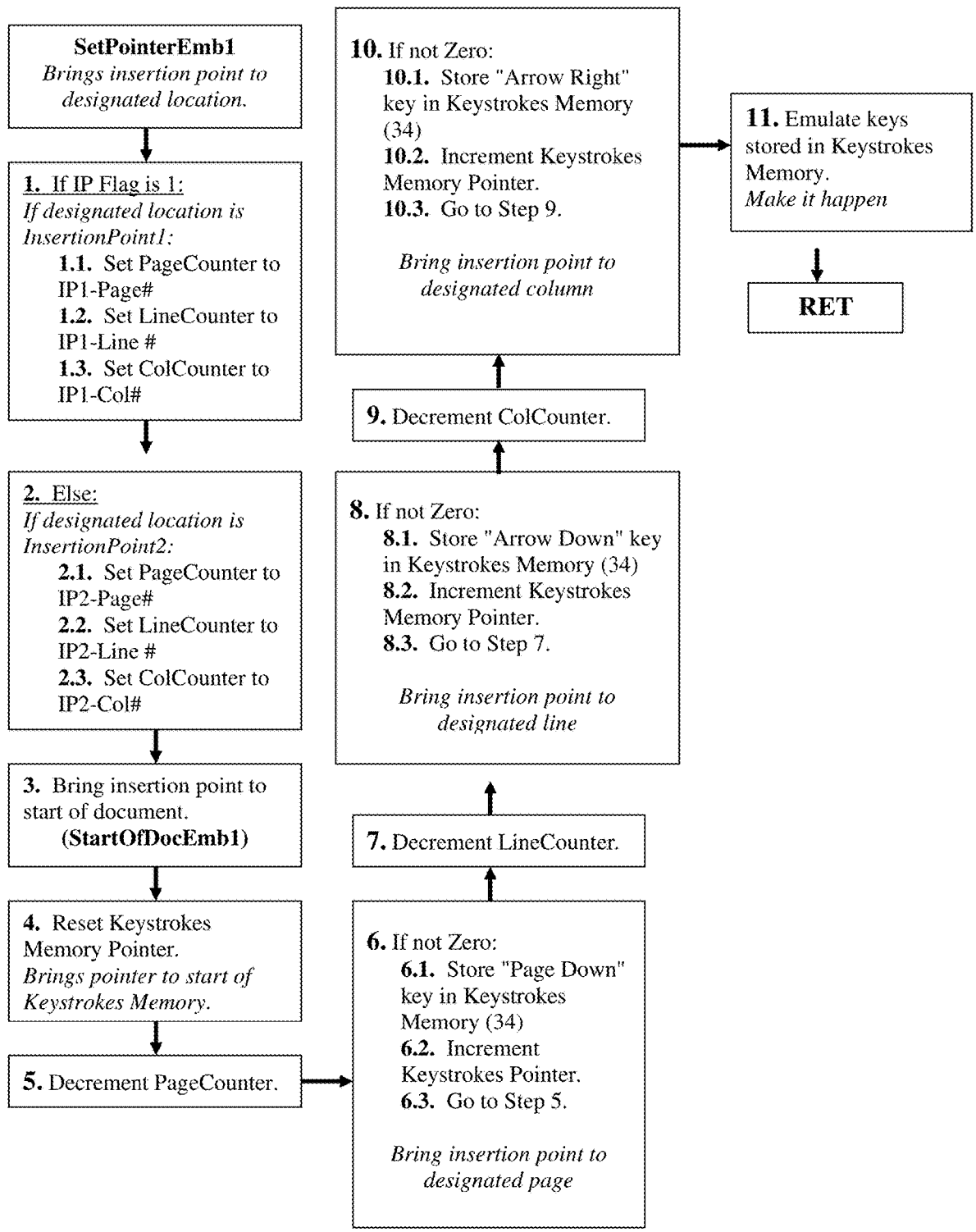
Figure 17:
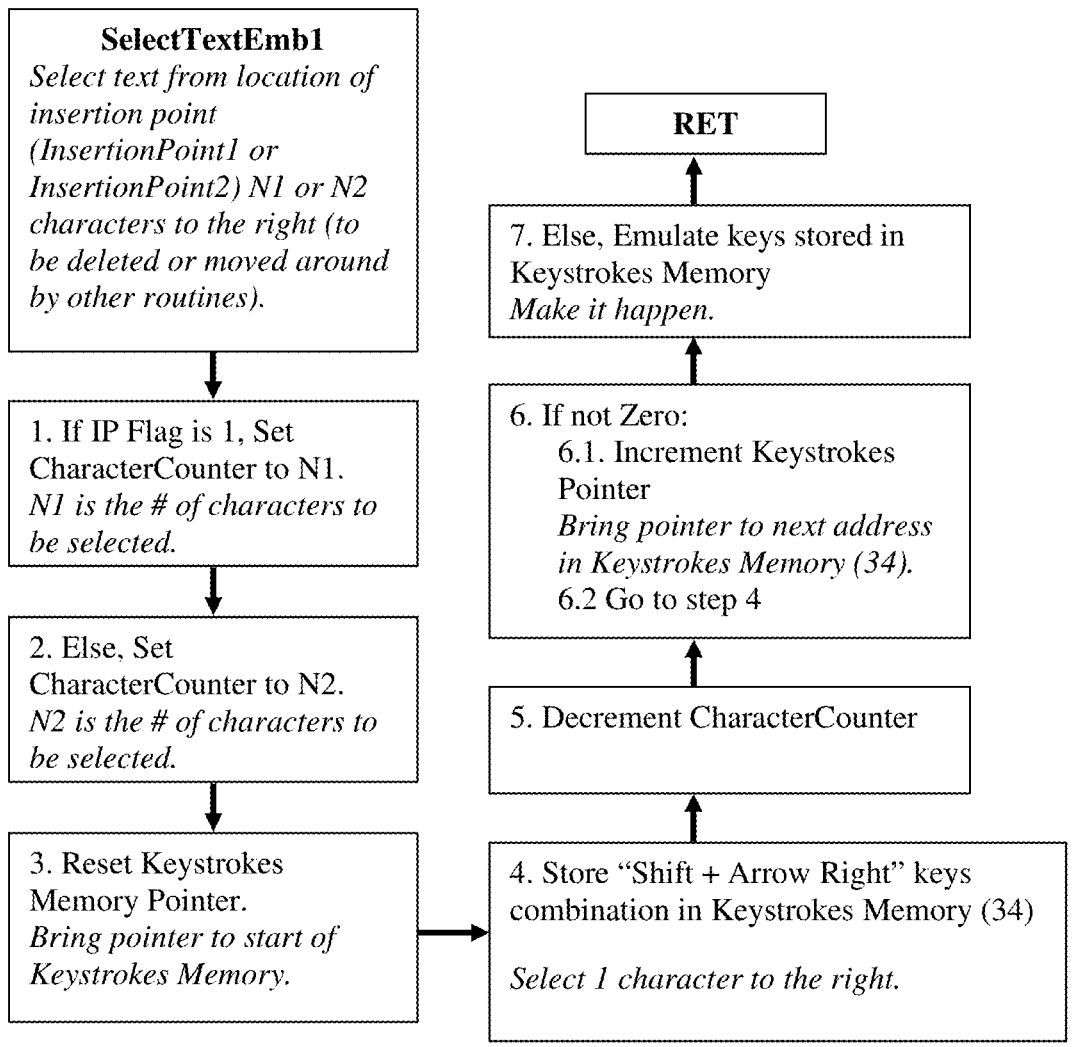
Figure 18:
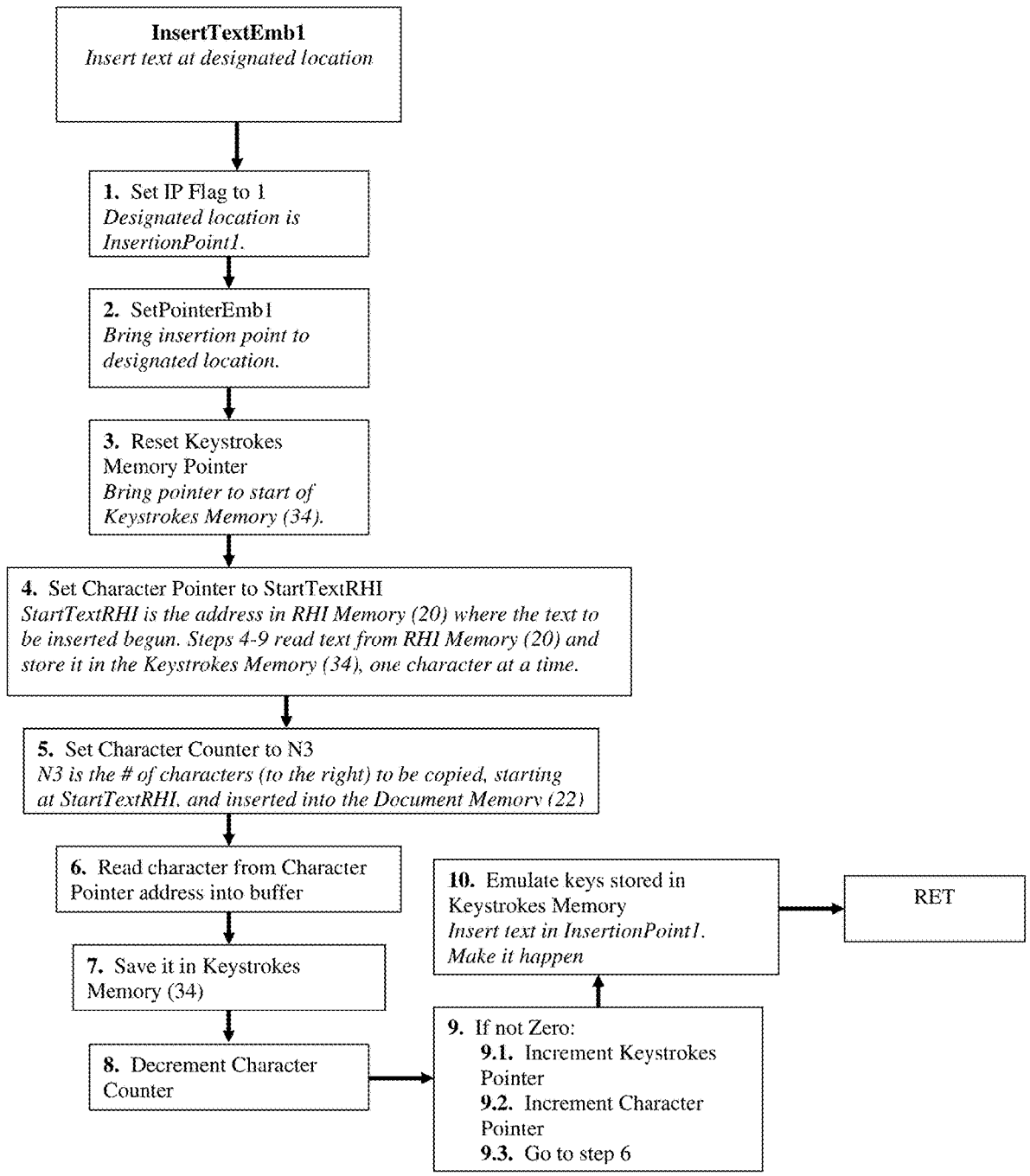
Figure 19:
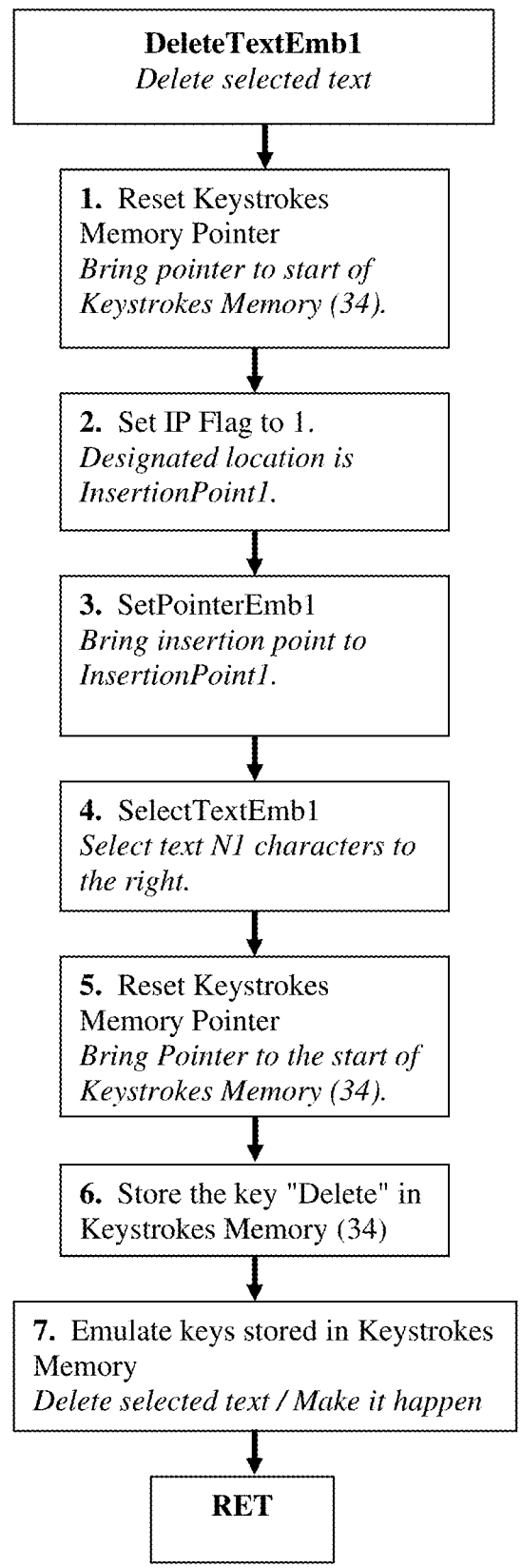
Figure 20:
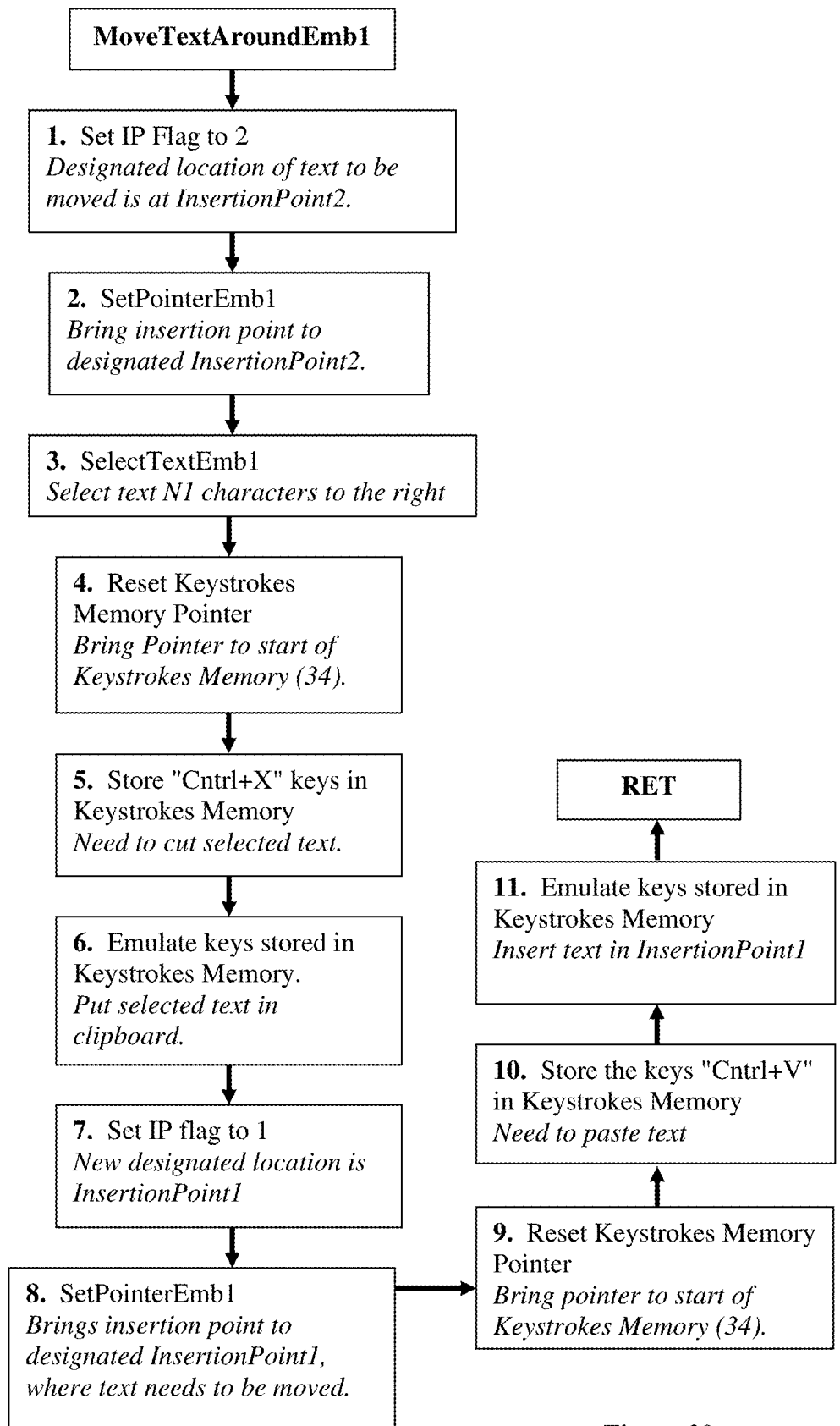

FIG. 15 through FIG. 20, the flow charts of the subroutines H referenced in FIG. 12, illustrate execution of the first three basic text revisions discussed in connection with and in FIG. 8 for MS Word and other applications. These flow charts are self-explanatory and are therefore not further described herein but are incorporated into this text. The following points are to be noted with reference to the function StartOfDocEmb1 illustrated in the flow chart of FIG. 15:

1—This function is called by the function SetPointeremb1, illustrated in FIG. 16.

2—Although, in many applications, the shortcut keys combination "Cntrl+Home" will bring the insertion point to the start of the document, including in MS Word, this routine was written to execute the same operation with the arrow keys.

3—Designated x-y locations in the document memory 22 in this subroutine are defined based on Page #, Line #& Column #; other subroutines are required when the x-y definition differs.

Figure 21:
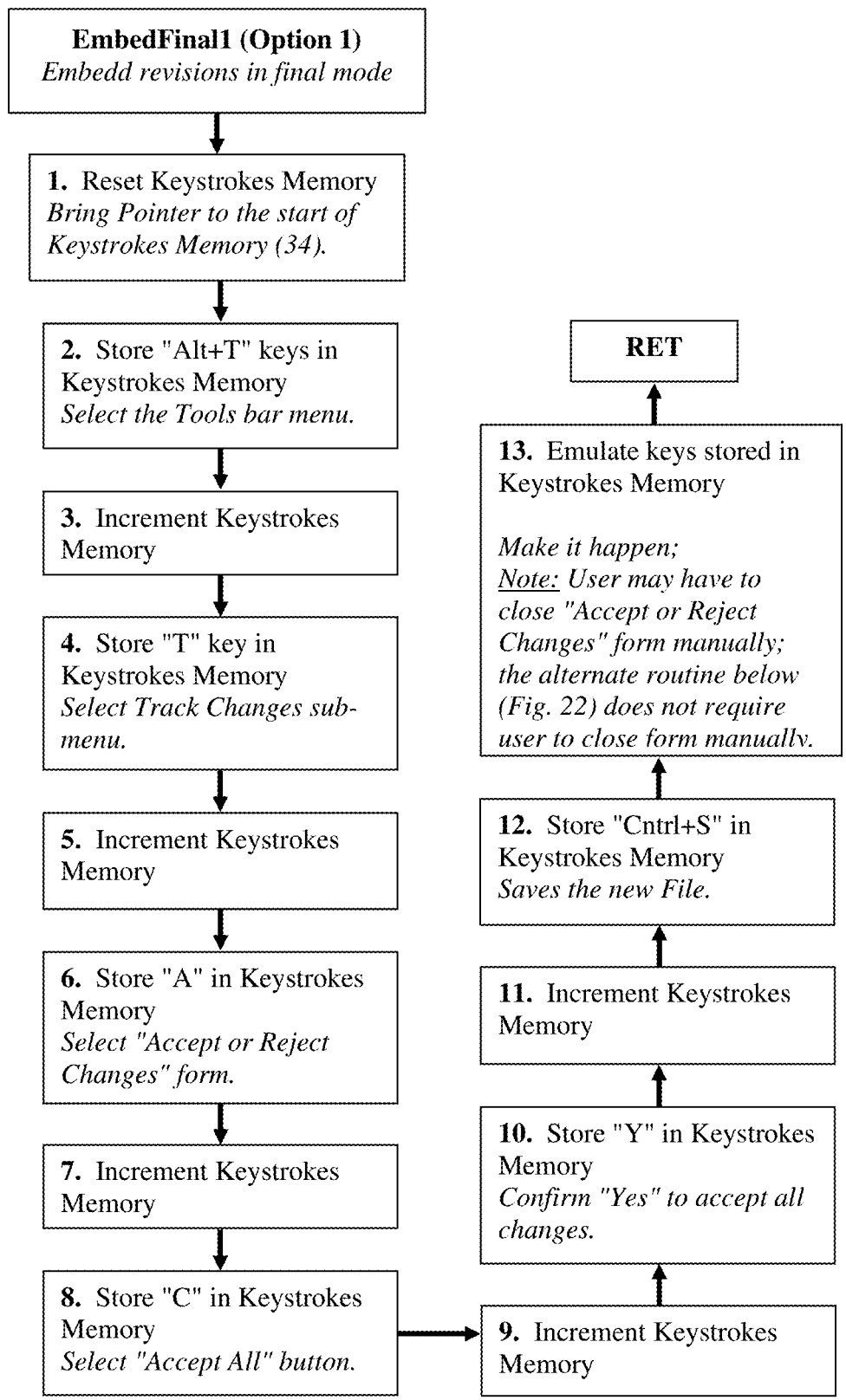
FIG. 21 is a flow chart of subroutine L referenced in FIG. 4 and FIG. 5 for concluding the embedding of revisions for a Microsoft® Word type document, according to the first embodiment using techniques to emulate keyboard keystrokes.
Figure 22:
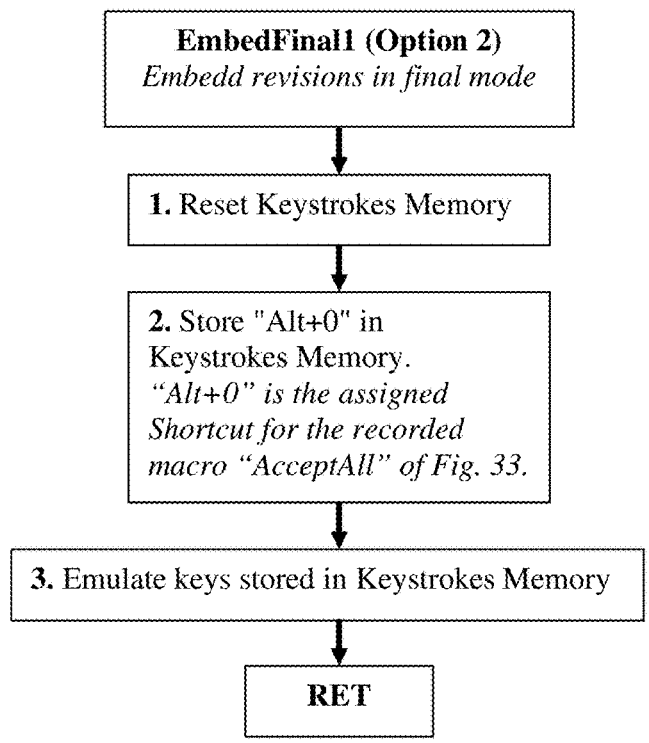
FIG. 22 is a flow chart of an alternative to subroutine L of FIG. 21 for concluding revisions for MS Word type document.
Figure 23:
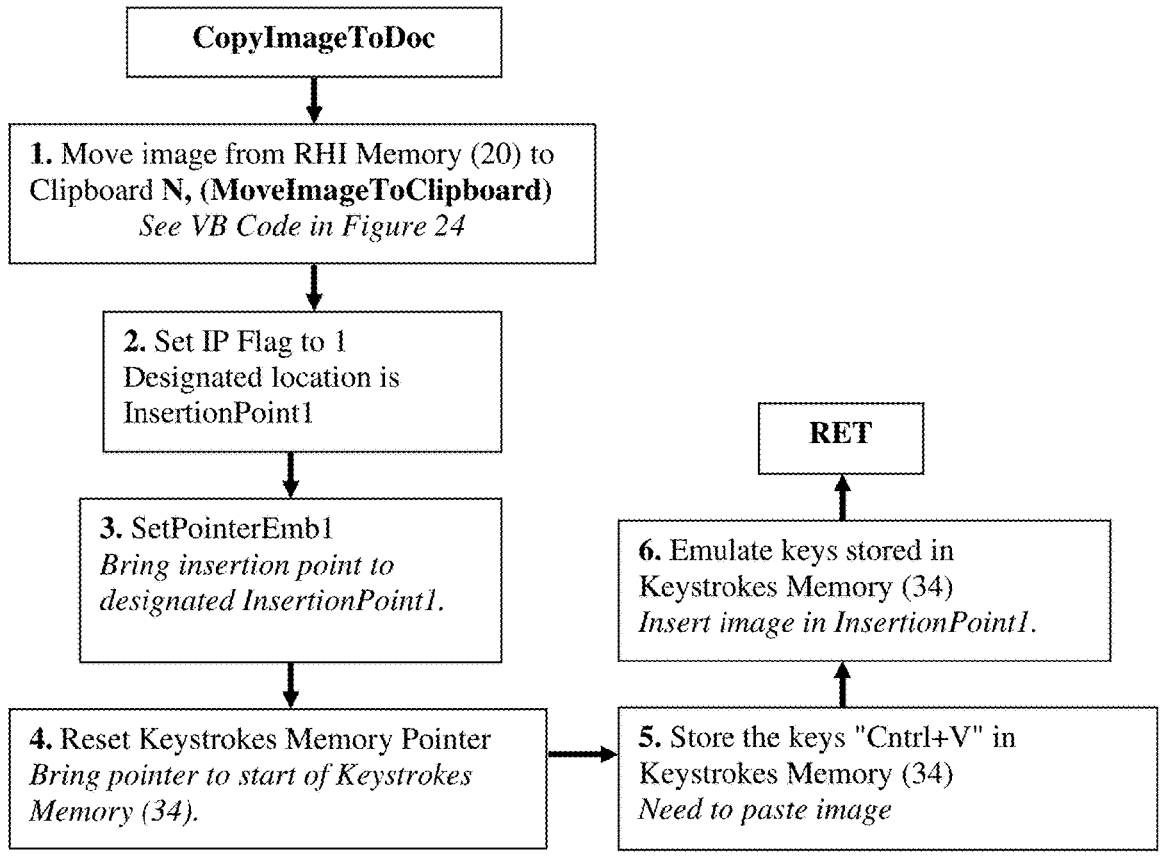
FIG. 23 is a sample flow chart of the subroutine I referenced in FIG. 12 for copying a recognized image from the RHI memory and placing it in the document memory via a clipboard.

Once all revisions are embedded, they are incorporated in final mode according to the flow chart illustrated in FIG. 21 or according to the flow chart illustrated in FIG. 22. In this implementation example, the Track Changes feature is used to "Accept All Changes" which embed all revisions as an integral part of the document.

As discussed above, a basic set of keystrokes sequences can be used to execute a basic set of commands for creation and revision of a document in a large array of applications. For example, the arrow keys can be used for jumping to a designated location in the document. When these keys are used in conjunction with the Shift key, a desired text or graphic object can be selected. Further, clipboard operations, i.e., the typical combined keystroke sequences Cntrl-X (for Cut), Cntrl-C (for Copy) and Cntrl-V (for Paste), can be used for basic edit/revision operations in many applications. It should be noted that, although a relatively small number of keyboard control keys are available, the design of an application at the OEM level is unlimited in this regard (see for example FIGS. 1-5). It should be noted that the same key combination could execute different commands. For example, deleting an item in QuarkXPress is achieved by the keystrokes Cntrl-K, where the keystrokes Cntrl-K in MS Word open a hyperlink. Therefore, the ConvertText1 function H determines the keyboard keystroke sequences for commands data stored in the RHI memory by accessing the lookup table command-keystrokes command-control-key 40 of FIG. 11.

The Use of Macros:

Execution of handwritten commands in applications such as Microsoft® Word, Excel and Word Perfect is enhanced with the use of macros. This is because sequences of keystrokes that can execute desired operations may simply be recorded and assigned to shortcut keys. Once the assigned shortcut key(s) are emulated, the recorded macro is executed. Below are some useful built-in macros for Microsoft® Word. For simplification, they are grouped based on the operations used to embed handwritten information (D).

Bringing the insertion point to a specific location in the document:
  CharRight, CharLeft, LineUp, LineDown, StartOfDocument, StartOfLine, EndOfDocument, EndOfLine, EditGoto, GotoNextPage, GotoNextSection, GotoPreviousPage, GotoPreviousSelection, GoBack
Selection:
  CharRightExtent, CharLeftExtend, LineDownExtend, LineUpExtend, ExtendSelection, EditFind, EditReplace
Operations on Selected Text/Graphic:
  EditClear, EditCopy, EditCut, EditPaste, CopyText, FontColors, FontSizeSelect, GrowFont, ShrinkFont, GrowFontOnePoint, ShrinkFontOnePoint, AllCaps, SmallCaps, Bold, Italic, Underline, UnderlineCoor, UnderlineStyle, WordUnderline, ChangeCase, Double-Strikethrough, Font, FontColor, FontSizeSelect
Displaying Revisions:
  Hidden, Magnifier, Highlight, DocAccent, CommaAccent, DottedUnderline, DoubleUnderline, Double-Strikethrough, HtmlSourceRefresh, InsertFieldChar (for enclosing a symbol for display), ViewMasterDocument, ViewPage, ViewZoom, ViewZoom100, ViewZoom200, ViewZoom75
Images
  InsertFrame, InsertObject, InsertPicture, EditCopyPicture, EditCopyAsPicture, EditObject, InsertDrawing, InsertFram, InsertHorizentlLine
File Operations:
  FileOpen, FileNew, FileNewDefault, DocClose, FileSave, SaveTemplate If a macro has no shortcut key assigned to it, it can be assigned by the following procedure:

Clicking on the Tools menu and selecting Customize causing the Customize form to appear. Clicking on the Keyboard button brings the dialog box Customize Keyboard. In the Categories box all the menus are listed, and in the Commands box all their associated commands are listed. Assigning a shortcut key to a specific macro can be simply done by selecting the desired built-in macro in the command box and pressing the desired shortcut keys.

Combinations of macros can be recorded as a new macro; the new macro runs whenever the sequence of keystrokes that is assigned to it is emulated. In the same manner, a macro in combination with keystrokes, e.g., of arrow keys, may be recorded as a new macro. It should be noted that recording of some sequences as a macro may not be permitted.

The use of macros, as well as the assignment of a sequence of keys to macros can also be done in other word processors, such as WordPerfect.

Figure 36:
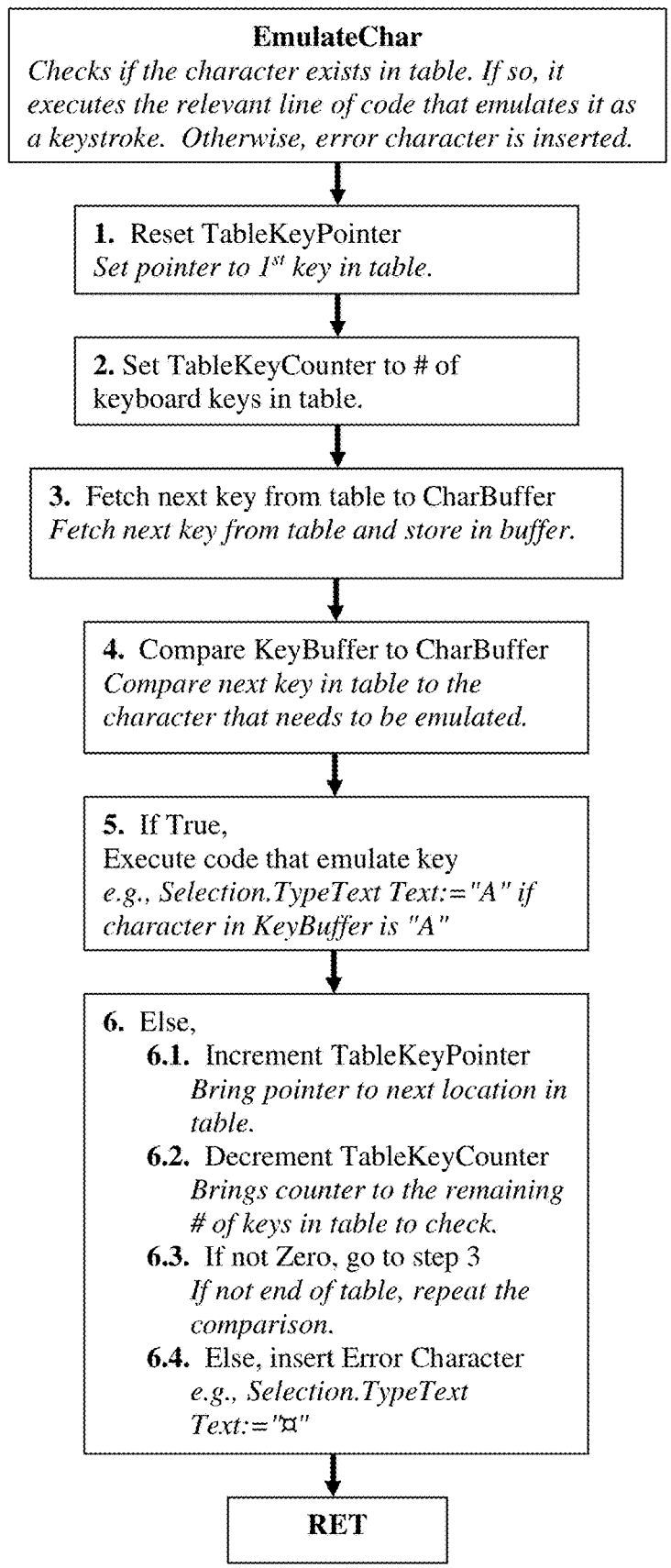
FIG. 36 is a flow chart of a process for checking if a handwritten character to be emulated as a keyboard keystroke exists in table and thus can be emulated and, if so, for executing the relevant line of code that emulates the keystroke.
Figure 37:
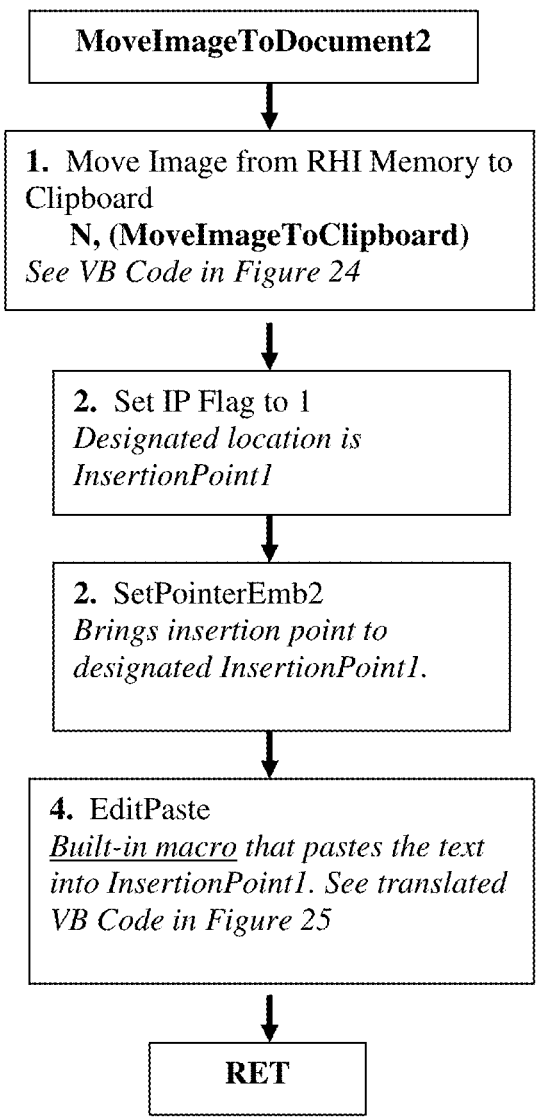
FIG. 37 is a flow chart of an example for subroutine K in FIG. 14 for copying a recognized image from RHI memory and placing it in the document memory via the clipboard.

Emulating a keyboard key 36 in applications with built-in programming capability, such as Microsoft® Word, can be achieved by running code that is equivalent to pressing that keyboard key. Referring to FIG. 35 and FIG. 36, details of this operation are presented. The text thereof is incorporated herein by reference. Otherwise, emulating the keyboard is a function that can be performed in conjunction with Windows or other computer operating systems.

Embodiment Two

Figure 13:
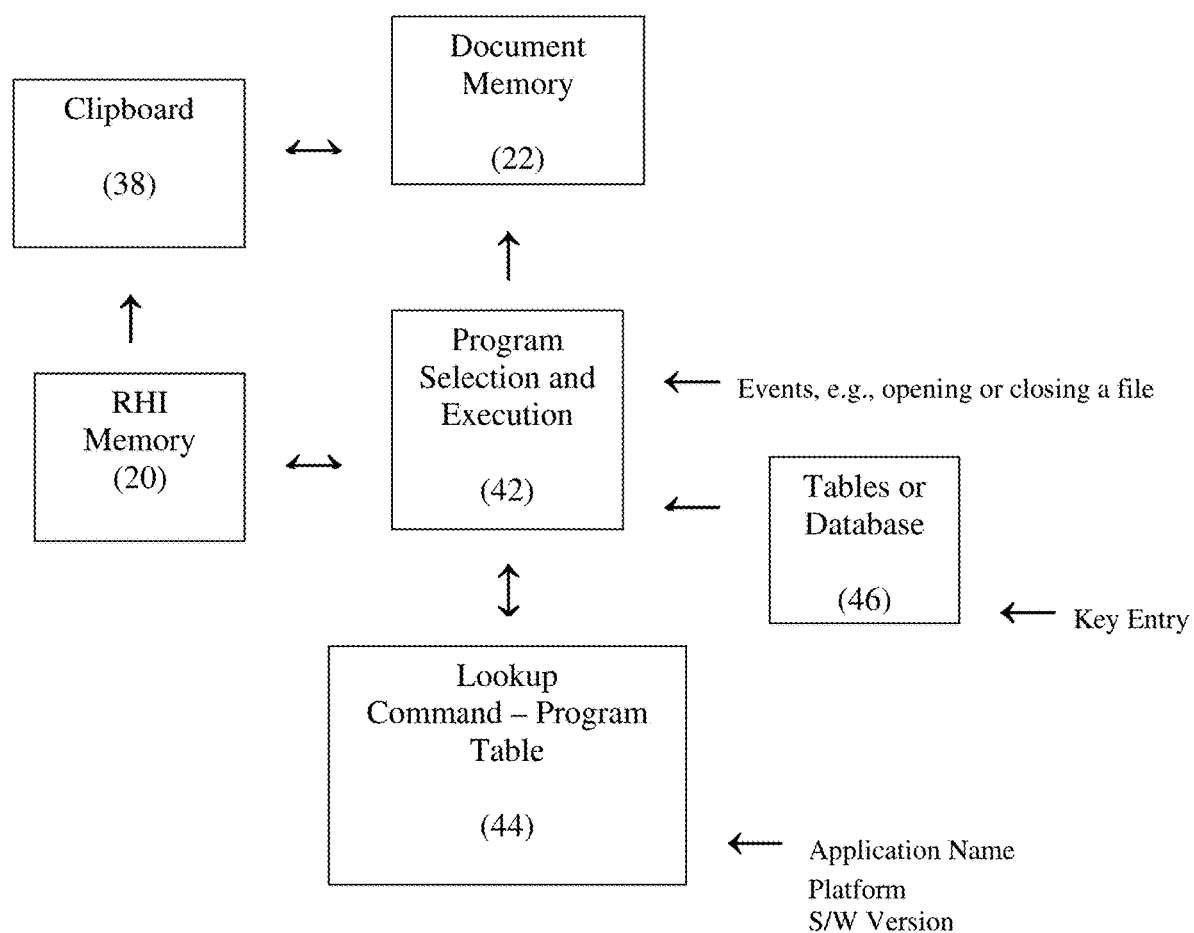
FIG. 13 is an example of data flow of the embedded element of FIG. 1 and FIG. 38 according to the second embodiment illustrating the running of programs.

FIG. 13 is a block schematic diagram illustrating the basic functional blocks and data flow according to Embodiment Two. FIG. 14 is a flow chart example of the Embed function D referenced in FIG. 4 and in FIG. 5 according to Embodiment Two. Memory blocks are fetched from the RHI memory 20 (G) and processed. Text of these figures is incorporated herein by reference. The following should be noted with FIG. 14:

1. When this subroutine is called by the routine illustrated in FIG. 5, i.e., when handwritten information is embedded concurrently: 1) memory block counter (in step 1.1 below) is set to 1, and 2) memory block pointer is set to the location in which the current memory block to be embedded is located; this value is defined in memory block pointers element (31) of FIG. 9.

2. When this subroutine is called by the subroutine illustrated in FIG. 4, i.e., when all handwritten information is embedded after all handwritten information is concluded: 1) memory block Pointer is set to the location of the first memory block to be embedded, and 2) memory block counter is set to the value in # of memory blocks element (33) of FIG. 9.

A set of programs executes the commands defined in the memory blocks 32 of FIG. 9, one at a time. FIG. 26 through FIG. 32, with text incorporated herein by reference, are flow charts of the subroutine J referenced in FIG. 14. The programs depicted execute the first three basic text revisions discussed in FIG. 8 for MS Word. These sub-routines are self-explanatory and are not further explained here, but the text is incorporated by reference.

FIG. 33 is the code in Visual Basic that embeds the information in Final Mode, i.e., Accept All Changes" of the Track Changes, which embeds all revisions to be an integral part of the document.

Each of the macros referenced in the flow charts of FIG. 26 through FIG. 32 needs to be translated into executable code such as VB Script or Visual Basic code. If there is uncertainty as to which method or property to use, the macro recorder typically can translate the recorded actions into code. The translated code for these macros to Visual Basic is illustrated in FIG. 25.

The clipboard 38 can handle the insertion of text into the document memory 22, or text can be emulated as keyboard keystrokes; refer to FIGS. 35-36 for details. As in Embodiment One, an image operation (K) such as copying an image from the RHI memory 20 to the document memory 22 is executed as follow: an image is first copied from the RHI memory 20 into the clipboard 3/8. Its designated location is located in the document memory 22. Then it is pasted via the clipboard 38 into the document memory 22.

The selection of a program by the program selection and execution element 42 is a function of the command, the application, software version, platform, and the like. Therefore, the ConvertText2 J selects a specific program for command data that are stored in the RHI memory 20 by accessing the lookup command-programs table 44. Programs may also be initiated by events, e.g., when opening or closing a file, or by a key entry, e.g., when bringing the insertion point to a specific cell of a spreadsheet by pressing the Tab key.

In Microsoft® Word, the Visual Basic Editor can be used to create very flexible, powerful macros that include Visual Basic instructions that cannot be recorded from the keyboard. The Visual Basic Editor provides additional assistance, such as reference information about objects and properties or an aspect of its behaviour.

Working with the Comment Feature as an Insertion Mechanism

Incorporating the handwritten revisions into the document through the Comment feature may be beneficial in cases where the revisions are mainly insertion of new text into designated locations, or when plurality of revisions in various designated locations in the document need to be indexed to simplify future access to revisions; this can be particularly useful for large documents under review by multiple parties. Each comment can be further loaded into a sub-document which is referenced by a comment #(or a flag) in the main document. The Comments mode can also work in conjunction with Track Changes mode.

For Embodiment One: Insert Annotation can be achieved by emulating the keystrokes sequence Alt+Ctrl+M. The Visual Basic translated code for the recorded macro with this sequence is "Selection.Comments.Add Range: =Selection.Range", which could be used to achieve the same result in embodiment 2.

Once in Comment mode, revisions in the RHI memory 20 can be incorporated into the document memory 22 as comments. If the text includes revisions, the Track Changes mode can be invoked prior to insertion of text into a comment pane.

Useful Built-In Macros for Use in the Comment Mode of MS Word:

GotoCommentScope;highlight the text associated with a comment reference mark
GotoNextComment,;jump to the next comment in the active document
GotoPreviousComment;jump to the previous comment in the active document
InsertAnnotation;insert comment
DeleteAnnotation;delete comment
ViewAnnotation;show or hide the comment pane The above macros can be used in Embodiment One by emulating their shortcut keys or in Embodiment Two with their translated code in Visual Basic. FIG. 34 provides the translated Visual Basic code for each of these macros.

Spreadsheets, Forms and Tables

Embedding handwritten information in a cell of a spreadsheet or a field in a form or a table can either be for new information or it could be for revising an existing data, e.g., deletion, moving data between cells or for adding new data in a field. Either way, after the handwritten information is embedded in the document memory 22, it can cause the application, e.g., Excel, to change parameters within the document memory 22, e.g., when the embedded information in a cell is a parameter of a formula in a spreadsheet which when embedded changes the output of the formula, or when it is a price of an item in a Sales Order which when embedded changes the subtotal of the Sales Order; if desired, these new parameters may be read by the embed functionality 24 and displayed on the display 25 to provide the user with useful information such as new subtotals, spell check output, stock status of an item, e.g., as a sales order is filed in.

As discussed, the x-y location in the document memory 22 for a word processing type documents can, for example, be defined by page #, line # and character # (see FIG. 10, x-y locations for InsertionPoint1 and InsertionPoint2). Similarly, the x-y location in the document memory 22 for a form, table or a spreadsheet can for example be defined based on the location of a cell/field within the document, e.g., column #, Row # and Page # for a spreadsheet. Alternatively, it can be defined based on number of Tabs and/or Arrow keys from a given known location. For example, a field in a Sales Order in the accounting application QuickBooks can be defined based on the number of Tab from the first field, i.e., "customer; job", in the form.

Figure 26:
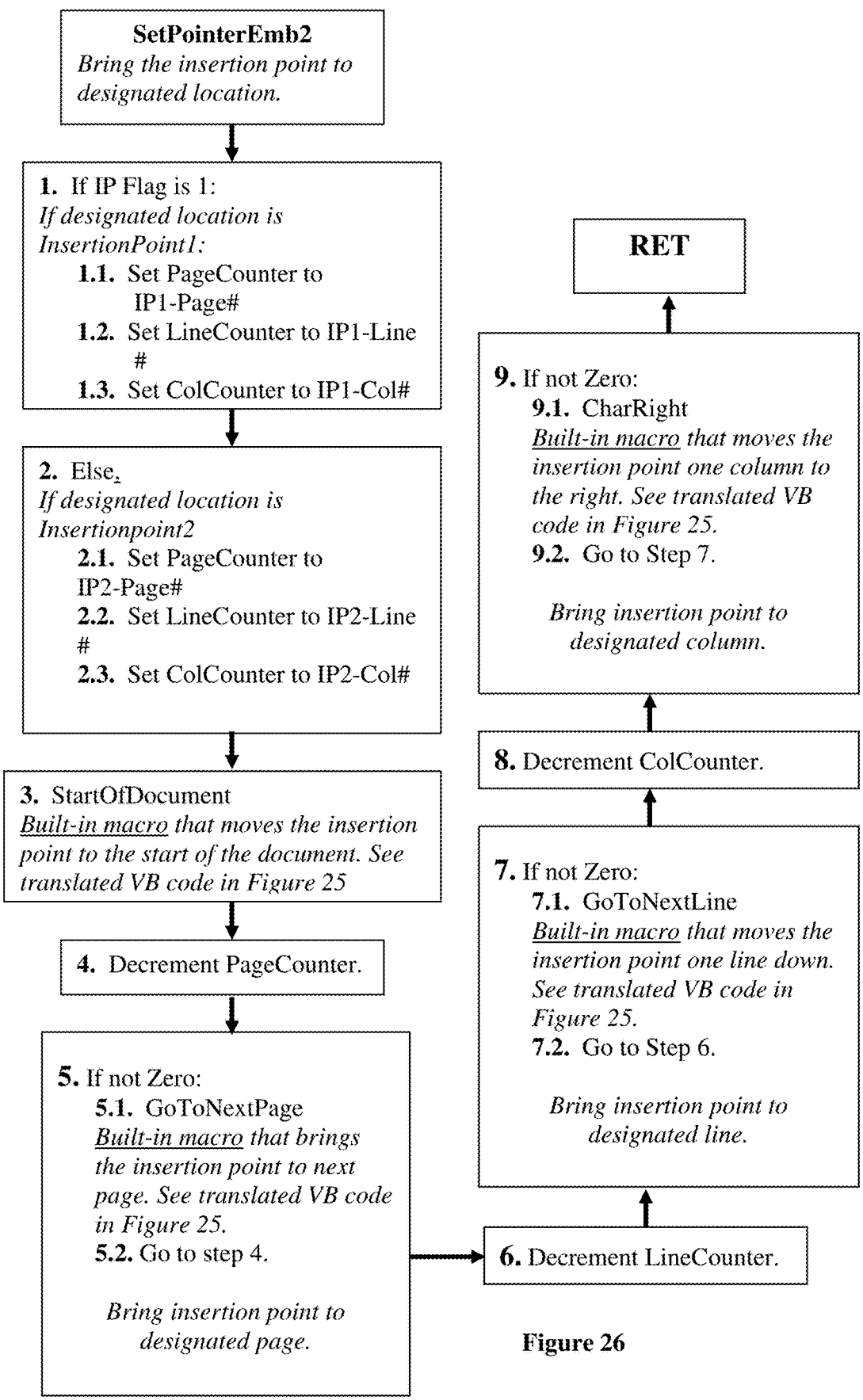
FIG. 26 through FIG. 32 are flow charts of subroutine J referenced in FIG. 14 for the first three symbol operations illustrated in FIG. 7 and according to the generic routines illustrated in FIG. 8 for MS Word.
Figure 27:
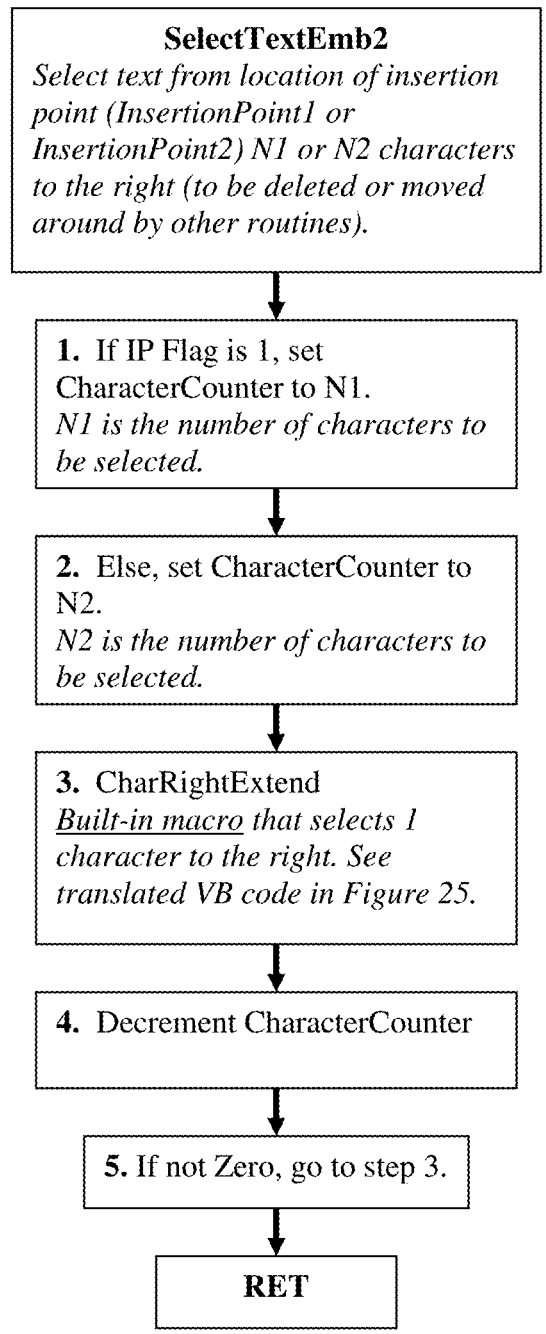
Figure 28:
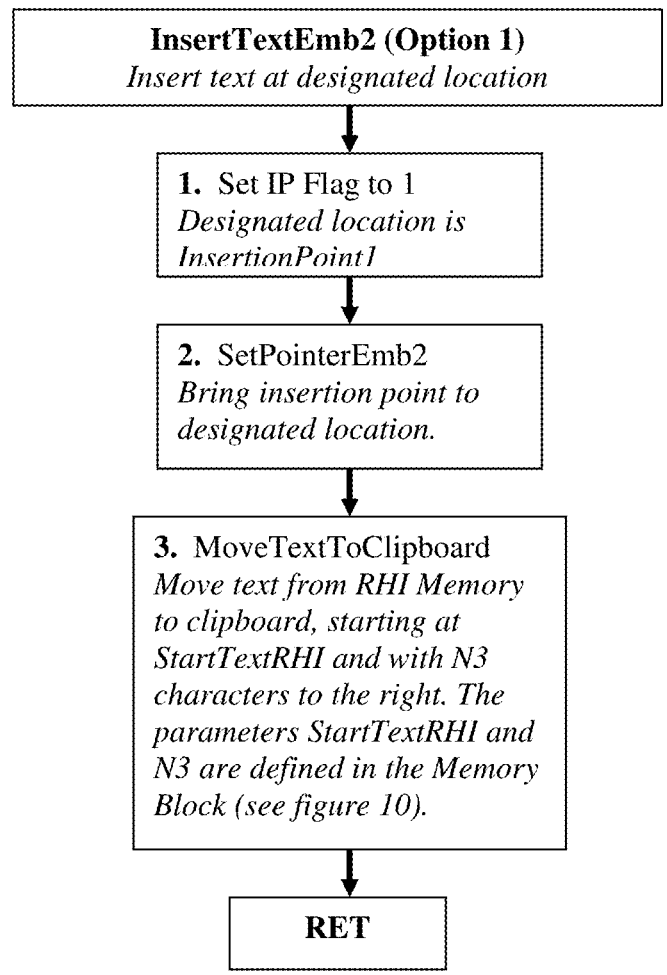
Figure 29:
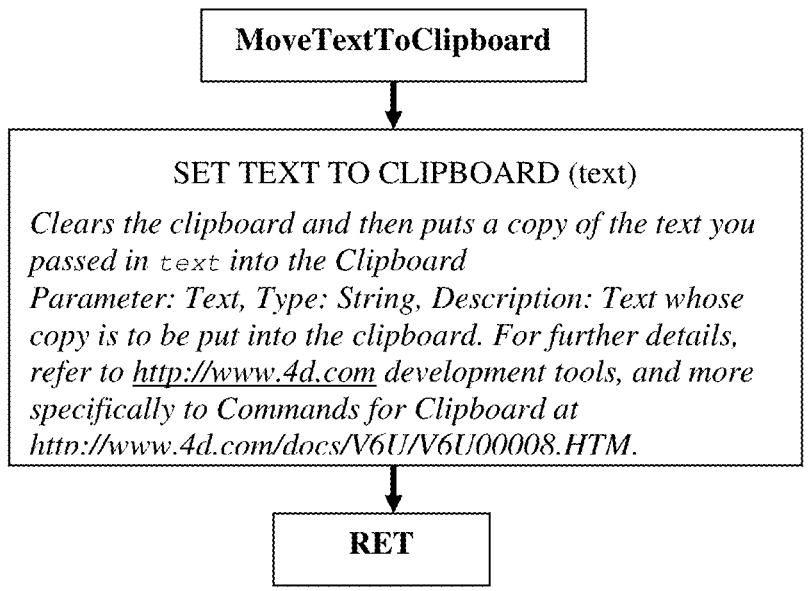
Figure 30:
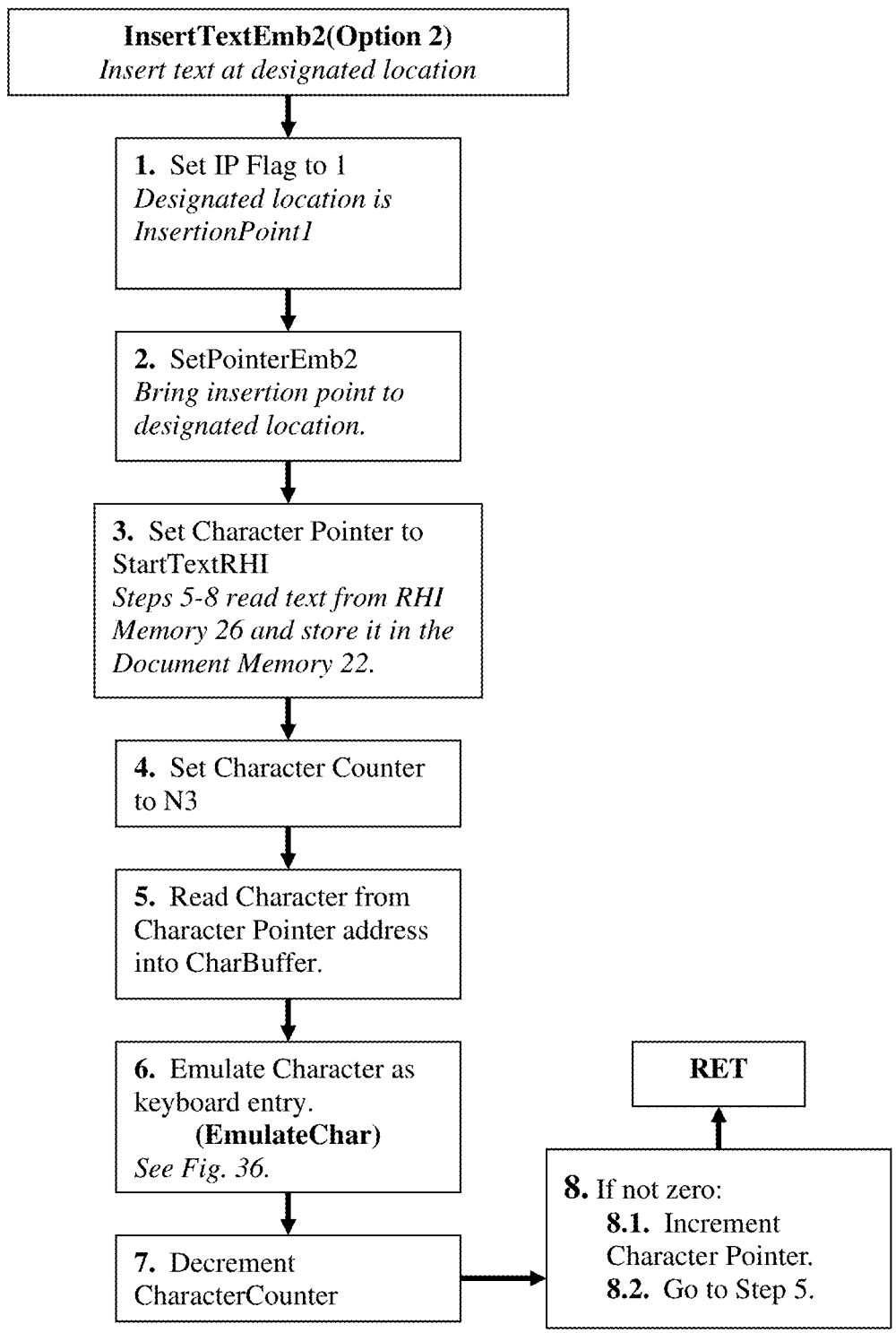
Figure 31:
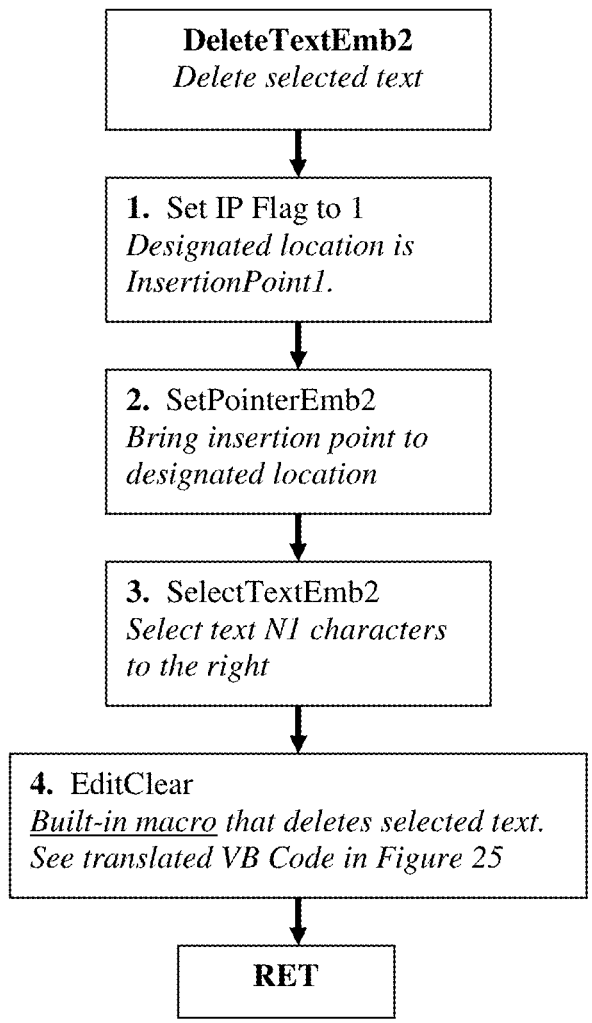
Figure 32:
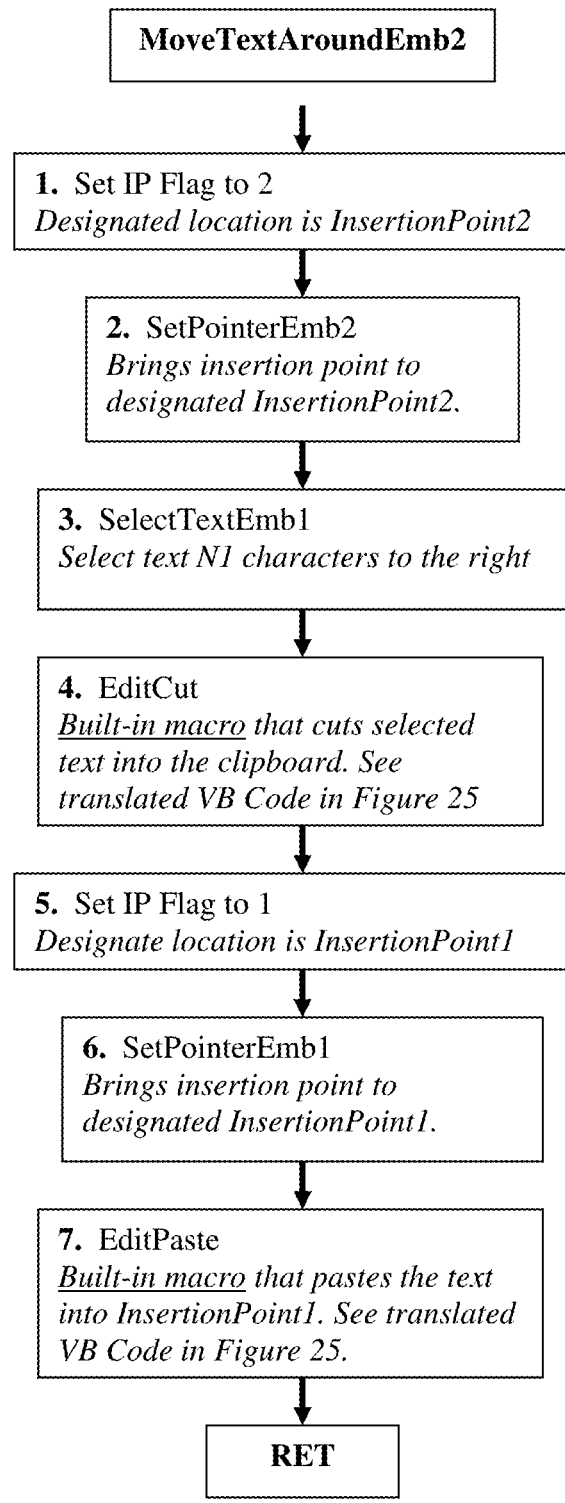

The embed functionality can read the x-y information (see step 2 in flow charts referenced in FIGS. 12 and 14), and then bring the insertion point to the desired location according to Embodiment One (see example flow charts referenced in FIGS. 15-16), or according to Embodiment Two (see example flow charts for MS Word referenced in FIG. 26). Then the handwritten information can be embedded. For example, for a Sales Order in QuickBooks, emulating the keyboard keys combination "Cntrl+J" will bring the insertion point to the first field, customer; job; then, emulating three Tab keys will bring the insertion point to the "Date" field, or emulating eight Tab keys will bring the insertion point to the field of the first "Item Code".

The software application QuickBooks has no macros or programming capabilities. Forms, e.g., a Sales Order, a Bill, or a Purchase Order, and Lists, e.g., a Chart of Accounts and a customer; job list, in QuickBooks can either be invoked via pull-down menus via the toolbar, or via a shortcut key. Therefore, Embodiment One could be used to emulate keyboard keystrokes to invoke specific form or a specific list. For example, invoking a new invoice can be achieved by emulating the keyboard keys combination "Cntrl+N" and invoking the chart of accounts list can be achieved by emulating the keyboard keys combination "Cntrl+A". Invoking a Sales Order, which has no associated shortcut key defined, can be achieved by emulating the following keyboard keystrokes:

1. "Alt+C"; brings the pull-down menu from the toolbar menu related to "Customers"
2. "Alt+O"; Invokes a new sales order form Once a form is invoked, the insertion point can be brought to the specified x-y location, and then the recognized handwritten information, i.e., command(s) and associated text, can be embedded.

As far as the user is concerned, the user can either write the information, e.g., for posting a bill, on a pre-set form, e.g., in conjunction with the digitizing pad 12 or touch screen 11, or specify commands related to the operation desired. Parameters, such as the type of entry (a form, or a command), the order for entering commands, and the setup of the form are selected by the user in step 1 "Document Type and Preferences Setup" (A) illustrated in FIG. 4 and in FIG. 5.

For example, the following sequence handwritten commands will post a bill for purchase of office supply at OfficeMax on Mar. 2, 2005, for a total of $45. The parameter "office supply", which is the account associated with the purchase, may be omitted if the vendor OfficeMax has already been set up in QuickBooks. Information can be read from the document memory 22 and based on this information the embed functionality 24 can determine if the account has previously been set up or not, and report the result on the display 25. This, for example can be achieved by attempting to cut information from the "Account" field, i.e., via the clipboard, assuming the account is already set up. The data in the clipboard can be compared with the expected results, and based on that, generating output for the display.

Bill
Mar. 2, 2005
OfficeMax
$45
Office supply

In applications such as Excel, either or both Embodiment One and Embodiment Two can be used to bring the insertion point to the desired location and to embed recognized handwritten information.

APPLICATIONS EXAMPLES

Wireless Pad

A wireless pad can be used for transmission of an integrated document to a computer and optionally receiving back information that is related to the transmitted information. It can be used, for example, in the following scenarios:
1—Filling up a form at a doctor office
2—Filling up an airway bill for shipping a package
3—Filing up an application for a driver license at the DMV
4—Serving a customer at a car rental agency or at a retail store
5—Taking notes at a crime scene or at an accident site
6—Order taking off-site, e.g., at conventions Handwritten information can be inserted in designated locations in a pre-designed document such an order form, an application, a table or an invoice, on top of a digitizing pad 12 or using a touch screen 11 or the like. The pre-designed form is stored in a remote or a close-by computer. The handwritten information can be transmitted via a wireless link concurrently to a receiving computer. The receiving computer will recognize the handwritten information, interpret it and store it in a machine code into the pre-designed document. Optionally, the receiving computer will prepare a response to and transmit it back to the transmitting pad or touch screen, e.g., to assist the user.

For example, information filled out on the pad 12 in an order form at a convention can be transmitted to an accounting program or a database residing in a close-by or remote server computer as the information is written. In turn, the program can check the status of an item, such as cost, price and stock status, and transmit information in real-time to assist the order taker. When the order taker indicates that the order has been completed, a sales order or an invoice can be posted in the remote server computer.

Figure 39:
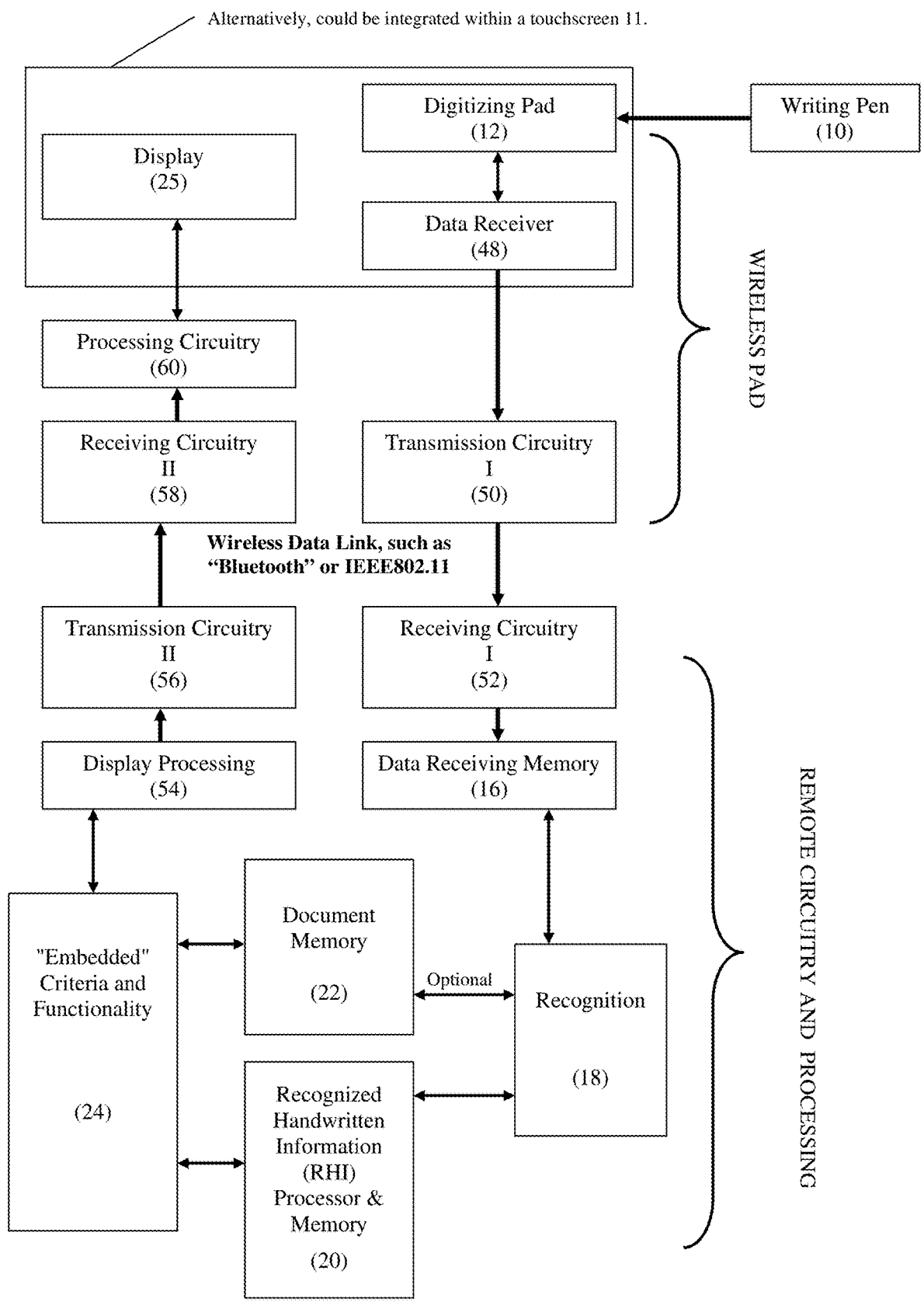
FIG. 39 is a schematic diagram of an integrated document editor made with the use of a wireless pad.

FIG. 39 is a schematic diagram of an Integrated Document Editor shown in connection with the use of a Wireless Pad. The Wireless Pad comprises a digitizing pad 12, display 25, data receiver 48, processing circuitry 60, transmission circuitry I 50, and receiving circuitry II 58. The digitizing pad receives tactile positional input from a writing pen 10. The transmission circuitry I 50 takes data from the digitizing pad 12 via the data receiver 48 and supplies it to receiving circuitry I 52 of a remote processing unit. The receiving circuitry II 58 captures information from display processing 54 via transmission circuitry II 56 of the remote circuitry and supplies it to processing circuitry 60 for the display 25. The receiving memory I 52 communicates with the data receiving memory 16 which interacts with the recognition module 18 as previously explained, which in turn interacts with the RHI processor and memory 20 and the document memory 22 as previously explained. The embedded criteria and functionality element 24 interacts with the elements 20 and 22 to modify the subject electronic document and communicate output to the display processing unit 54.

Remote Communication

In a communication between two or more parties at different locations, handwritten information can be incorporated into a document, information can be recognized and converted into machine-readable text and image and incorporated into the document as "For Review". As discussed in connection with FIG. 6, as an exemplary embodiment for MS Word type document, "For review" information can be displayed in a number of ways. The "For Review" document can then be sent to one or more receiving parties, e.g., via email. The receiving party may approve portions or all of the revisions and/or revise further in handwriting, as the sender has done, via the digitized pad 12, via the touch screen 11 or via a wireless pad. The document can then be sent again "for review". This process may continue until all revisions are incorporated/concluded.

Revisions Via Fax

Handwritten information on a page, with or without machine-printed information, can be sent via fax, and the receiving facsimile machine enhanced as a Multiple Function Device (printer/fax, character recognizing scanner) can convert the document into a machine-readable text/image for a designated application, e.g., Microsoft® Word. Revisions vs. original information can be distinguished and converted accordingly based on designated revision areas marked on the page, e.g., by underlining or circling the revisions. Then it can be sent, e.g., via email, "For Review" as discussed above, under "Remote Communication".

Integrated Document Editor with the Use of a Cell Phone

Handwritten information can be entered on a digitizing pad 12 whereby locations on the digitizing pad 12 correspond to locations on the cell phone display. Alternatively, handwritten information can be entered on a touch screen that is used as a digitizing pad as well as a display, i.e., similar to the touch screen 11 referenced in FIG. 38. Handwritten information can either be new information, or revision of an existing stored information, e.g., a phone number, contact name, to do list, calendar events, an image photo, etc. Handwritten information can be recognized by the recognition element 18, processed by the RHI element 20 and then embedded into the document memory 22, e.g., in a specific memory location of a specific contact information. Embedding the handwritten information can, for example, be achieved by directly accessing locations in the document memory, e.g., specific contact name; however, the method by which recognized handwritten information is embedded can be determined at the OEM level by the manufacturer of the phone.

Use of the Integrated Document Editor in Authentication of Handwritten Information A unique representation such as a signature, a stamp, a finger print or any other drawing pattern can be pre-set and fed into the recognition element 18 as units that are part of a vocabulary or as a new character. When handwritten information is recognized as one of these pre-set units to be placed in a, e.g., specific expected x-y location of the digitizing pad 12 (FIG. 1) or touch screen 11 (FIG. 38), an authentication or part of an authentication will pass. The authentication will fail if there is no match between the recognized unit and the pre-set expected unit. This can be useful for authentication of a document, e.g., an email, a ballot or a form, to ensure that the writer/sender of the document is the intended sender. Other examples are for authentication and access of bank information or credit reports. The unique pre-set patterns can be either or both: 1)

stored in a specific platform belonging to the user and/or 2) stored in a remote database location. It should be noted that the unique pre-set patterns, e.g., a signature, do not have to be disclosed in the document. For example, when an authentication of a signature passes, the embedded functionality 24 will, for example embed the word "OK" in the signature line/field of the document.

Computing devices and methods discussing automatic computation of document locations at which to apply commands communicated by user input on a touch screen of a computing device are discussed in US patent application no. 16,152,244 which is a continuation of U.S. Pat. No. 10,133, 477 and in U.S. patent application Ser. No. 16/158,235 which is a continuation of U.S. Pat. No. 10,169,301.

The disclosed embodiments further relate to simplified user interaction with displayed representations of one or more graphic objects. The simplified user interaction may utilize, a touch screen of a computing device, and may include using gestures to indicate desired change(s) in one or more parameters of the graphic objects. The parameters may include one or more of a line length, a line angle, an arc radius, a size, a surface area, or any other parameter of a graphic object, stored in memory of the computing device or computed by functions of the computing device. Changes in these one or more parameters are computed by functions of the computing device based on the user interaction on the touch screen, and these computed changes may be used by other functions of the computing device to compute changes in other graphic objects.

As mentioned above, the document could be any kind of electronic file, word processing document, spreadsheet, web page, form, e-mail, database, table, template, chart, graph, image, objects, or any portion of these types of documents, such as a block of text or a unit of data. It should be understood that the document or file may be utilized in any suitable application, including but not limited to, computer aided design, gaming, and educational materials.

It is an object of the disclosed embodiments to allow users to quickly edit Computer Aided Design (CAD) drawings on the go or on site following a short interactive on-screen tutorial; there is no need for skills/expertise such as those needed in operating CAD drawings applications, for example, AutoCAD® software. In addition, the disclosed embodiments may provide a significant time saving by providing simpler and faster user interaction, while revision iterations with professionals are avoided. Typical users may include, but not limited to, construction builders and contractors, architects, interior designers, patent attorneys, inventors, and manufacturing plant managers.

It is a further object of the disclosed embodiments to allow users to use the same set of gestures provided for editing CAD drawings to edit graphics documents in a variety of commonly used document formats, such as in doc and docx formats. It should be noted that some of the commands commonly used in CAD drawing applications, for example AutoCAD® software, such as the command to apply a radius to a line or to add a chamfer, are not available in word processing applications or in desktop publishing applications.

It is a further object of the disclosed embodiments to allow users to create CAD drawings and graphics documents, based on user interaction on a touch screen of a computing device, in a variety of document formats, including CAD drawings formats such as DXF format and doc and docx formats, using the same gestures.

It is yet a further object of the disclosed embodiments to allow users to interact with a three-dimensional representation of graphic objects on the touch screen to indicate desired changes in one or more parameters of one or more graphic objects, which in turn, will cause functions of the computing device to automatically affect the indicated changes.

These, other embodiments, and other features of the disclosed embodiments herein will be better understood by reference to the set of accompanying drawings (FIGS. 40A-58B), which should be taken as an illustrative example and not limiting. FIGS. 40A-52D, FIGS. 54A-54F, and FIGS. 56-58A may be viewed as a portion of a tutorial of an app to familiarize users with the use of the gestures discussed in these drawings.

While the disclosed embodiments from FIG. 41A through FIG. 52D are described with reference to user interaction with two-dimensional representations of graphic objects, it should be understood that the disclosed embodiments may also be implemented with reference to user interaction with three-dimensional representations of graphic objects.

First, the user selects a command, e.g., a command to change line length, discussed in FIGS. 42A-42D, by drawing a letter or by selecting an icon which represents the desired command. Second, the computing device identifies the command. Then, responsive to user interaction with a displayed representation of a graphic object on the touch screen to indicate a desired change in one or more parameters, such as, in line length, the computing device automatically causes the desired change in the indicated parameter and, when applicable, also automatically affects changes in locations of the graphic object and further, as a result, in other graphic objects in memory in which the drawing is stored.

Figure 42A:
FIGS. 42A-42D illustrate an example of user interaction with the touch screen to change line length.
Figure 42B:
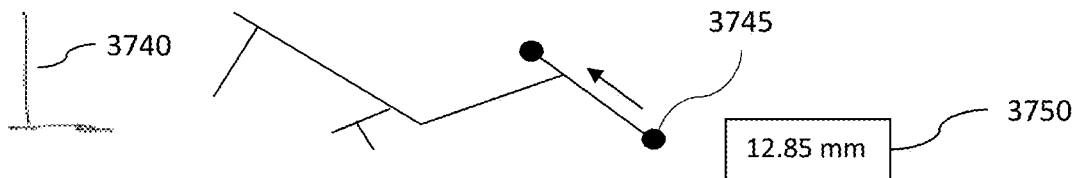

A desired, gradual or single, change in a parameter of a graphic object, being an increase or a decrease in its value, or in the shape of the graphic object, such as a change from a straight line object to a segmented line object, or gradual change from one shape to another, such as from a circle or a sphere to an eclipse and vice versa, may be indicated, by changes in positional locations along a gesture being drawn on the touch screen, as illustrated, for example, in FIGS. 42A-42B, and during which the computing device gradually and automatically applies the desired changes as the user continues to draw the gesture. From the user perspective, it would seem as the value of the parameter is changing at the same time as the gesture is being drawn.

The subject drawing or a portion thereof stored in the device memory (defined herein as "vector graphics") may be displayed on the touch screen (defined herein as "vector image") as a two-dimensional representation, with which the user may interact in order to communicate desired changes in one or more parameters of a graphic object, such as in line length, line angle, or arc radius. As discussed above, the computing device automatically causes these desired changes in the graphic object, and when applicable, also in its locations, and further in parameters and locations of other graphic objects within the vector graphics which may be caused as a result of the changes in the graphic object indicated by the user. The vector graphics may alternatively be represented on the touch screen as a three-dimensional vector image, so as to allow the user to view/review the effects of a change in a parameter of a graphic object in an actual three-dimensional representation of the vector graphics, rather than attempting to visualize the effects while viewing a two-dimensional representation.

Furthermore, the user may interact with a three-dimensional vector image on the touch screen to indicate desired changes in one or more parameters of one or more graphic objects, for example, by pointing at, touching or tapping geometrical features of the three-dimensional representation, such as on surfaces or at corners, which will cause the computing device to automatically change one or more parameters of one or more graphic objects of the vector graphics. Such user interaction with geometrical features may, for example, be along surface length, width or height, along edges of two connecting surfaces, e.g., along an edge connecting the top surface and one of the side surfaces, within surface(s) inside or outside a bevelled/trimmed corner, a sloped surface, e.g., of a ramp, or within an arced surface inside or outside an arced corner.

The correlation between user interaction with a geometrical feature of the three-dimensional vector image on the touch screen and changes in size and/or geometry of the vector graphics stored in the device memory may be achieved, by first, using one or more points/locations in the vector graphics stored, and defined in the xyz coordinate axis system, in the device memory (defined herein as "locations"), and correlating them or parameters defined or computed based on them with the geometrical features of the vector image with which the user may interact to communicate desired changes in graphic objects. A location herein is defined such that, changes in that location, or in a stored or computed parameter, e.g., of a straight, arced, or segmented line extending/branching from that location, such as, length, radius or angle (defined herein as "variable"), can be used as the variable, or as one of the variables, in function(s) capable to compute changes in size and/or geometry of the vector graphics as a result of changes in that variable. User interaction may be defined within a region of interest, being the area of the geometrical feature on the touch screen within which the user may gesture/interact; this region may, for example, be an entire surface of a cube, or the entire cube surface with an area proximate the center excluded. In addition, responsive to detecting finger movements in a predefined, expected direction or in one of predefined directions, or predefined, expected touching or tapping within this region, the computing device automatically identifies the relevant variable and automatically carries out its associated function(s) to automatically affect the desired change(s) communicated by the user.

For example, a position of either of the edges/corners of a rectangle or of a cube is a location that may be used as a variable in a function, or in one of the functions, capable to compute a change in the geometry of the rectangle or of the cube as a result of a change in that variable. Similarly, the length of a line between two edges/corners, i.e., between two locations, of the cube, or the angle between two connected surfaces of the cube may be used as the variable. Or, the center point of a circle or of a sphere, may be used as the "location" from which the radius of the circle or of the sphere is extending; the radius in this example may be a variable of a function capable to compute the circumference and surface area of the circle or the circumference, surface and volume of the sphere, as the user interacts with, e.g., touches, the sphere. Similarly, a length of a line extending from the center point of a vector graphics having a symmetrical geometry, such as a cube or a tube, or the location at the end of the extending line from the center point, may be used as a variable, or as one of the variables, of a function, or of one of the functions, capable to computes changes in the size of the symmetrical vector graphics or changes in its geometry, as the user interacts with the symmetrical vector image. Or, in a vector graphics with symmetry in one or more of its displayed surfaces such as in the surface of a base of a cone, two locations may be defined, the first at the center point of the surface at the base, and the second being the edge of the line extending from that location to the top of the cone; the variables in this example may be the first location and the length of the line extending from the first location to the top of the cone, which can be used in function(s) capable to compute changes in the size and geometry of the cone, as the user interacts with the vector image representing the cone. Or, a complex or non-symmetrical vector graphics, represented on the touch screen as a three-dimensional vector image, with which the user may interact to communicate changes in the vector graphics, may be divided into a plurality of partials vector graphics in the device memory, represented as one vector image on the touch screen, each represented by one or more functions capable to compute changes in its size and geometry, whereby the size and geometry of the vector graphics may be computed by the computing device based on the sum of the partials vector graphics.

In one embodiment, responsive to a user "pushing", i.e., in effect touching, or tapping a geometrical feature of a displayed representation of a vector graphics, i.e., the vector image, the computing device automatically increases or decreases the size of the vector graphics or of one or more parameters represented on the geometrical feature. For example, touching or tapping a displayed representation of a corner of a cube or a surface of a ramp, will cause the computing device to automatically decrease or increase the size of the cube (FIGS. 54A-54B) or of the decline/incline angle of the ramp, respectively.

Similarly, responsive to touching or tapping anywhere at a displayed representation of a sphere, the computing device automatically decreases or increases the radius of the sphere, respectively, which in turn, decreases or increases, the circumference, surface area and volume of the sphere, respectively. Or, responsive to continued "squeezing", i.e. holding/touching, a geometrical feature of a vector image representing a feature in vector graphics, such as the side edges of a top of a tube or of a cube, the computing device automatically brings the outside edge(s) of that vector graphics together gradually as the user continues squeezing/holding the geometrical feature of the vector image. Similarly, responsive to the user tapping or holding/touching the top surface of the geometrical feature, the computing device automatically and gradually brings the outside edges of the geometrical feature outward or inward, respectively, as the user continues tapping or touching the top surface of the vector image. Or, responsive to touching at or proximate a center point of a top surface, the computing device automatically creates a well, or other predetermined shape, with a radius centered at that center point, and continued touching or tapping, anywhere on the touch screen, will cause the computing device to automatically and gradually decrease or increase the radius of the well, respectively.

In another embodiment, first responsive to a user indicating a desired command, the computing device identifies the command. Then, the user may gesture at a displayed geometrical feature of a vector image to indicate desired changes in the vector graphics. For example, responsive to continued 'pushing', i.e., touching, or tapping a displayed representation of a surface of a corner, after the user has indicated a command to add a fillet (at the inside surface of the corner) or an arc (at the outside surface of the corner), and the computing device identified the command, the computing device automatically rounds the corner, if the corner is not yet rounded, and then causes an increase or a decrease in the value of the radius of the fillet or of the arc, as well as in locations of the adjacent line objects, as the user continues touching or tapping the surface of the fillet or of the arc, or anywhere on the touch screen. Or, after the computing device identifies a command to change line length, e.g., after the user touches a distinct icon representing the command, responsive to finger movement to the right or to the left, indicative of a desired change in width from the right edge or from the left edge of the surface of the cube, respectively, anywhere on the surface of the displayed cube, followed by continued touching or tapping anywhere on the touch screen, the computing device automatically decreases or increases the width of the cube, respectively, from the right edge or from the left edge of the surface, as the user continues touching or tapping. Similarly, responsive to a finger movement up or down on the surface of the cube followed by continued touching or tapping anywhere on the touch screen, the computing device automatically decreases or increases the height of the cube, respectively from the top edge or from the bottom edge of the surface, as the user continues touching or tapping. Further, responsive to tapping or touching a point proximate an edge along two connected surfaces of a vector image of a cube, the computing device automatically increases or decreases the angle between the two connected surfaces. Or, after the computing device identifies a command to insert a blind hole and a point on a surface of the vector image at which to insert the blind hole, e.g., after detecting a long press at that point, indicating the point on the surface at which to insert the hole, responsive to continued tapping or touching anywhere on the touch screen, the computing device gradually and automatically increases or decreases the depth of the hole, respectively, in the vector graphics and updates the vector image. Similarly, responsive to identifying a command to insert a through hole at user indicated point on a surface of the vector image, the computing device automatically inserts a through hole in the vector graphics and updates the vector image with the inserted through hole. Further, responsive to tapping or touching a point along the circumference of the hole, the computing device automatically increases or decreases the radius of the hole. Or, responsive to touching the inside surface of the hole, the computing device automatically invokes a selection table/menu of standard threads, from which the user may select a desired thread to apply to the inside surface of the hole.

FIGS. 40A-40D relate to a command to Insert a line. They illustrate the interaction between a user and a touch screen, whereby a user draws a line 3705 free-hand between two points A and B (FIG. 40B). In some embodiments, an estimated distance 3710 of the line is displayed while the line is being drawn. Responsive to the user finger being lifted from the touch screen (FIG. 40C), the computing device automatically inserts a straight-line object in the device memory, at memory locations represented by points A and B on the touch screen, where the drawing is stored, and displays the straight-line object 3715 along with its actual distance 3720 on the touch screen.

Figure 41A:
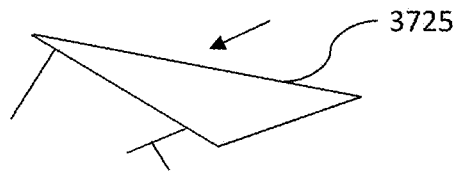
FIGS. 41A-41C illustrate an example of use of the command to delete an object.
Figure 41B:
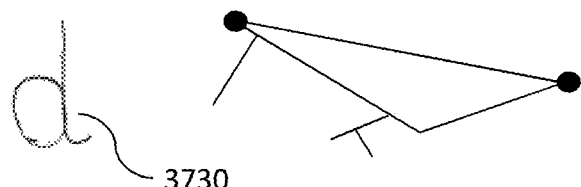
Figure 41C:

FIGS. 41A-41C relate to a command to delete an object. The user selects the desired object 3725 by touching it (FIG. 41A) and then may draw a command indicator 3730, for example, the letter 'd' to indicate the command 'Delete' ['] (FIG. 41B). In response, the computing device identifies the command and deletes the object (FIG. 41C). It should be noted that the user may indicate the command by selecting an icon representing the command, by an audible signal and the like.

Figure 42C:
Figure 42D:

FIGS. 42A-42D relate to a command to change line length. First, the user selects line 3735 by touching it (FIG. 42A) and then may draw a command indicator 3740, for example, the letter 'L' to indicate the desired command (FIG. 42B). It should be noted that selecting line 3735 prior to drawing the command indicator 3740 is optional, for example, to view its distance or to copy it. Then, responsive to each of gradual changes in user selected positional locations on the touch screen starting from point 3745 of line 3735, the computing device automatically causes each of respective gradual changes in line length stored in the device memory and updates the length on display box 3750 (FIGS. 42B-42C).

Figure 43A:
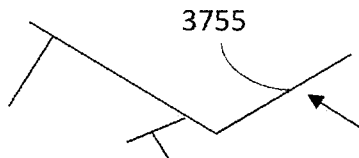
FIGS. 43A-43D illustrate an example of user interaction with the touch screen to change line angle.
Figure 43B:
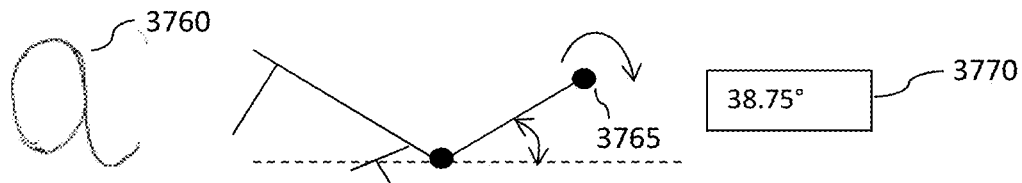
Figure 43C:
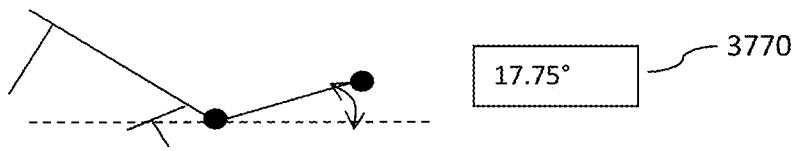
Figure 43D:

FIGS. 43A-43D relate to a command to change line angle. The user may optionaly first select line 3755 (FIG. 43A) and then may draw a command indicator 3760, for example, the letter 'a' to indicate the desired command (FIG. 43B). Then, in similar manner to changing line length, responsive to each of gradual changes in user selected positional locations, up or down, on the touch screen starting from edge 3765 of line 3755, the computing device automatically causes each of respective gradual changes in line angle stored in the device memory and updates the angle of the line, for example, relative to the x-axis, in the device memory, and also updates the angle on display box 3770 (FIGS. 43B-43C).

It should be noted that if the user indicates both commands: to change line length and to change line angle, prior to drawing the gesture discussed in the two paragraphs above, for example, by selecting two distinct icons, each representing one of the commands, then the computing device will automatically cause gradual changes in length and/or angle of the line based on direction of movement of the gesture, and accordingly will update the values of either or both the length and the angle on the display box on the touch screen at each of gradual changes in user selected positional locations.

Figure 44A:
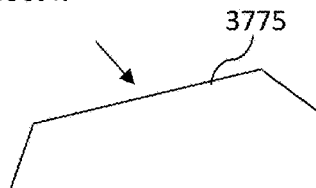
FIGS. 44A-44D illustrate an example of user interaction with the touch screen to apply a radius to a line or to change the radius of an arc.
Figure 44B:
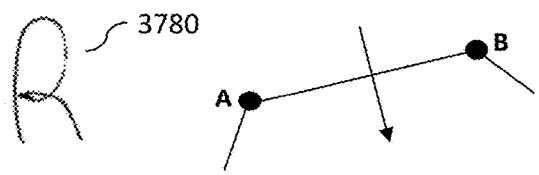
Figure 44C:
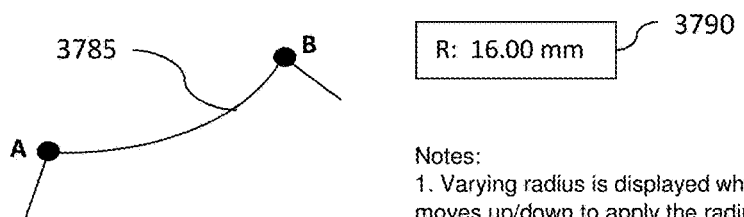
Figure 44D:
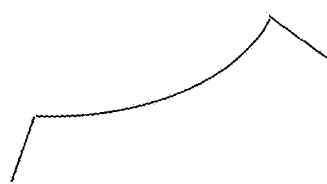

FIGS. 44A-44D relate to a command to apply a radius to a line or to change the radius of an arc between A and B. The user may optionally first select the displayed line or arc, being line 3775 in this example (FIG. 44A) and then may draw a command indicator 3780, for example, the letter 'R' to indicate the desired command (FIG. 44B). Then, in similar manner to changing line length or line angle, responsive to each of gradual changes in user selected positional locations on the touch screen across the displayed line or arc, starting from a position along the displayed line 3775 in this example, the computing device automatically causes each of respective gradual changes in the radius of the arc in the drawing stored in the device memory and updates the radius of arc 3785 on display box 3790 (FIG. 44C).

Figure 45A:
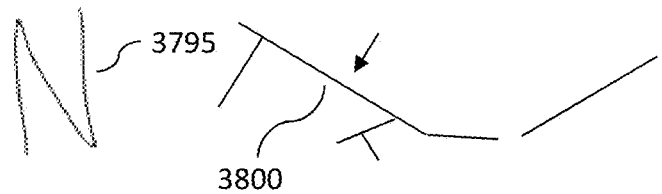
FIGS. 45A-45C illustrate an example of user interaction with the touch screen to make a line parallel to another line.
Figure 45B:
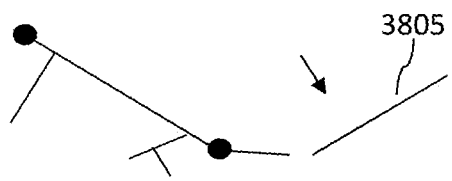
Figure 45C:
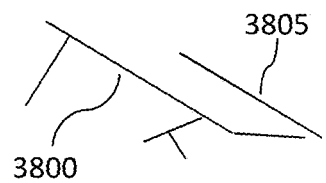

FIGS. 45A-45C relate to a command to make a line parallel to another line. First, the user may draw a command indicator 3795, for example, the letter 'N' to indicate the desired command and then touch reference line 3800 (FIG. 45A). The user then selects target line 3805 (FIG. 45B) and lifts finger. Responsive to the finger being lifted, the computing device automatically alters target line 3805 in the device memory to be parallel to reference line 3800 and updates the displayed target line on the touch screen (FIG. 45C).

Figure 46A:
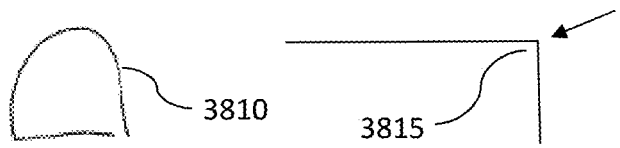
FIGS. 46A-46D illustrate an example of user interaction with the touch screen to add a fillet or an arc.
Figure 46B:
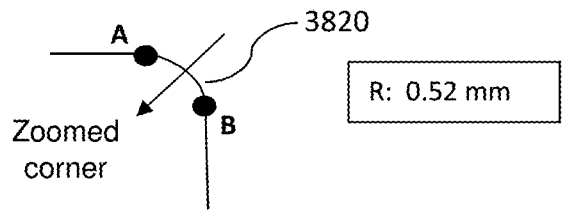
Figure 46C:
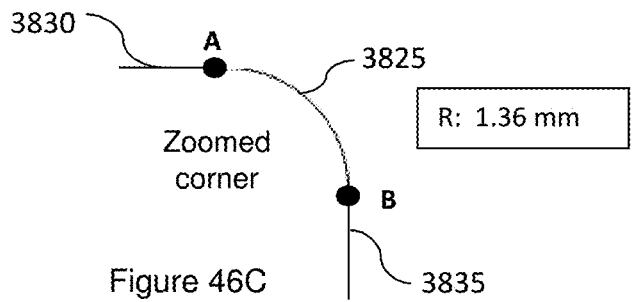
Figure 46D:

FIGS. 46A-46D relate to a command to add a fillet at a two-dimensional representation of a corner or at a three-dimensional representation of an inside surface of a corner, or an arc at a three-dimensional representation of an outside surface of a corner. First, the user may draw a command indicator 3810 to indicate the desired command and then touch corner 3815 to which to apply a fillet (FIG. 46A). In response, the computing device converts the sharp corner 3815 into rounded corner 3820, having a default radius value, and zooms in that corner (FIG. 46B). Then, responsive to each of gradual changes in user selected positional locations on the touch screen across displayed arc 3825 at a position along it, the computing device causes each of respective gradual changes in the radius of the arc stored in the device memory and in its locations in memory represented by A and B, such that the arc is tangent to adjacent lines 3830 and 3835 (FIG. 46C). Next, the user touches the screen and in response the computing device zooms out the drawing to its original zoom percentage (FIG. 46D); otherwise, the user may indicate additional changes in the radius, even after the finger is lifted.

Figure 47A:
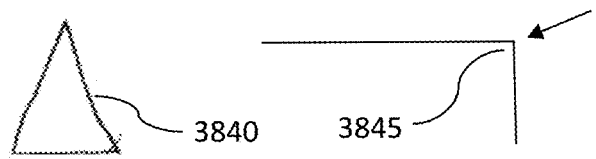
FIGS. 47A-47D illustrate an example of user interaction with the touch screen to add a chamfer.
Figure 47B:
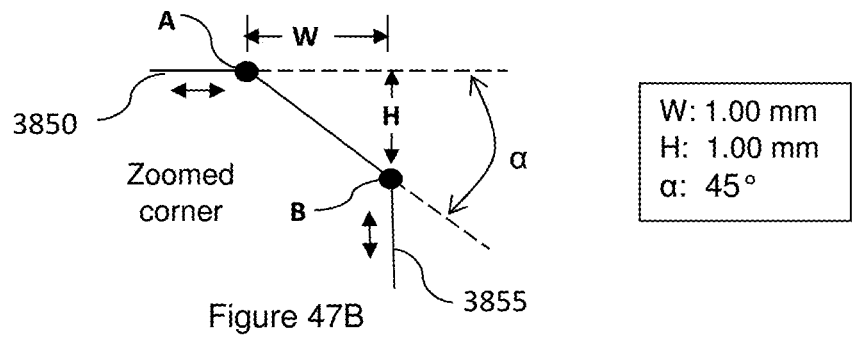
Figure 47C:
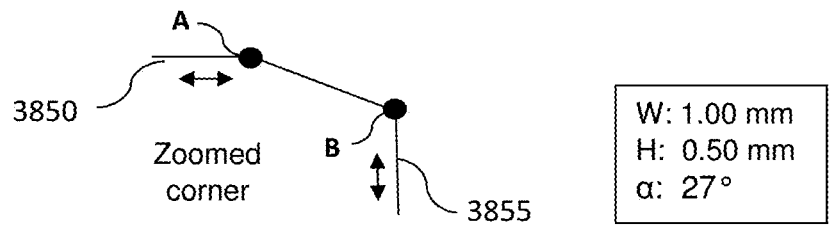
Figure 47D:
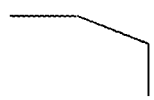

FIGS. 47A-47D relate to a command to add a chamfer. First, the user may draw a command indicator 3840 to indicate the desired command and then touches corner 3845 to which to apply a chamfer/bevel (FIG. 47A). In response, the computing device trims the corner between two locations represented by A and B on the touch screen, and sets height H and width W at default values, and as a result also the angle α (FIG. 47B). Then, responsive to each of gradual changes in user selected positional locations at A and/or B on the touch screen in parallel motions to line 3850 and/or line 3855, respectively, the computing device causes gradual changes in width W and/or height H, respectively as stored in the device memory, as well as in the location(s) in memory represented by A and/or B, and updates their displayed representation (FIG. 47C). Next, the user touches the screen and in response the computing device zooms out the drawing to its original zoom percentage (FIG. 47D); otherwise, the user may indicate additional changes in parameters W and/or H, even after the finger is lifted.

Figure 48A:
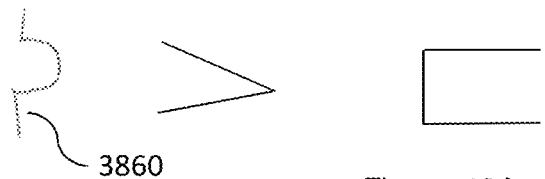
FIGS. 48A-48F illustrate an example of use of the command to trim an object.
Figure 48B:
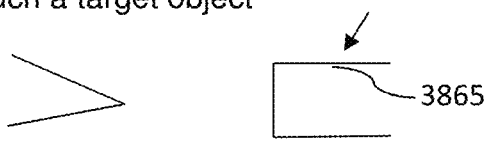
Figure 48C:
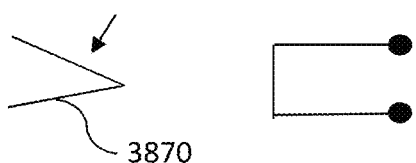
Figure 48D:
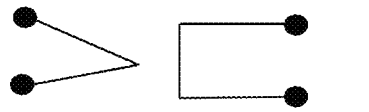
Figure 48E:
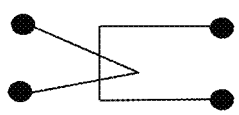
Figure 48F:
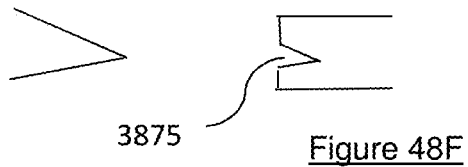

FIGS. 48A-48F relate to a command to trim an object. First, the user may draw a command indicator 3860 to indicate the desired command (FIG. 48A). Next, the user touches target object 3865 (FIG. 48B) and then reference object 3870 (FIG. 48C); it should be noted that these last two steps are optional. The user then moves reference object 3870 to indicate the desired trim in target object 3865 (FIGS. 48D-48E). Then, responsive to the finger being lifted from the touch screen, the computing device automatically applies the desired trim 3875 to target object 3865 (FIG. 48F).

Figure 49A:
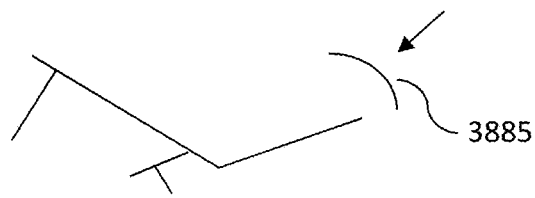
FIGS. 49A-49D illustrate an example of user interaction with the touch screen to move an arced object.
Figure 49B:
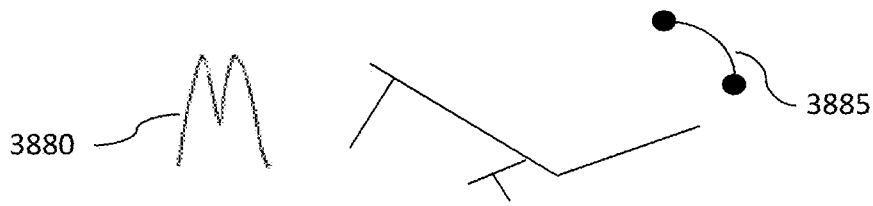
Figure 49C:
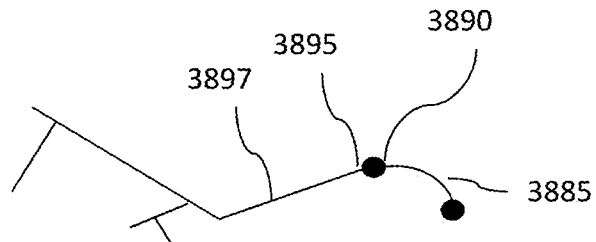
Figure 49D:
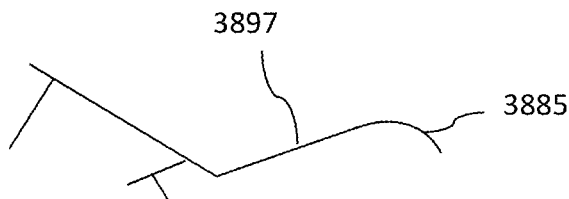

FIGS. 49A-49D relate to a command to move an arced object. First, the user may optionally select object 3885 (FIG. 49A) and then draw a command indicator 3880, for example the letter 'M', to indicate the desired command, and then touches displayed target object 3885 (FIG. 49B); at this point the object is selected, and moves it until edge 3890 of arc 3885 is at or proximate edge 3895 of line 3897 (FIG. 49C). Then, responsive to the finger being lifted from the screen, the computing device automatically moves the arc 3885 such that it is tangent to line 3897 where the edges meet (FIG. 49D).

Figure 50A:
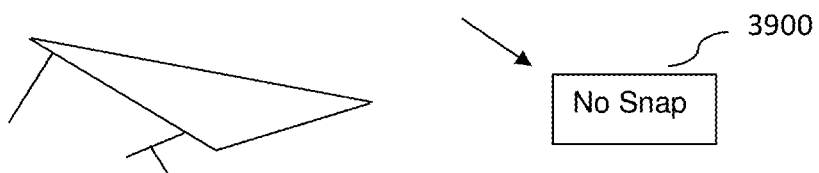
FIGS. 50A-50D illustrate an example of use of the "no snap" command.
Figure 50B:
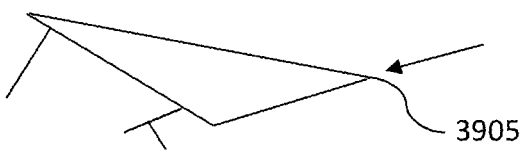
Figure 50C:
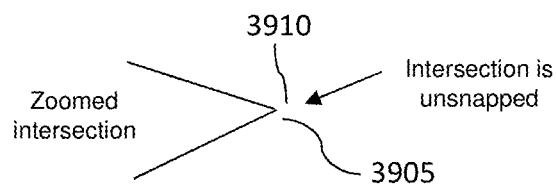
Figure 50D:

FIGS. 50A-50D relate to the 'No Snap' command. First, the user may touch command indicator 3900 to indicate the desired command (FIG. 50A), and then the user may touch the desired intersection 3905 to unsnap (FIG. 50B). Then, responsive to the finger being lifted from the touch screen, the computing device automatically applies the no-snap 3910 at intersection 3905 and zooms in the intersection (FIG. 50C). Touching again causes the computing device to zoom out the drawing to its original zoom percentage (FIG. 50D).

Figure 51A:
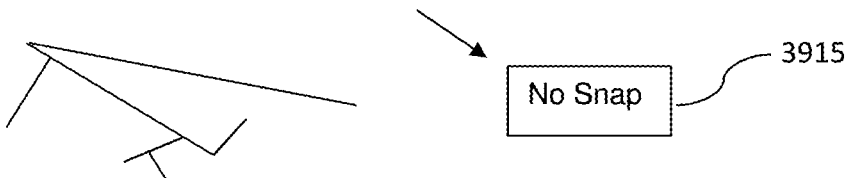
FIGS. 51A-51D illustrate another example of use of the 'No Snap' command.
Figure 51B:
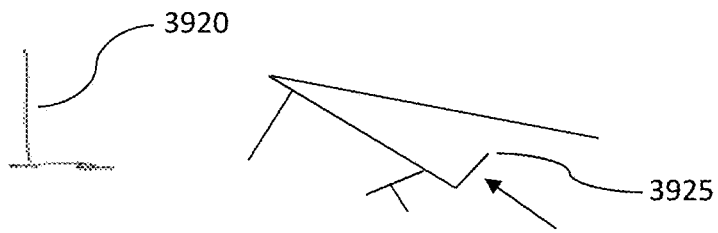
Figure 51C:
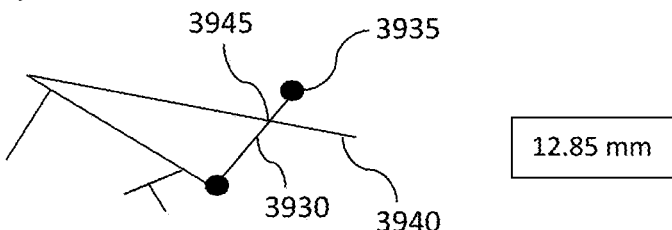
Figure 51D:
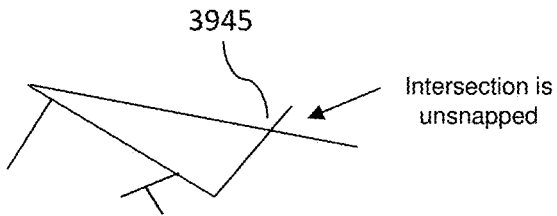

FIGS. 51A-51D illustrate another example of use of the 'No Snap' command. First, the user may touch command indicator 3915 to indicate the desired command (FIG. 51A). Next, the user may draw a command indicator 3920, for example, the letter 'L' to indicate the desired command to change line length (FIG. 51B). Then, responsive to each of gradual changes in user selected positional locations on the touch screen, starting from edge 3925 of line 3930 and ending at position 3935 on the touch screen, across line 3940, the computing device automatically unsnaps intersection 3945 or avoids intersection 3945 from being snapped, assuming the snap operation is set as a default operation by the computing device.

Figure 52A:
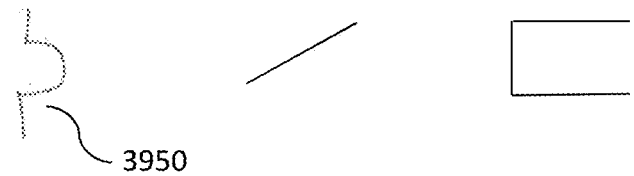
FIGS. 52A-52D illustrate another example of use of the command to trim an object.
Figure 52B:
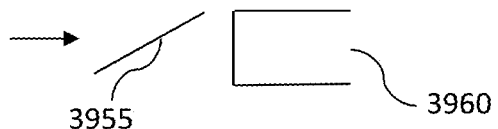
Figure 52C:
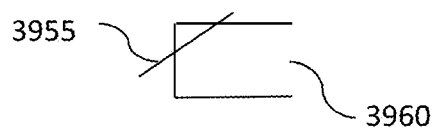
Figure 52D:
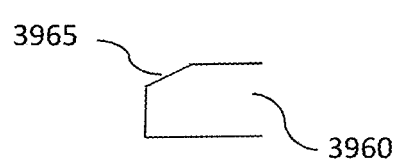

FIGS. 52A-52D illustrate another example of use of the command to trim an object. First, the user may draw a command indicator 3950 to indicate the desired command (FIG. 52A). Next, the user moves reference object 3955 to indicate the desired trim in target object 3960 (FIGS. 52B-52C). Then, responsive to the user finger being lifted from the touch screen, the computing device automatically applies the desired trim 3965 to target object 3960 (FIG. 52D).

Commands to copy and cut graphic objects may be added to the set of gestures discussed above, and carried out for example by selecting one or more graphic objects (as shown, for example, in FIG. 42A), after the user draws a command indicator or touch an associated distinct icon on the touch screen to indicate the desired command, to copy or cut. The command to paste may also be added, and may be carried out for example by drawing a command indicator, such as the letter 'P', or by touching a distinct icon representing the command, and then pointing at a position on the touch screen, which represents a location in memory at which to paste the clipboard content. The copy, cut and paste commands may be useful, for example, in copying a portion of a CAD drawing representing a feature such as a bath tab and pasting it at another location of the drawing representing a second bathroom of a renovation site.

Figure 53:
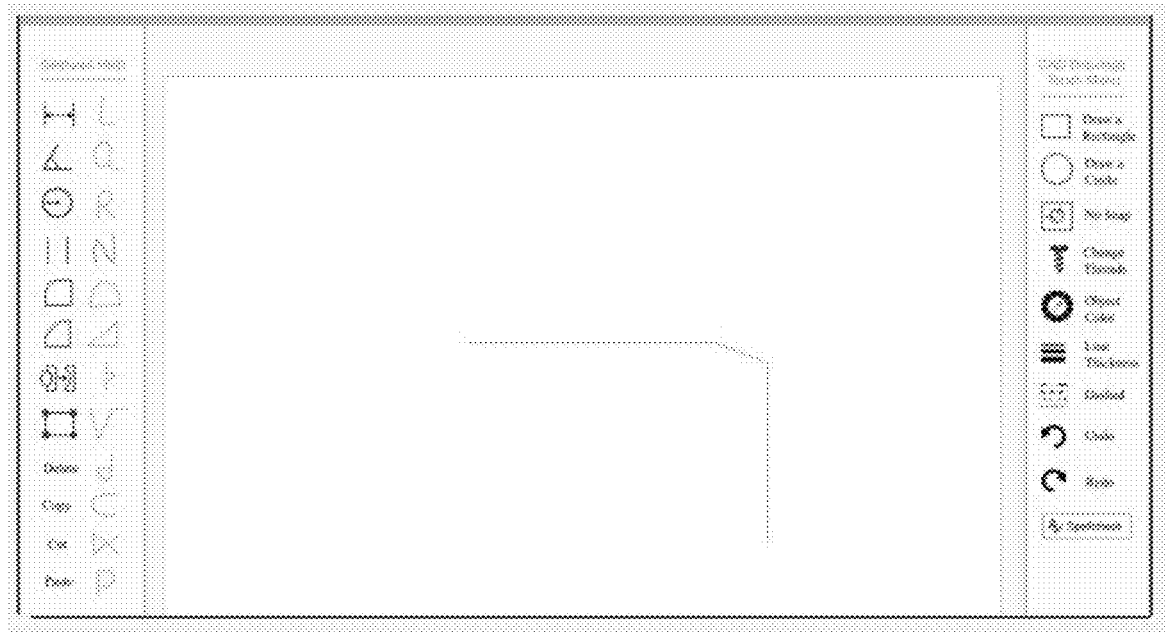
FIG. 53 is an example of a user interface with icons.

FIG. 53 is an example of a user interface with icons corresponding to the available user commands discussed in the Figures above and a 'Gesture Help' by each distinct icon indicating a letter or a symbol which may be drawn to indicate a command, instead of selecting the icon by it representing the command.

Figure 54A:
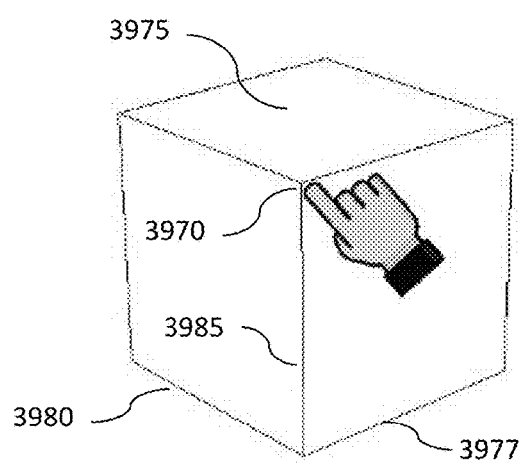
FIGS. 54A-54B illustrate an example of before and after interacting with a three-dimensional representation of a vector graphics of a cube on the touch screen.
Figure 54B:
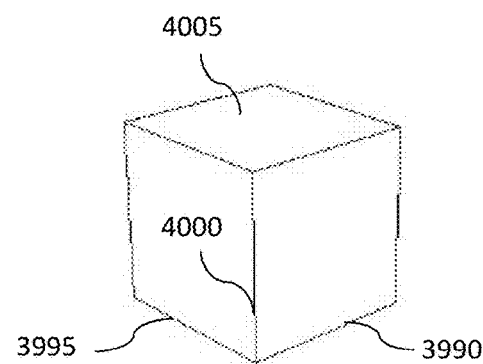

FIGS. 54A-54B illustrate an example of before and after interacting with a three-dimensional representation of a vector graphics of a cube. Responsive to a user touching corner 3970 of vector image 3975, representing a vector graphics of a cube (FIG. 54A), for a predetermined period of time, the computing device interprets/identifies the touching of corner 3970 as a command to proportionally decrease the dimensions of the cube. Then, responsive to continued touching corner 3970, the computing device automatically and gradually decreases the length, width and height of the cube in the vector graphics, displayed at 3977, 3980 and 3985, respectively, at the same rate, and updates the displayed length 3990, width 3995 and height 4000 in vector image 4005 (FIG. 54B).

Figure 54C:
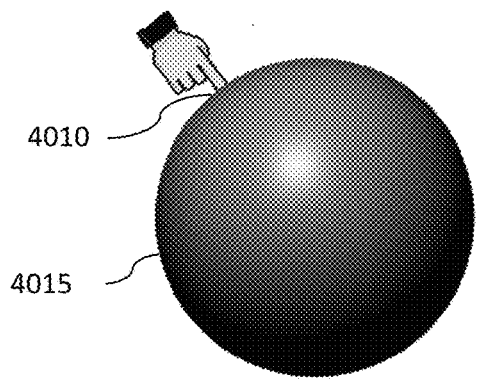
FIGS. 54C-54D illustrate an example of before and after interacting with a three-dimensional representation of a vector graphics of a sphere on the touch screen.
Figure 54D:
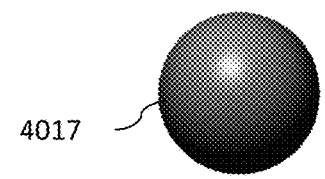

FIGS. 54C-54D illustrate an example of before and after interacting with a three-dimensional representation of a vector graphics of a sphere. Responsive to continued touching point 4010 or anywhere on vector image 4015 of a sphere (FIG. 54C), representing a vector graphics of the sphere, for a predetermined period of time, the computing device interprets/identifies the touching as a command to decrease the radius of the sphere. Then responsive to continued touching point 4010, the computing device automatically and gradually decreases the radius of the vector graphics of the sphere, and updates vector image 4017 (FIG. 54D) on the touch screen.

Figure 54E:
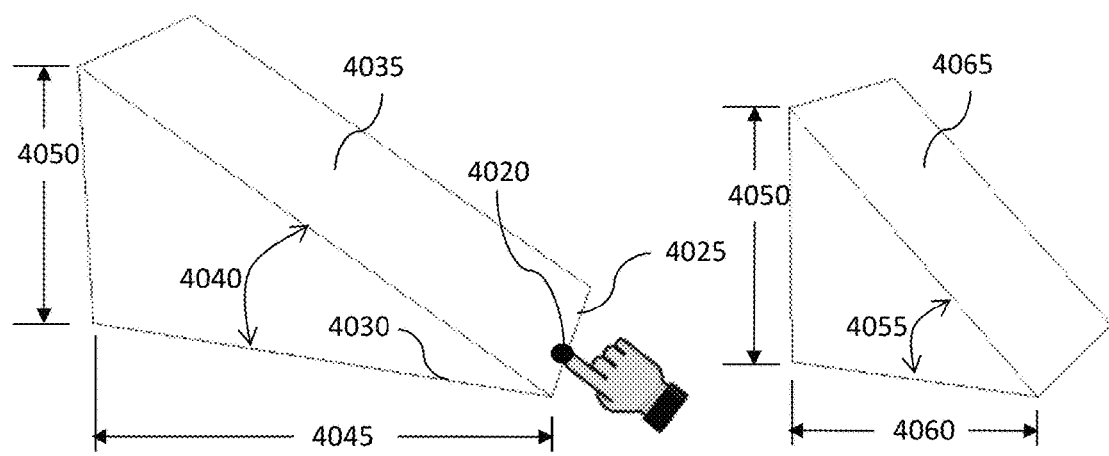
FIGS. 54E-54F illustrate an example of before and after interacting with a three-dimensional representation of a vector graphics of a ramp on the touch screen.
Figure 54F:
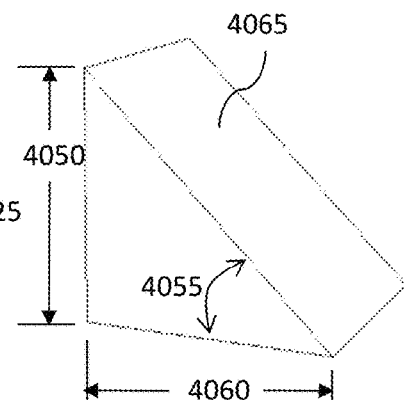

FIGS. 54E-54F illustrate an example of before and after interacting with a three-dimensional representation of a vector graphics of a ramp. Responsive to a user touching point 4020 or any point along edge 4025 of base 4030 of vector image 4035 of a ramp (FIG. 54E), representing the vector graphics of the ramp, for a predetermined period of time, the computing device interprets/identifies the touching as a command to increase incline angle 4040 and decrease distance 4045 of base 4030 in the vector graphics, such that distance 4050 along the ramp remains unchanged. Then, responsive to continued touching point 4020, the computing device automatically and gradually increases incline angle 4040 and decreases distance 4045 of base 4030 in the vector graphics, such that distance 4050 along the height of the ramp remains unchanged, and updates displayed incline angle 4040 and distance 4045 to incline angle 4055 and distance 4060 in vector image 4065 (FIG. 54F). Similarly, responsive to tapping point 4020, the computing device may be configured to automatically and gradually decrease inclines angle 4040 and increase distance 4045, such that distance 4050 along the height of the ramp will remain unchanged.

In one embodiment, the computing device invokes command mode or data entry mode; command mode is invoked when a command intended to be applied to text or graphics already stored in memory and displayed on the touch screen is identified, and data entry mode is invoked when a command to insert or paste text or graphics is identified. In command mode, data entry mode is disabled to allow for unrestricted, unconfined user input, on the touch screen to indicate locations of displayed text or graphics at which to apply user pre-defined command(s), and in data entry mode, command mode is disabled to enable pointing at positions on the touch screen indicative of locations in memory at which to insert text, insert a drawn shape such as a line, or paste text or graphics. Command mode may be set to be a default mode.

When in command mode, the drawing by the user on displayed text or graphics (defined herein as "marking gesture") to indicate locations in memory, will not be interpreted by the computing device as a command to insert a line, and stopping movement while drawing the marking gesture, or simply touching a position on the touch screen, will not be interpreted by the computing device as a position indicative of a location in memory at which to insert text or graphics, since in this mode, data entry mode is disabled. In one embodiment, however, when in data entry mode, the computing device will interpret such a position as indicative of an insertion location in memory, only after the finger is lifted from the touch screen, to further improve robustness and user friendliness; the benefit of this feature with respect to control over a zooming functionality is further discussed below. The user may draw the marking gesture free-hand on displayed text on the touch screen to indicate desired locations of text characters in memory where a desired command, such as bold, underline, move or delete, should be applied, or on displayed graphics, i.e., on vector image, to indicate desired locations of graphic objects in memory where a desired command, such as select, delete, replace, change objects color, color shade, size, style, or line thickness, should be applied.

Prior to drawing the marking gesture, the user may define a command, by selecting a distinct icon representing the command from a bar menu on the touch screen, illustrated for example in FIG. 53. Alternatively, the user may define a desired command by drawing a letter or a symbol which represents the command; under this scenario, however, both command mode and data entry mode may be disabled while drawing the letter or the symbol, to allow for unconfined free-hand drawing of the letter or the symbol anywhere on the touch screen, such that the drawing of the letter or the symbol will not be interpreted as the marking gesture, or as a drawn feature, such as a drawn line, to be inserted, and a finger being lifted from the touch screen will not be interpreted as inserting or pasting data.

It should be noted, that the drawing of the marking gesture on displayed text or graphics to indicate desired locations in memory can be performed in a single step, and if desired, in one or more time interval breaks, if for example the finger is lifted from the touch screen for up to a predetermined period of time, or under other predetermined conditions, such as between double taps, during which the user may, for example, wish to review a portion in another document before deciding whether to continue marking additional displayed text or graphics from the last indicated location prior to the time break or on other displayed text or graphics, or to simply conclude the marking. It should be further noted that the marking gesture may be drawn free-hand in any shape, such as in zigzag (FIG. 57), a line across (FIG. 56), or a line above or below displayed text or graphics. The user may also choose to display the marking gesture as it is being drawn, and to draw back along the gesture, or anywhere along it, to undo applied command(s) to text or graphics indicated by previously marked area(s) of displayed text or graphics.

Figure 56:
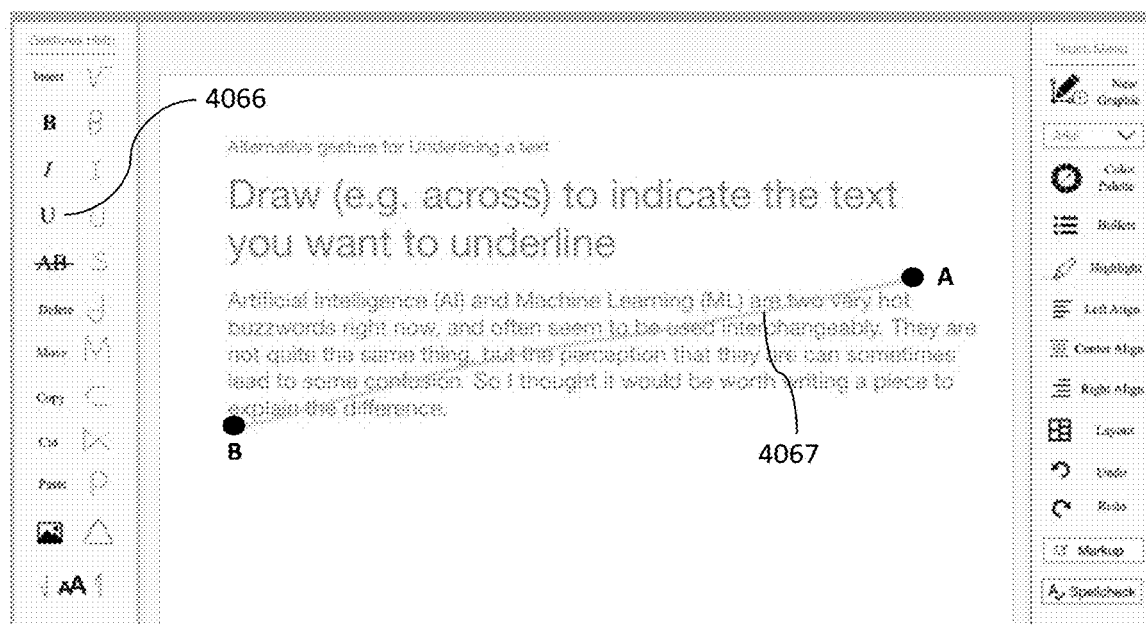
FIG. 56 illustrates an example of a gesture to mark text in command mode.

FIG. 56 is an example of a gesture to mark text in command mode. First, the user indicates a desired command, such as a command to underline, for example by touching icon 4066 representing the command. Then, responsive to the user drawing line 4067 free-hand between A and B, from the right to the left or from the left to the right, to indicate the locations in memory at which to underline text, the computing device automatically underlines the text at the indicated locations and displays a representation of the underlined text on the touch screen as the user continues drawing the gesture or when the finger is lifted from the touch screen, depending on the user predefined preference.

Figure 57:
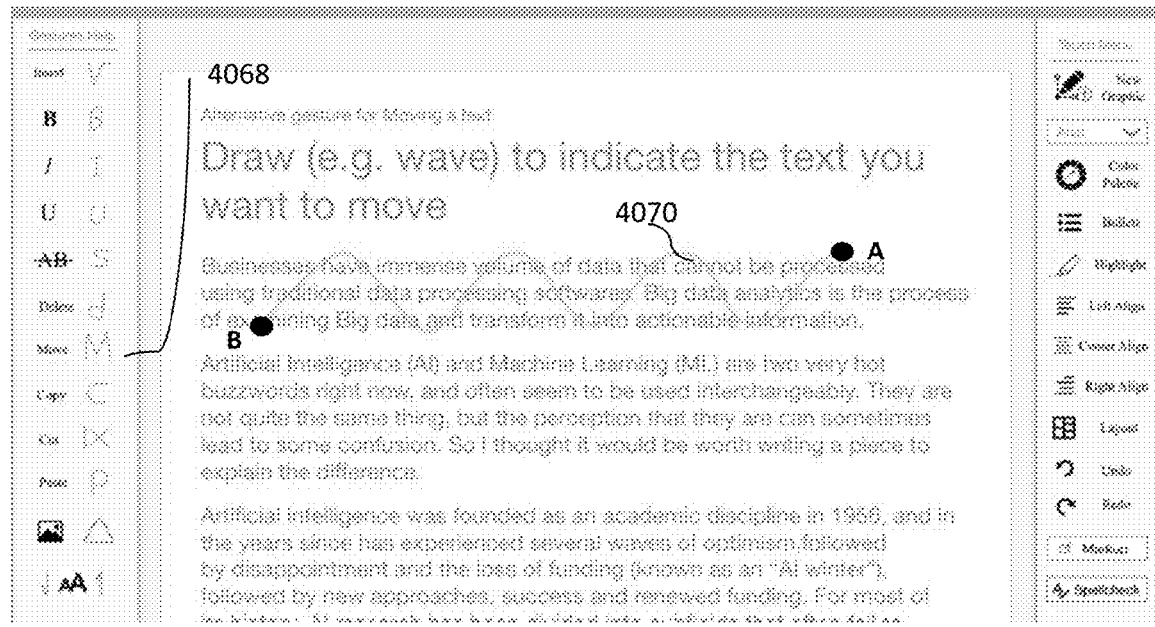
FIG. 57 illustrates another example of a gesture to mark text in command mode.

FIG. 57 is another example of a gesture to mark text in command mode. First, the user indicates a desired command, such as a command to move text, for example by touching icon 4068 representing the command. Then, responsive to the user drawing a zigzagged line 4070 free-hand between A and B, from the right to the left or from the left to the right, to indicate the locations in memory at which to select text to be moved, the computing device automatically selects the text at the indicated locations in memory and highlights it on the touch screen as the user continues drawing the gesture or when the finger is lifted from the touch screen, depending on user predefined preference. At this point, the computing device automatically switches to data entry mode. Next (not shown), responsive to the user pointing at a position on the touch screen, indicative of a location in memory at which to paste the selected text, the computing device automatically pastes the selected text, starting from that indicated location. Once the text is pasted, the computing device automatically reverts back to command mode.

Figure 55A:
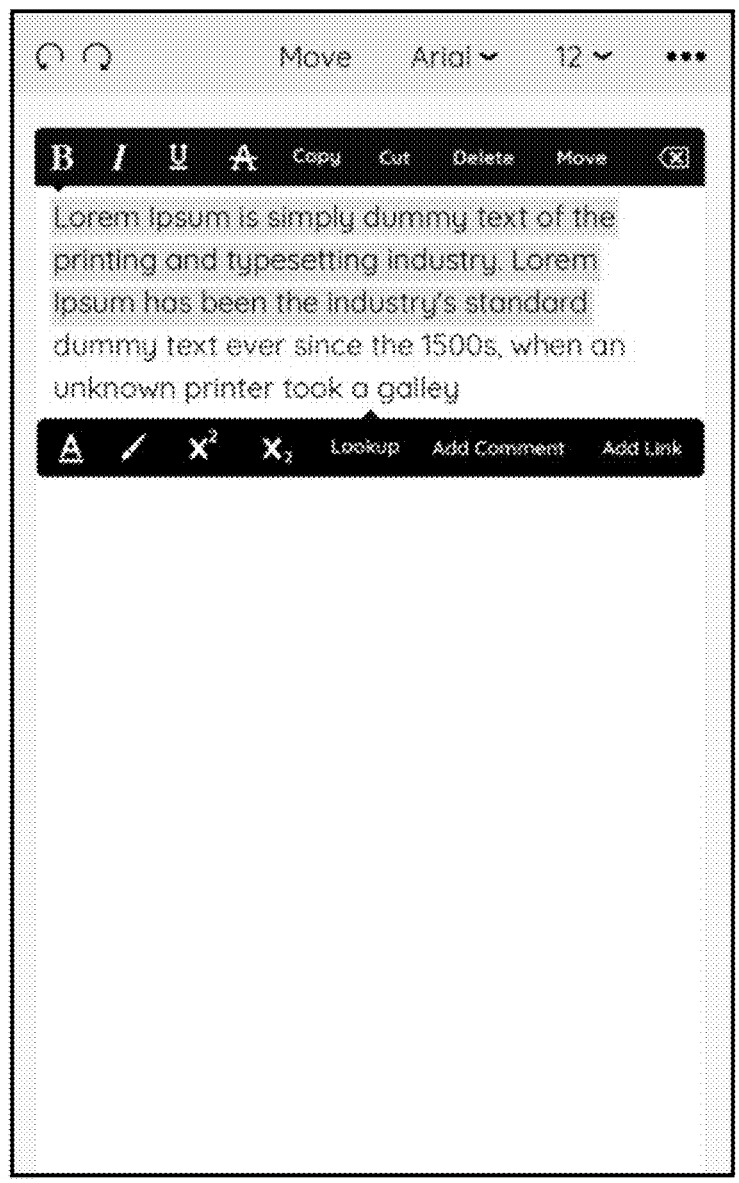
FIGS. 55A-55B illustrate examples of a user interface menus for text editing, selection mode.
Figure 55B:
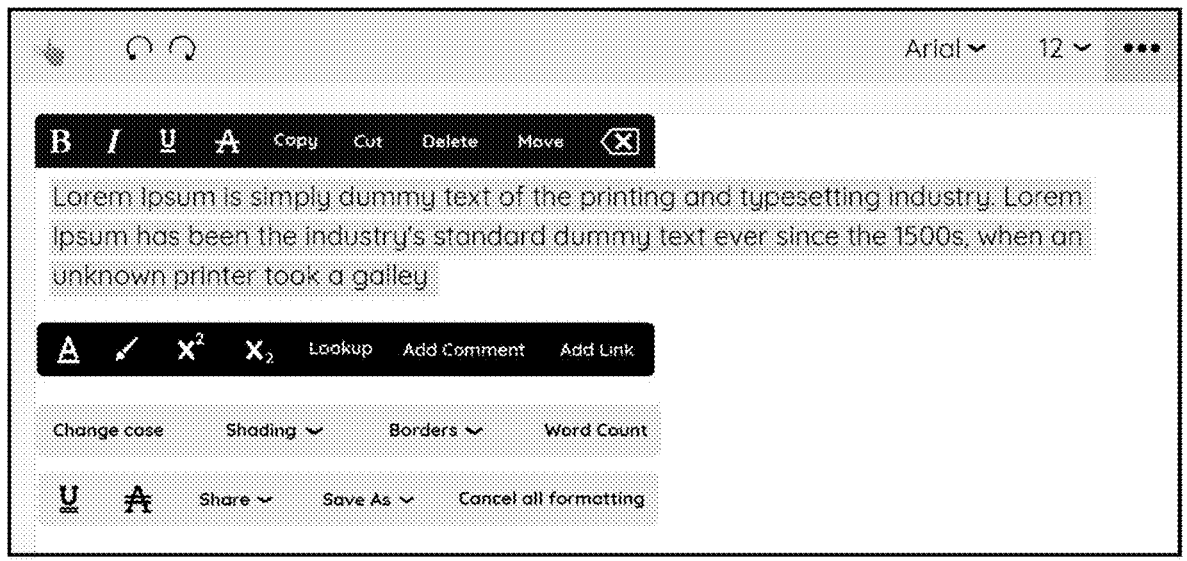

FIGS. 55A-55B illustrate examples of user interface menus for the text editing, selection mode, discussed below.

In another embodiment, especially useful in, but not limited to, text editing, responsive to a gesture being drawn on the touch screen to mark displayed text or graphics while in command mode and no command was selected prior to drawing the gesture, the computing device automatically invokes selection mode, selects the marked/indicated text or graphics on the touch screen as the finger is lifted from the touch screen, and automatically invokes a set of icons, each representing a distinct command, arranged in menus and/or tooltips by the selected text or graphics (FIGS. 55A-55B). In these examples, when the user selects one or more of the displayed icons, the computing device applies the corresponding command(s) to the selected text. The user may exit the selection mode by simply dismissing the screen, which will cause the computing device to automatically revert back to command mode. The computing device will also automatically revert back to command mode after the selected text is moved; if the user have had indicated a command to move text, pointed at a position on the touch screen representing the location in memory at which to move the selected text, and then lifts the finger. As in command mode, data entry mode is disabled while in selection mode to allow for unrestricted, unconfined drawing of the marking gesture to mark displayed text or graphics. Selection mode may be useful, for example, when the user wishes to focus on a specific portion of text and perform some trial and errors prior to concluding the edits on that portion of text. When the selected text is a single word, the user may, for example, indicate a command to suggest a synonym, capitalize the word, or change its fonts to all caps.

Figure 58A:
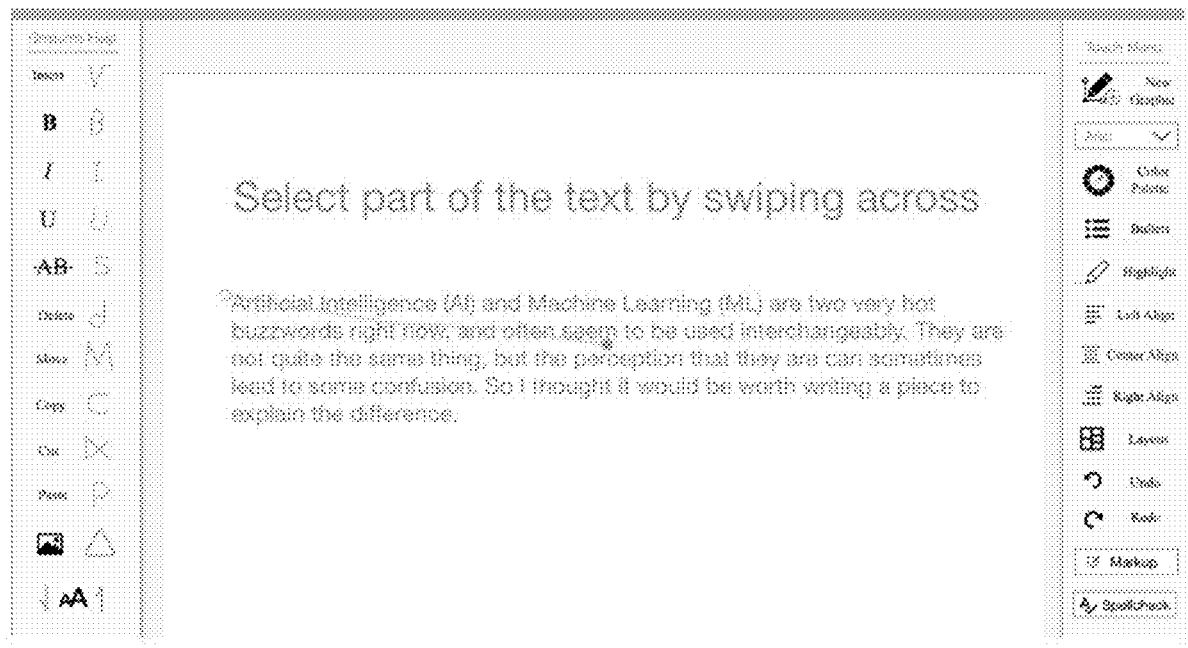
FIGS. 58A-58B illustrate an example of automatically zooming a text while drawing the gesture to mark text.
Figure 58B:
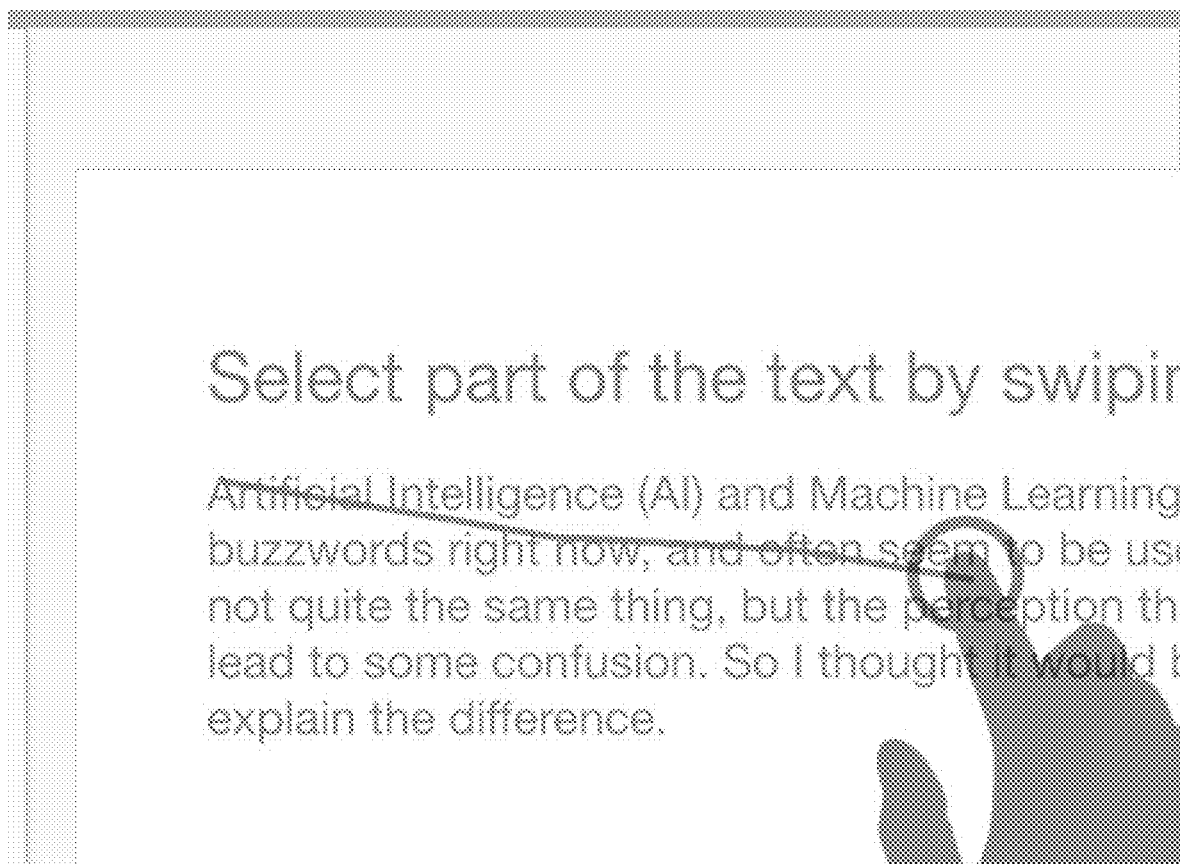

FIGS. 58A-58B illustrate an example of automatically zooming displayed text while drawing the gesture to mark text, as discussed below.

In another embodiment, while in command mode or in data entry mode, or while drawing the marking gesture during selection mode, prior to the finger being lifted from the touch screen, responsive to detecting a decrease or an increase in speed between two positions on the touch screen while the marking gesture or a shape such as a line to be inserted, is being drawn, the computing device automatically zooms in or zooms out, respectively, a portion of the displayed text or graphic on the touch screen which is proximate the current position along the marking gesture or the drawn line. In addition, responsive to detecting a user selected position on the touch screen with no movement for a predetermined period of time while in either command mode or data entry mode, the computing device automatically zooms in a portion of the displayed text or graphic on the touch screen which is proximate the selected position and further continues to gradually zoom in up to a maximal predetermined zoom percentage as the user continues to point at that selected position; this feature may be useful especially near or at a start position and an end position along the gesture or along the drawn line, as the user may need to see more details in their proximity so as to point closer to the desired displayed text character or graphic object or its represented location on the touch screen; naturally, the finger is at rest at or near the starting position prior to drawing the gesture or the line, as well as while at a potential end position. As discussed, in one embodiment, when in data entry mode, the position at which the finger, or writing tool, being at rest on the touch screen will not be interpreted as indicative of the insertion location in memory at which to insert text or graphics, until after the finger, or writing tool, is lifted from the touch screen, and therefore, the user may have the finger be periodically at rest, to zoom in, while approaching the intended end position. Furthermore, responsive to detecting a continued tapping, the computing device may be configured to automatically zoom out as the user continues tapping.

The disclosed embodiments may further provide a facility that allows a user to specify customized gestures for interacting with the displayed representations of the graphic objects. The user may be prompted to select one or more parameters to be associated with a desired gesture. In some aspects, the user may be presented with a list of available parameters, or may be provided with a facility to input custom parameters. Once a parameter has been specified, the user may be prompted to associate desired gesture(s), indicative of change(s) in the specified parameter, with a geometrical feature within the vector image. In some aspects, the user may be prompted to input a desired gesture indicative of an increase in the value of the specified parameter and then to input another desired gesture indicative of a decrease in the value of the specified parameter. In other aspects, the user may be prompted to associate desired gesture(s) indicative of change(s) in the shape/geometry of graphic object(s), and in other aspects, the user may be prompted to associate direction(s) of movement of a drawn gesture with a feature within the geometrical feature, and the like. Then, the computing device may associate the custom parameter(s) with one or more functions, or the user may be presented with a list of available functions, or the user may be provided with a facility to specify custom function(s), such that when the user inputs the specified gesture(s) within other similar geometrical features within the same vector image or within another vector image, the computing device will automatically affect the indicated changes in the vector graphics, represented by the vector image, in memory of the computing device.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

Various modifications and adaptations may become apparent to those skilled in the relevant arts in view of the foregoing description, when read in conjunction with the accompanying drawings. However, all such and similar modifications of the teachings of the disclosed embodiments will still fall within the scope of the disclosed embodiments.

Various features of the different embodiments described herein are interchangeable, one with the other. The various described features, as well as any known equivalents can be mixed and matched to construct additional embodiments and techniques in accordance with the principles of this disclosure.

Furthermore, some of the features of the exemplary embodiments could be used to advantage without the corresponding use of other features. As such, the foregoing description should be considered as merely illustrative of the principles of the disclosed embodiments and not in limitation thereof.

What is claimed is:
1. A computing device, comprising:
  a memory, for storing information about graphic objects, the information comprising locations of the graphic objects,
  a display for displaying a representation of at least a portion of the information,
  a surface or pointing device for detecting an indication of a change, and one or more processing units;
  in response to detecting the indication, the one or more processing units are configured to automatically change:
    a) a geometry of at least one graphic object, wherein:

at least one location of the at least one graphic object is the same as of at least one other graphic object, the change comprises a change in at least one location of the at least one graphic object, and at least one location of the at least one other graphic object is unchanged; and b) at least a portion of the representation, wherein the display is configured to display at least a portion of the changed representation, and wherein the one or more processing units are further configured to identify a command, wherein the command comprises a command to:

change at least one of a length or angle of a line of at least one graphic object;

change at least one of a width, height or angle of a surface of at least one graphic object;

change an angle between two lines or surfaces of at least one graphic object;

trim one or more portions of at least one graphic object;

change a straight line of at least one graphic object to an arc;

change a flat surface of at least one graphic object to an arced surface;

add a chamfer to a sharp corner of at least one graphic object;

change at least one of a width, height or angle of a chamfered corner of at least one graphic object;

add a fillet or arc to a sharp corner of at least one graphic object;

change a radius and at least one location of a fillet or arc of a rounded corner of at least one graphic object;

make a line or surface of at least one graphic object parallel to another line or surface;

add a segment to a segmented line object;

make a geometric change in segments of at least one segmented line object;

insert or paste at least one graphic object or a segment of a segmented line object;

delete at least one graphic object or a segment of a segmented line object; or replace at least one graphic object or a segment of a segmented line object with at least one other graphic object or segment.

2. The computing device of claim 1, wherein the display and the surface are of a touch screen.

3. The computing device of claim 1, wherein the information about the graphic objects is of vector graphics or a CAD drawing.

4. The computing device of claim 1, wherein a geometry of the at least one other graphic object is unchanged.

5. The computing device of claim 1, wherein the indication comprises a touching gesture, tapping gesture, indication of a change in position or indication of a direction of the change in position.

6. A computing device, comprising:

a memory, for storing information about graphic objects, the information comprising locations of the graphic objects, a display for displaying a representation of at least a portion of the information, a surface or pointing device for detecting an indication of a change, and one or more processing units;

in response to detecting the indication, the one or more processing units are configured to automatically change:

a) a geometry of at least one graphic object, wherein:

at least one location of the at least one graphic object is the same as of at least one other graphic object, the change comprises a change in at least one location of the at least one graphic object, and at least one location of the at least one other graphic object is unchanged; and b) at least a portion of the representation, wherein the display is configured to display at least a portion of the changed representation, and wherein to automatically change the geometry in response to detecting the indication comprises:

to automatically change at least one of a length or angle of a line of the at least one graphic object in response to detecting at least a portion of the indication proximate or along the line or proximate at least one location of the line as indicated on the display;

to automatically change at least one of a width, height or angle of a surface of the at least one graphic object in response to detecting at least a portion of the indication proximate at least one location of the surface, proximate or along an edge of the surface or within the surface as indicated on the display;

to automatically change an angle between two lines of the at least one graphic object in response to detecting at least a portion of the indication proximate or along at least one of the two lines or proximate at least one location of at least one of the two lines as indicated on the display;

to automatically change an angle between two surfaces of the at least one graphic object in response to detecting at least a portion of the indication proximate at least one location of the two surfaces, proximate or along an edge of at least one of the two surfaces or within at least one of the two surfaces as indicated on the display;

to automatically trim one or more portions of the at least one graphic object in response to detecting at least a portion of the indication proximate, along or within at least one of the one or more portions as indicated on the display;

to automatically change a straight line of the at least one graphic object to an arc in response to detecting at least a portion of the indication proximate or along the straight line or proximate at least one location of the straight line as indicated on the display;

to automatically change a flat surface of the at least one graphic object to an arced surface in response to detecting at least a portion of the indication proximate at least one location of the flat surface, proximate or along an edge of the flat surface or within the flat surface as indicated on the display;

to automatically change a radius of an arc of the at least one graphic object in response to detecting at least a portion of the indication proximate or along the arc or proximate at least one location of the arc as indicated on the display;

to automatically change a radius of an arced surface of the at least one graphic object in response to detecting at least a portion of the indication proximate at least one location of the arced surface, proximate or along an edge of the arced surface or within the arced surface as indicated on the display;

to automatically add a chamfer to a sharp corner of the at least one graphic object in response to detecting at least a portion of the indication proximate the sharp corner, proximate or along one or more lines or edges branching from the sharp corner or within one or more surfaces of the sharp corner as indicated on the display; or to automatically change at least one of a width, height or angle of a chamfered corner of the at least one graphic object in response to detecting at least a portion of the indication proximate at least one location of the chamfered corner, proximate or along one or more lines or edges of the chamfered corner or within the chamfered corner as indicated on the display.

7. The computing device of claim 6, wherein the display and the surface are of a touch screen.

8. The computing device of claim 6, wherein the information about the graphic objects is of vector graphics or a CAD drawing.

9. The computing device of claim 6, wherein a geometry of the at least one other graphic object is unchanged.

10. The computing device of claim 6, wherein the indication comprises a touching gesture, tapping gesture, indication of a change in position or indication of a direction of the change in position.

11. The computing device of claim 6, wherein the at least one graphic object is connected to the at least one other graphic object at one or more shared locations.

12. A computing device, comprising:
a memory, for storing information about graphic objects, the information comprising locations of the graphic objects,
a display for displaying a representation of at least a portion of the information,
a surface or pointing device for detecting an indication of a change, and one or more processing units;
in response to detecting the indication, the one or more processing units are configured to automatically change:
a) a geometry of at least one graphic object, wherein:
at least one location of the at least one graphic object is the same as of at least one other graphic object,
the change comprises a change in at least one location of the at least one graphic object, and
at least one location of the at least one other graphic object is unchanged; and
b) at least a portion of the representation,
wherein the display is configured to display at least a portion of the changed representation, and wherein to automatically change the geometry in response to detecting the indication comprises:
to automatically add a fillet or arc to a sharp corner of the at least one graphic object in response to detecting at least a portion of the indication proximate the sharp corner, proximate or along one or more lines or edges branching from the sharp corner or within one or more surfaces of the sharp corner as indicated on the display;
to automatically change a radius and at least one location of a fillet or arc of a rounded corner of the at least one graphic object in response to detecting at least a portion of the indication proximate at least one location of the rounded corner, proximate or along an edge of the rounded corner or within the rounded corner as indicated on the display;
to automatically make a line or surface of the at least one graphic object parallel to other line or surface in response to detecting a portion of the indication proximate at least one location of the line or surface, proximate or along the line or within the surface of the at least one graphic object and in response to detecting another portion of the indication proximate at least one location of the other line or surface, proximate or along the other line or within the other surface as indicated on the display;

to automatically add a segment to a segmented line object in response to detecting at least a portion of the indication proximate at least one location of or along the segmented line object as indicated on the display;

to automatically make a geometric change in segments of at least one segmented line object in response to detecting at least a portion of the indication proximate or along one or more of the segments or proximate at least one location of the segments as indicated on the display; or to automatically replace at least one segment of a segmented line object or one or more of the at least one graphic object with at least one other segment or graphic object in response to detecting at least a portion of the indication proximate at least one location of or along the at least one segment or the one or more graphic objects as indicated on the display.

13. The computing device of claim 12, wherein the display and the surface are of a touch screen.

14. The computing device of claim 12, wherein the information about the graphic objects is of vector graphics or a CAD drawing.

15. The computing device of claim 12, wherein a geometry of the at least one other graphic object is unchanged.

16. The computing device of claim 12, wherein the indication comprises a touching gesture, tapping gesture, indication of a change in position or indication of a direction of the change in position.

17. The computing device of claim 12, wherein the at least one graphic object is connected to the at least one other graphic object at one or more shared locations.

18. A computing device, comprising:
a memory, for storing information about geometrical features, the information comprising locations of the geometrical features,
a display for displaying a representation of at least a portion of the information,
a surface or pointing device for detecting an indication of a change, and one or more processing units;
in response to detecting the indication, the one or more processing units are configured to automatically change:
a) a geometry of at least one geometrical feature, wherein:
at least one location of the at least one geometrical feature is the same as of at least one other geometrical feature,
the change comprises a change in at least one location of the at least one geometrical feature, and
at least one location of the at least one other geometrical feature is unchanged; and
b) at least a portion of the representation,
wherein the display is configured to display at least a portion of the changed representation, and
wherein the one or more processing units are further configured to identify a command, wherein the command comprises a command to:
change at least one of a length or angle of a line of at least one geometrical feature;
change at least one of a width, height or angle of a surface of at least one geometrical feature;
change an angle between two lines or surfaces of at least one geometrical feature;
trim one or more portions of at least one geometrical feature;

change a straight line of at least one geometrical feature to an arc;
change a flat surface of at least one geometrical feature to an arced surface;
add a chamfer to a sharp corner of at least one geometrical feature;
change at least one of a width, height or angle of a chamfered corner of at least one geometrical feature;
add a fillet or arc to a sharp corner of at least one geometrical feature;
change a radius and at least one location of a fillet or arc of a rounded corner of at least one geometrical feature;
make a line or surface of at least one geometrical feature parallel to another line or surface;
add a segment to a segmented line object of at least one geometrical feature;
make a geometric change in segments of at least one segmented line objects of at least one geometrical feature;
insert or paste at least a portion of at least one geometrical feature;
delete at least a portion of a geometrical feature; or
replace at least a portion of a geometrical feature with at least a portion of one other geometrical feature.

19. The computing device of claim 18, wherein the display and the surface are of a touch screen.

20. The computing device of claim 18, wherein the at least one geometrical feature comprises one or more of at least one of line objects, arcs, segmented line objects, shapes, or flat or arced surfaces.

21. The computing device of claim 18, wherein a geometry of the at least one other geometrical feature is unchanged.

22. The computing device of claim 18, wherein the indication comprises a touching gesture, tapping gesture, indication of a change in position or indication of a direction of the change in position.

23. A computing device, comprising:
a memory, for storing information about geometrical features, the information comprising locations of the geometrical features,
a display for displaying a representation of at least a portion of the information,
a surface or pointing device for detecting an indication of a change, and one or more processing units;
in response to detecting the indication, the one or more processing units are configured to automatically change:
a) a geometry of at least one geometrical feature, wherein:
at least one location of the at least one geometrical feature is the same as of at least one other geometrical feature,
the change comprises a change in at least one location of the at least one geometrical feature, and
at least one location of the at least one other geometrical feature is unchanged; and
b) at least a portion of the representation,
wherein the display is configured to display at least a portion of the changed representation, and
wherein to automatically change the geometry in response to detecting the indication comprises:
to automatically change at least one of a length or angle of a line of the at least one geometrical feature in response to detecting at least a portion of the indication proximate or along the line or proximate at least one location of the line as indicated on the display;
to automatically change at least one of a width, height or angle of a surface of the at least one geometrical feature in response to detecting at least a portion of the indication proximate at least one location of the surface, proximate or along an edge of the surface or within the surface as indicated on the display;
to automatically change an angle between two lines of the at least one geometrical feature in response to detecting at least a portion of the indication proximate or along at least one of the two lines or proximate at least one location of at least one of the two lines as indicated on the display;
to automatically change an angle between two surfaces of the at least one geometrical feature in response to detecting at least a portion of the indication proximate at least one location of the two surfaces, proximate or along an edge of at least one of the two surfaces or within at least one of the two surfaces as indicated on the display;
to automatically trim one or more portions of the at least one geometrical feature in response to detecting at least a portion of the indication proximate, along or within at least one of the one or more portions as indicated on the display;
to automatically change a straight line of the at least one geometrical feature to an arc in response to detecting at least a portion of the indication proximate or along the straight line or proximate at least one location of the straight line as indicated on the display;
to automatically change a flat surface of the at least one geometrical feature to an arced surface in response to detecting at least a portion of the indication proximate at least one location of the flat surface, proximate or along an edge of the flat surface or within the flat surface as indicated on the display;
to automatically change a radius of an arc of the at least one geometrical feature in response to detecting at least a portion of the indication proximate or along the arc or proximate at least one location of the arc as indicated on the display;
to automatically change a radius of an arced surface of the at least one geometrical feature in response to detecting at least a portion of the indication proximate at least one location of the arced surface, proximate or along an edge of the arced surface or within the arced surface as indicated on the display;
to automatically add a chamfer to a sharp corner of the at least one geometrical feature in response to detecting at least a portion of the indication proximate the sharp corner, proximate or along one or more lines or edges branching from the sharp corner or within one or more surfaces of the sharp corner as indicated on the display; or
to automatically change at least one of a width, height or angle of a chamfered corner of the at least one geometrical feature in response to detecting at least a portion of the indication proximate at least one location of the chamfered corner, proximate or along one or more lines or edges of the chamfered corner or within the chamfered corner as indicated on the display.

24. The computing device of claim 23, wherein the display and the surface are of a touch screen.

25. The computing device of claim 23, wherein the information about the geometrical features is of vector graphics or a CAD drawing.

26. The computing device of claim 23, wherein the geometry of the at least one other geometrical feature is unchanged.

27. The computing device of claim 23, wherein the indication comprises a touching gesture, tapping gesture, indication of a change in position or indication of a direction of the change in position.

28. The computing device of claim 23, wherein the at least one geometrical feature comprises one or more of at least one of line objects, arcs, segmented line objects, shapes, or flat or arced surfaces.

29. A computing device, comprising:
- a memory, for storing information about geometrical features, the information comprising locations of the geometrical features,
- a display for displaying a representation of at least a portion of the information,
- a surface or pointing device for detecting an indication of a change, and one or more processing units;
- in response to detecting the indication, the one or more processing units are configured to automatically change:
  a) a geometry of at least one geometrical feature, wherein:
     at least one location of the at least one geometrical feature is the same as of at least one other geometrical feature,
     the change comprises a change in at least one location of the at least one geometrical feature, and
     at least one location of the at least one other geometrical feature is unchanged; and
  b) at least a portion of the representation,
- wherein the display is configured to display at least a portion of the changed representation, and
- wherein to automatically change the geometry in response to detecting the indication comprises:
  to automatically add a fillet or arc to a sharp corner of the at least one geometrical feature in response to detecting at least a portion of the indication proximate the sharp corner, proximate or along one or more lines or edges branching from the sharp corner or within one or more surfaces of the sharp corner as indicated on the display;
  to automatically change a radius and at least one location of a fillet or arc of a rounded corner of the at least one geometrical feature in response to detecting at least a portion of the indication proximate at least one location of the rounded corner, proximate or along an edge of the rounded corner or within the rounded corner as indicated on the display;
  to automatically make a line or surface of the at least one geometrical feature parallel to other line or surface in response to detecting a portion of the indication proximate at least one location of the line or surface, proximate or along the line or within the surface of the at least one geometrical feature and in response to detecting another portion of the indication proximate at least one location of the other line or surface, proximate or along the other line or within the other surface as indicated on the display;
  to automatically add a segment to a segmented line object of the at least one geometrical feature in response to detecting at least a portion of the indication proximate at least one location of or along the segmented line object as indicated on the display;
  to automatically make a geometric change in segments of at least one segmented line object of the at least one geometrical feature in response to detecting at least a portion of the indication proximate or along at least one of the segments or proximate at least one location of the segments as indicated on the display; or
  to automatically replace at least a portion of the at least one geometrical feature with at least a portion of at least one other geometrical feature in response to detecting at least a portion of the indication proximate at least one location of, along, or within the at least one geometrical feature as indicated on the display.

30. The computing device of claim 29, wherein the display and the surface are of a touch screen.

31. The computing device of claim 29, wherein the information about the geometrical features is of vector graphics or a CAD drawing.

32. The computing device of claim 29, wherein the geometry of the at least one other geometrical feature is unchanged.

33. The computing device of claim 29, wherein the indication comprises a touching gesture, tapping gesture, indication of a change in position or indication of a direction of the change in position.

34. The computing device of claim 29, wherein the at least one geometrical feature comprises one or more of at least one of line objects, arcs, segmented line objects, shapes, or flat or arced surfaces.

* * * * *